United States Patent
Morfey et al.

(10) Patent No.: US 9,645,949 B2
(45) Date of Patent: May 9, 2017

(54) DATA PROCESSING APPARATUS USING PRIVILEGED AND NON-PRIVILEGED MODES WITH MULTIPLE STACKS

(75) Inventors: Alistair G. Morfey, Cambridge (GB); Karl Leighton Swepson, Cambridge (GB); Peter Giles Lloyd, Cambridge, MA (US)

(73) Assignee: Cambridge Consultants Ltd., Cambridge (GB)

(*) Notice: Subject to any disclaimer, the term of this patent is extended or adjusted under 35 U.S.C. 154(b) by 193 days.

(21) Appl. No.: 13/003,432

(22) PCT Filed: May 27, 2009

(86) PCT No.: PCT/GB2009/001309
§ 371 (c)(1),
(2), (4) Date: Sep. 1, 2011

(87) PCT Pub. No.: WO2010/004240
PCT Pub. Date: Jan. 14, 2010

(65) Prior Publication Data
US 2012/0036341 A1    Feb. 9, 2012

(30) Foreign Application Priority Data

Jul. 10, 2008   (GB) .................................. 0812662.5
Jul. 10, 2008   (GB) .................................. 0812663.3
(Continued)

(51) Int. Cl.
G06F 9/48   (2006.01)
G06F 9/38   (2006.01)
(Continued)

(52) U.S. Cl.
CPC ...... G06F 12/1491 (2013.01); G06F 9/30189 (2013.01); G06F 9/3861 (2013.01);
(Continued)

(58) Field of Classification Search
CPC ...... G06F 9/48; G06F 9/4843; G06F 9/30189; G06F 9/3861
(Continued)

(56) References Cited

U.S. PATENT DOCUMENTS 4,297,743 A      10/1981   Appell
4,703,481 A  *   10/1987   Fremont .......................... 714/17
(Continued)

FOREIGN PATENT DOCUMENTS

EP    0762272 A2    3/1997
GB    1267582       3/1972
(Continued)

OTHER PUBLICATIONS

OS Organization, Nov. 20, 2004, pp. 1-17, [retrieved on Oct. 14, 2014], retrieved from URL <http://www.inf.unideb.hu/~fazekasg/oktatas/G_Nutt/C3.pdf>.*
(Continued)

*Primary Examiner* — Andrew Caldwell
*Assistant Examiner* — Jyoti Mehta
(74) *Attorney, Agent, or Firm* — Schwegman Lundberg & Woessner, P.A.

(57) ABSTRACT

Embodiments of the invention relate to a data processing apparatus including a processor adapted to operate under control of an executable comprising instructions, and in any of a plurality of operating modes including a non-privileged mode and a privileged mode, the apparatus comprising: means for storing a plurality of stacks; a first stack pointer register for storing a pointer to an address in a first of said stacks; a second stack pointer register for storing a pointer to an address in a second of said stacks, wherein said processing apparatus is adapted to use said second stack pointer when said processor is operating in either the non-privileged mode or the privileged mode; and means for
(Continued)

transferring operation of said processor from the non-privileged mode to the privileged mode in response to at least one of said instructions. Embodiments of the invention also relate to a method of operating a data processing apparatus.

20 Claims, 13 Drawing Sheets

(30) Foreign Application Priority Data

Jul. 10, 2008 (GB) .................................. 0812664.1
Jul. 10, 2008 (GB) .................................. 0812665.8

(51) Int. Cl.
*G06F 9/30* (2006.01)
*G06F 12/14* (2006.01)

(52) U.S. Cl.
CPC .............. *G06F 9/48* (2013.01); *G06F 9/4843* (2013.01); *Y02B 60/1225* (2013.01)

(58) Field of Classification Search
USPC ........................................................ 712/229
See application file for complete search history.

(56) References Cited

U.S. PATENT DOCUMENTS

| | | |
|---|---|---|
| 4,866,599 A | 9/1989 | Morganti |
| 5,557,766 A | 9/1996 | Takiguchi |
| 5,666,510 A | 9/1997 | Mitsuishi et al. |
| 5,778,220 A | 7/1998 | Abramson et al. |
| 6,029,222 A | 2/2000 | Kamiya |
| 6,088,783 A | 7/2000 | Morton |
| 6,564,283 B1 | 5/2003 | Ahn |
| 6,598,151 B1 | 7/2003 | Laurenti |
| 6,651,160 B1 | 11/2003 | Hays |
| 6,654,871 B1 | 11/2003 | Aidan |
| 6,742,113 B1 | 5/2004 | Yamada |
| 6,807,622 B1 | 10/2004 | McGrath |
| 6,904,517 B2* | 6/2005 | Nevill et al. .................. 712/228 |
| 7,130,951 B1 | 10/2006 | Christie et al. |
| 2003/0221091 A1 | 11/2003 | Henry et al. |
| 2005/0102458 A1 | 5/2005 | Ober et al. |
| 2005/0172109 A1* | 8/2005 | Catherwood ................. 712/244 |
| 2007/0006200 A1* | 1/2007 | Renno et al. ................. 717/162 |
| 2007/0266374 A1 | 11/2007 | Grisenthwaite |
| 2010/0293342 A1 | 11/2010 | Morfey et al. |

FOREIGN PATENT DOCUMENTS

| | | |
|---|---|---|
| JP | 59-60645 A | 4/1984 |
| JP | 2000250762 A | 9/2000 |
| WO | WO-02097612 A | 12/2002 |
| WO | WO-2007/147443 A1 | 12/2007 |
| WO | WO 2008122746 A1 * | 10/2008 ............. G06F 9/355 |

OTHER PUBLICATIONS

Alan Clements, Principles of Computer Hardware, Jan. 18, 2006, Oxford University Press, Fourth edition, pp. 547-568.*
ARM Developer Suite Developer Guide, Nov. 2001, ARM Limited, version 1.2, 226 pages, [retrieved from the internet on Jun. 26, 2015], retrieved from URL <http://infocenter.arm.com/help/topic/com.arm.doc.dui0056d/DUI0056.pdf>.*
PL310 Cache Controller, Nov. 2007, ARM Limited, version r0p0, 148 pages, [retrieved from the internet on Jun. 29, 2015], retrieved from URL <http://infocenterarm.com/help/topic/com.arm.doc.ddi0246a/DDI0246A_l2cc_pl310_r0p0_trm.pdf>.*
"United Kingdom Application No. GB0812662.5, British Search Report issued Mar. 20, 2009", (Mar. 20, 2009), 4 pgs.
"International Application No. PCT/GB2009/001309, International Search Report issued Nov. 27, 2009", (Nov. 27, 2009), 4 pgs.
"International Application No. PCT/GB2009/001309, Written Opinion of the International Searching Authority, issued Nov. 27, 2009", (Nov. 27, 2009), 9 pgs.
"U.S. Appl. No. 12/594,715, Final Office Action mailed Jan. 27, 2014", 15 pgs.
"U.S. Appl. No. 12/594,715, Preliminary Amendment filed Oct. 5, 2009", 22 pgs.
"U.S. Appl. No. 12/594,715, Response filed May 27, 2014 to Final Office Action mailed Jan. 27, 2014", 15 pgs.
"U.S. Appl. No. 12/594,715, Response filed Nov. 7, 2013 to Non Final Office Action mailed Jun. 7, 2013", 17 pgs.
"Great Britian Application GB0706918.0, Search Report dated Jul. 27, 2008", 1 pg.
"Great Britian Application Serial No. GB0706918.0, Search Report dated Jul. 18, 2007", 2 pgs.
"International Application Serial No. PCT/GB2007/001323, International Search Report mailed Jan. 24, 2008", 5 pgs.
McLellan, E., "The Alpha AXP Architecture and 21064 Processor", IEEE Micro, vol. 13, No. 3, (1993), 36-47.
"U.S. Appl. No. 12/594,715, Response filed May 14, 2015 to Non Final Office Action mailed Jan. 15, 2015", 17 pgs.
"U.S. Appl. No. 12/594,715, Non Final Office Action mailed Jan. 15, 2015", 19 pgs.
"U.S. Appl. No. 12/594,715, Response filed Jan. 8, 2016 to Final Office Action mailed Jul. 10, 2015", 13 pgs.
"U.S. Appl. No. 12/594,715, Final Office Action mailed Jul. 10, 2015", 18 pgs.
"U.S. Appl. No. 12/594,715, Non Final Office Action mailed May 3, 2016", 20 pgs.
"U.S. Appl. No. 12/594,715, Response filed Nov. 3, 2016 to Non Final Office Action mailed May 3, 2016", 11 pgs.

* cited by examiner

| XAP5 - Programmer's Model | Operational or Current Registers | | Shadow Registers | Assembler Syntax |
|---|---|---|---|---|
| Normal Registers | 15 | 0 | | |
| Return Value, Function Argument 0 | R0 | | | %R0 |
| Function Argument 1 | R1 | | | %R1 |
| Function Argument 2 | R2 | | | %R2 |
| Function Argument 3 | R3 | | | %R3 |
| | R4 | | | %R4 |
| | R5 | | | %R5 |
| | R6 | | | %R6 |
| | R7 | | | %R7 |
| Address Registers | 23 | 1 0 | | |
| Program Counter | PC | F | = 2 Shadow Registers (SP0, SP1) | %PC |
| Stack Pointer | SP (current) | 0 | | %SP, %SP0, %SP1 |
| Vector Pointer | VP[23:8] | 0x00 | | %VP |
| Special Registers | 15 | 0 | | |
| Flags | FLAGS | | | %FLAGS |
| Information (read-only) | INFO | | | %INFO |
| Breakpoint Enable | BRKE | | | %BRKE |
| Breakpoint Registers | 23 | 0 | | |
| Breakpoint 0 | BRK0 | | | %BRK0 |
| Breakpoint 1 | BRK1 | | | %BRK1 |
| Breakpoint 2 | BRK2 | | | %BRK2 |
| Breakpoint 3 | BRK3 | | | %BRK3 |

Register Encodings

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| FLAGS | P3 | P2 | P1 | P0 | S4 | S3 | S2 | S1 | S0 | | I | M1 | M0 | V | C | N | Z |
| INFO | | | | | | | | SR | | | R | NL | | | K1 | K0 |
| BRKE | | E3 | R3 | W3 | | E2 | R2 | W2 | | E1 | R1 | W1 | | E0 | R0 | W0 |

Flags Register Encoding

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   | P3 | P2 | P1 | P0 | S4 | S3 | S2 | S1 | S0 | I | M1 | M0 | V | C | N | Z |

FLAGS

Information Register Encoding

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   | SR | NRL | | | | | K1 | K0 |

INFO

BRKE Register Encoding

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| 0 | ERW3 | ERW3 | ERW3 | 0 | ERW2 | ERW2 | ERW2 | 0 | ERW1 | ERW1 | ERW1 | 0 | ERW0 | ERW0 | ERW0 |

BRKE

| Operational Registers | | | Mode | | | | | | State | | |
|---|---|---|---|---|---|---|---|---|---|---|---|
| | | | User | | Trusted Supervisor | | Interrupt | | Recovery | | NMI |
| 23 | | 0 | 23 ... 0 | 23 ... 0 | 23 ... 0 | 23 ... 0 | 23 ... 0 | 23 ... 0 | 23 ... 0 | 23 ... 0 | 23 ... 0 |
| PC | | | | | | | | | | | |
| VP | | 0 | SP1 | SP1 | SP0 | SP0 | SP0 | SP0 | SP0 | SP0 | SP0 |

Address Registers

FIG. 6

DATA PROCESSING APPARATUS USING PRIVILEGED AND NON-PRIVILEGED MODES WITH MULTIPLE STACKS

PRIORITY CLAIM TO RELATED APPLICATIONS

This application is a national stage application under 35 U.S.C. §371 of PCT/GB2009/001309, filed May 27, 2009, and published as WO 2010/004240 A1 on Jan. 14, 2010, which claims priority to United Kingdom Application No. 0812665.8, filed Jul. 10, 2008, and to United Kingdom Application No. 0812664.1, filed Jul. 10, 2008, and to United Kingdom Application No. 0812663.3, filed Jul. 10, 2008, and to United Kingdom Application No. 0812662.5, filed Jul. 10, 2008, which applications and publication are incorporated herein by reference and made a part hereof in their entirety, and the benefit of priority of each of which is claimed herein.

The present invention relates to a data processing apparatus and also a method of operating the data processing apparatus.

BACKGROUND OF THE INVENTION

Microprocessors also known as "processors" are used today in a wide range of embedded systems. Mobile phones, Bluetooth headsets, electronic gas and electricity meters, pacemakers, anti-lock brakes, and engine management controllers are just a few examples of systems with embedded microprocessors. These systems typically contain all of their software in a non-volatile memory such as FLASH memory or ROM, which may be executed directly from the FLASH or ROM memory, or copied to SRAM for execution. Such software is often termed "firmware".

BRIEF SUMMARY OF THE INVENTION

Microprocessors in embedded systems may be a separate semiconductor device on a printed circuit board or similar interconnect. It has become common for microprocessors to be a part of a larger semiconductor device known as an ASIC, ASSP, or SoC (Application Specific Integrated Circuit, Application Specific Standard Product, or System on Chip). It is common to implement microprocessors in FPGAs (Field Programmable Gate Arrays) during development and testing, which is termed Emulation, and in some low volume applications FPGA implementations are used in the final product. It is also common to use various forms of software simulation of microprocessors during development and testing of the hardware system or of the software, or both. Types of software simulation include instruction accurate, cycle accurate, and timing accurate simulations.

There is great deal of interest in high-performance microprocessors for ASIC (application-specific integrated circuit) applications. These are often provided as pre-packaged multi-purpose processor cores, intended to be further integrated with dedicated circuitry in a system-on-a-chip configuration. There are ongoing requirements to provide increasingly advanced features, increased speed and reduced power consumption—all at minimal cost.

The following documents are hereby incorporated by reference: GB2294137A, GB2294138A, GB 0509738.1, GB2448488A (GB 0706918.0) and WO9609583. Also incorporated herein by reference are the following GB Patent Applications (filed together with this present PCT application, and from which this present PCT application claims priority): GB 0812665.8 (Agent Reference P32694); GB 0812664.1 (Agent Reference P32696); and GB 0812663.3 (Agent Reference P32697). Any feature in any of the abovementioned documents may be combined with any feature described herein in any appropriate combination.

This invention aims to provide an improved processor.

In one aspect of the present invention there is provided data processing apparatus including a processor adapted to operate under control of an executable comprising instructions, and in any of a plurality of operating modes including a non-privileged mode (e.g. User mode) and a privileged mode (e.g. Trusted mode), the apparatus comprising: means (in the form of a processor and associated memory) for storing a plurality of stacks; a first stack pointer register (e.g. SP0) for storing a pointer to an address in a first of said stacks; a second stack pointer register (e.g. SP1) for storing a pointer to an address in a second of said stacks, wherein said processing apparatus is adapted to use said second stack pointer when said processor is operating in either the non-privileged mode or the privileged mode; and means (in the form of a processor and associated memory) for transferring operation of said processor from the non-privileged mode to the privileged mode in response to at least one of said instructions.

The term executable as used herein may refer to one or more of the following: code; instructions; a program; program code; a binary; and hardware circuitry adapted to execute code and/or instructions. It will be appreciated that the term code as used herein may refer to both program instructions and data, and also hardware circuitry adapted to execute instructions.

The provision of two stack pointers can allow one to be used as a stack pointer for an 'OS' stack (for privileged access) and one to be used as a stack pointer for a task stack (for direct access by both privileged and non-privileged code). The provision of a non-privileged mode and a privileged mode which both use the stack pointer for the task stack, and of means for transitioning directly from the non-privileged mode to the privileged mode, allows for efficient transfer between the modes and avoids the need to place large amounts of task data on the 'OS' stack. This arrangement also allows far greater flexibility for the design of efficient real time operating systems.

The processor may be adapted to use the first stack as a privileged stack. The privileged stack may be (or may be used as) a kernel and/or operating system (OS) stack.

The processor may be adapted to use the second stack as a general stack. The general stack may be (or may be used as) a task, process, and/or thread stack.

The transferring means is preferably configured for transferring operation from the non-privileged mode to the, each or at least one privileged mode in response to an event which may, for example, be an exception (for example a service) event. The event may be invoked by execution of the instruction.

The processor may be adapted to use a plurality of the stacks stored by the storing means as general (for example, task, process and/or thread) stacks. The second stack may therefore be a current of the plurality of general stacks. Each of the plurality of general stacks may be used to store data for a different task. The processor may thus be adapted to switch between one task and another task by changing the pointer in the second stack pointer register to point to an address in the general (task, process and/or thread) stack for the other task.

The non-privileged mode may be configured for running non-privileged code preferably comprising a subset of the instructions from the instruction set. A plurality of status registers may be provided, and access of the processor to the status registers may be restricted when operating in the non-privileged mode.

The privileged mode is preferably configured for running privileged (and preferably non-privileged) code.

The plurality of operating modes may comprise at least one further privileged mode. The processor may be adapted to use the first stack pointer register when in the at least one further privileged mode.

The plurality of operating modes may comprise a plurality of the further privileged modes. The processor may be adapted to use the first stack pointer register when in each (or any) of the further privileged modes. The plurality of operating modes may comprise at least three privileged modes and/or may comprise at least one non-privileged mode.

The transferring means may be configured for transferring operation from the non-privileged mode to the, each, or at least one further privileged mode in response to an event.

The or at least one further privileged mode may be configured for servicing interrupts. The transferring means may be configured for transferring operation from any mode to the mode for servicing interrupts in response to an interrupt event.

The at least one further privileged mode may be configured for servicing errors which occur in at least one other mode. The mode for servicing errors may be configured for servicing errors which occur in the non-privileged mode and/or preferably in the privileged mode which uses the second stack pointer register.

The transferring means may be configured for maintaining operation in a current privileged mode in response to a service event occurring in that 'current' privileged mode.

The processor may be adapted to operate in only one of the modes at a given time.

The processor may be adapted for operation in at least one operating state. The transferring means may be configured for transferring operation from the or at least one operating mode to the or at least one operating state in response to an event. Preferably, the processor is adapted for operation in a plurality of the (preferably two) operating states.

The processor may be adapted to operate in only one of the plurality of states at a given time. The processor may be adapted to operate in only one of the modes and/or states at a given time.

The or each operating state is preferably privileged.

The or at least one operating state may be configured for use by the processor for recovery from errors occurring in the or a further privileged mode. The transferring means may be configured for transferring operation from a privileged operating mode to the operating state for recovery from errors preferably in response to at least one exception event. The at least one exception event causing the transfer to the state for recovery from errors may comprise a service event. The at least one exception event causing the transfer to the recovery state may comprise an error event.

The or at least one operating state may be configured for servicing non-maskable interrupts. The transferring means may be configured for transferring operation from a privileged operating mode to the state for servicing non-maskable interrupts in response to a non-maskable interrupt event occurring in any other mode or state.

A first status register may be provided for storing an indicator of the operating state of the processor. The first register may be read-only to the instructions. A second status register may be provided for storing an indicator of the operating mode of the processor. The second register may be writable by executing at least one of the instructions from the instruction set when the processor is in at least one (preferably a privileged one) of the operating modes.

Means (e.g. a signal or more specifically a 'fimode' signal) may be provided for indicating a current mode (or state) during a transfer from a source mode (or state) (e.g. for a memory access) to a destination mode (or state). The indicating means may be configured for timing a change in the current mode indicated from the source mode (or state) to the destination mode (or state), in dependence on both the source mode (or state) and the destination mode (or state).

The processor may be adapted to operate in a plurality of the operating states. The apparatus may comprise means for storing an indicator of the operating state of the processor wherein the indicator is read-only to the instructions, and may comprise means for transferring operation of the processor from an operating mode to an operating state, in response to an event.

In another aspect of the present invention there is provided data processing apparatus including a processor adapted to operate under control of an executable comprising instructions, and in any of a plurality of operating modes (e.g. a Privileged and a Non-Privileged mode) and at least one (preferably a plurality of) operating state(s) (e.g. Recovery and/or NMI state), the apparatus comprising: means for storing an indicator of the operating state of the processor (e.g. INFO register and/or its R-bit and/or NL-bit) wherein said indicator is read-only to said instructions; and means for transferring operation of said processor from a said operating mode to a said operating state, in response to an event.

It will be appreciated that the term 'read-only' in this context preferably means that the indicator cannot be changed explicitly by the instruction set. It will be further appreciated, however, that there may be ways of changing the indicator indirectly as a 'side-effect' of executing an instruction. For example, one of the states may be a state for allowing recovery from errors and an instruction which causes an error may (in certain circumstances) result indirectly in a transition to the operating state and hence a change to the indicator. Similarly, a return instruction which causes a return to one of the operating modes may, indirectly, result in an associated change to the indicator.

The provision of an operating state which is inaccessible to software can help to ensure that the processor has a secure operating state in which recovery from serious errors (especially nested errors) and/or (non-maskable) Interrupts may be handled.

The means for storing an indicator of the operating state preferably comprises a first status register (e.g. the INFO register). The operating state indicator may comprise at least one bit (e.g. NL and/or R) of the first status register. The operating state indicator may comprise at least two bits (e.g. NL and R) of the first status register.

Means for storing an indicator of the operating mode of the processor may be provided. The operating mode indicator may be writable by executing an instruction from the instruction set preferably when the processor is in one of the operating modes. The means for storing an indicator of the operating mode may comprise a second status register (e.g. the FLAGS register). The operating mode indicator may comprise at least one bit (e.g. the M bits) of the second status register.

The operating modes may comprise at least one privileged mode and at least one non-privileged mode.

The processor may adapted to operate in any of at least two operating states in dependence on the operating state indicator.

The apparatus may comprise means for initialising the stack pointer registers and may comprise means for individually (or separately) indicating when the first stack pointer register has been initialised and when the second stack pointer register has been initialised.

In another aspect of the present invention there is provided data processing apparatus including a processor adapted to operate under control of an executable comprising instructions, the apparatus comprising: means (in the form of a processor and associated memory) for storing a plurality of stacks; a first stack pointer register (e.g. SP0) for storing a pointer to an address in a first of said stacks; a second stack pointer register (e.g. SP1) for storing a pointer to an address in a second of said stacks; means (in the form of a processor and associated memory) for initialising said stack pointer registers; and means for individually (or separately) indicating when said first stack pointer register has been initialised (e.g. K0) and when said second stack pointer register has been initialised (e.g. K1).

The initialisation indicating means may comprise a status register. A first bit of the status register may be allocated for use to indicate that the first stack pointer register is initialised. A second bit of the status register may be allocated for use to indicate that the second stack pointer register is initialised. The or each bit may be read-only for all instructions in the instruction set.

The processor may be adapted to perform a soft reset if an attempt is made to use the first or second stack when the indication means does not indicate the corresponding stack pointer register has been initialised.

The processor may be adapted to inhibit the indicating means from indicating the second stack pointer register has been initialised before the first stack pointer register has been initialised.

The transferring means may be adapted to transfer operation of the processor from an operating mode to an operating state, in response to an event. The apparatus may further comprise means for initiating a reset sequence, when in the operating state, in response to a further event.

In another aspect of the present invention there is provided data processing apparatus including a processor adapted to operate under control of an executable comprising instructions, and in any of a plurality of operating modes and at least one (preferably a plurality of) operating state(s), the apparatus comprising: means (in the form of a processor and associated memory) for transferring operation of said processor from a said operating mode to a said operating state, in response to an event; and means (in the form of a processor and associated memory) for initiating a reset sequence, when in the said operating state, in response to a further event.

The provision of a means for transferring from an operating mode to a state in which a further event will cause a reset can help to ensure that there is a layered 'escape route' from the operating modes which can help to prevent 'infinite' loops of events occurring in the operating modes which can prevent a debugger or the like from being able to take control of the processor.

The event and/or the further event may (each) comprise an exception event. The exception event may be a service event. The exception event may be an error event. The event and/or the further event may (each) comprise an interrupt event. The interrupt event may be a non-maskable interrupt event.

The reset sequence may be a soft reset sequence. The reset sequence may be a hard reset sequence. The transferring means may be adapted for transferring operation of the processor between the operating modes in response to other events.

Means may be provided for initiating a reset sequence in response to an exception event. The processor may be adapted to ignore errors which occur during the reset sequence.

The processor may be adapted to operate under control of an executable comprising instructions, and in any of a plurality of operating modes. The apparatus may comprise means for initiating a reset sequence in response to an exception event. The processor may be adapted to ignore errors which occur during the reset sequence.

In another aspect of the present invention there is provided data processing apparatus including a processor adapted to operate under control of an executable comprising instructions, and in any of a plurality of operating modes, the apparatus comprising: means for initiating a reset sequence in response to an exception event wherein said processor is adapted to ignore errors which occur during said reset sequence.

Ignoring errors in the reset sequence can further help to avoid 'infinite' loops of events by preventing error events occurring during the reset loop.

According to another aspect of the invention there is provided a method of operating a data processing apparatus according to any of the apparatus aspects.

According to another aspect of the invention there is provided a method of operating a data processing apparatus including a processor adapted to operate under control of an executable comprising instructions, and in any of a plurality of operating modes including a non-privileged mode and a privileged mode, the method comprising: storing a plurality of stacks (for example in a memory); storing a pointer to an address in a first of said stacks in a first stack pointer register; storing a pointer to an address in a second of said stacks in a second stack pointer register; using said second stack pointer when said processor is operating in the non-privileged mode and when said processor is operating in the privileged mode; and transferring operation of said processor from the non-privileged mode to the privileged mode in response to at least one of said instructions.

According to another aspect of the invention there is provided a method of operating a data processing apparatus including a processor adapted to operate under control of an executable comprising instructions, and in any of a plurality of operating modes and at least one (preferably a plurality of) operating state(s), the method comprising: transferring operation of said processor from a said operating mode to a said operating state, in response to an event; and storing an indicator of the operating state of the processor; wherein said indicator is read-only to said instructions.

According to another aspect of the invention there is provided a method of operating a data processing apparatus including a processor adapted to operate under control of an executable comprising instructions, the method comprising: storing a plurality of stacks; initialising a first stack pointer register and a second stack pointer register; storing a first indication when said first stack pointer register has been initialised; storing a second indication when said second stack pointer register has been initialised; storing a pointer to an address in a first of said stacks in the first stack pointer register; and storing a pointer to an address in a second of said stacks in the second stack pointer register.

According to another aspect of the invention there is provided a method of operating a data processing apparatus including a processor adapted to operate under control of an executable comprising instructions, and in any of a plurality of operating modes and at least one (preferably a plurality of) operating state(s), the method comprising: transferring operation of said processor from a said operating mode to a said operating state, in response to an event; and initiating a reset sequence when in the operating state in response to a further event.

According to another aspect of the invention there is provided a method of operating a data processing apparatus including a processor adapted to operate under control of an executable comprising instructions, and in any of a plurality of operating modes (and/or a plurality of operating states) the method comprising: initiating and completing a reset sequence in response to an exception wherein any errors which occur during said reset sequence are ignored.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

The term "memory" as used herein preferably includes any kind of data storage accessible by the processor, including, for example, processor registers, on- and off-chip cache memory, and main memory (as would typically be accessed by the processor via a memory bus). Unless the context otherwise requires, memory may be read-only or may be readable and writable. The term "memory location" preferably refers to a storage location of any appropriate size within such a memory.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

BRIEF DESCRIPTION OF THE SEVERAL VIEWS OF THE DRAWINGS

The invention will now be described, purely by way of example, with reference to the accompanying drawings, in which:

FIG. 3 is a programmer's model which shows various registers of the processor;

FIG. 4 is an expanded view of part of the programmer's model of FIG. 3 showing status registers of the processor;

FIG. 6 is a diagram showing stack usage for the modes and operating states of FIG. 5;

DETAILED DESCRIPTION OF THE INVENTION

Figure 1:
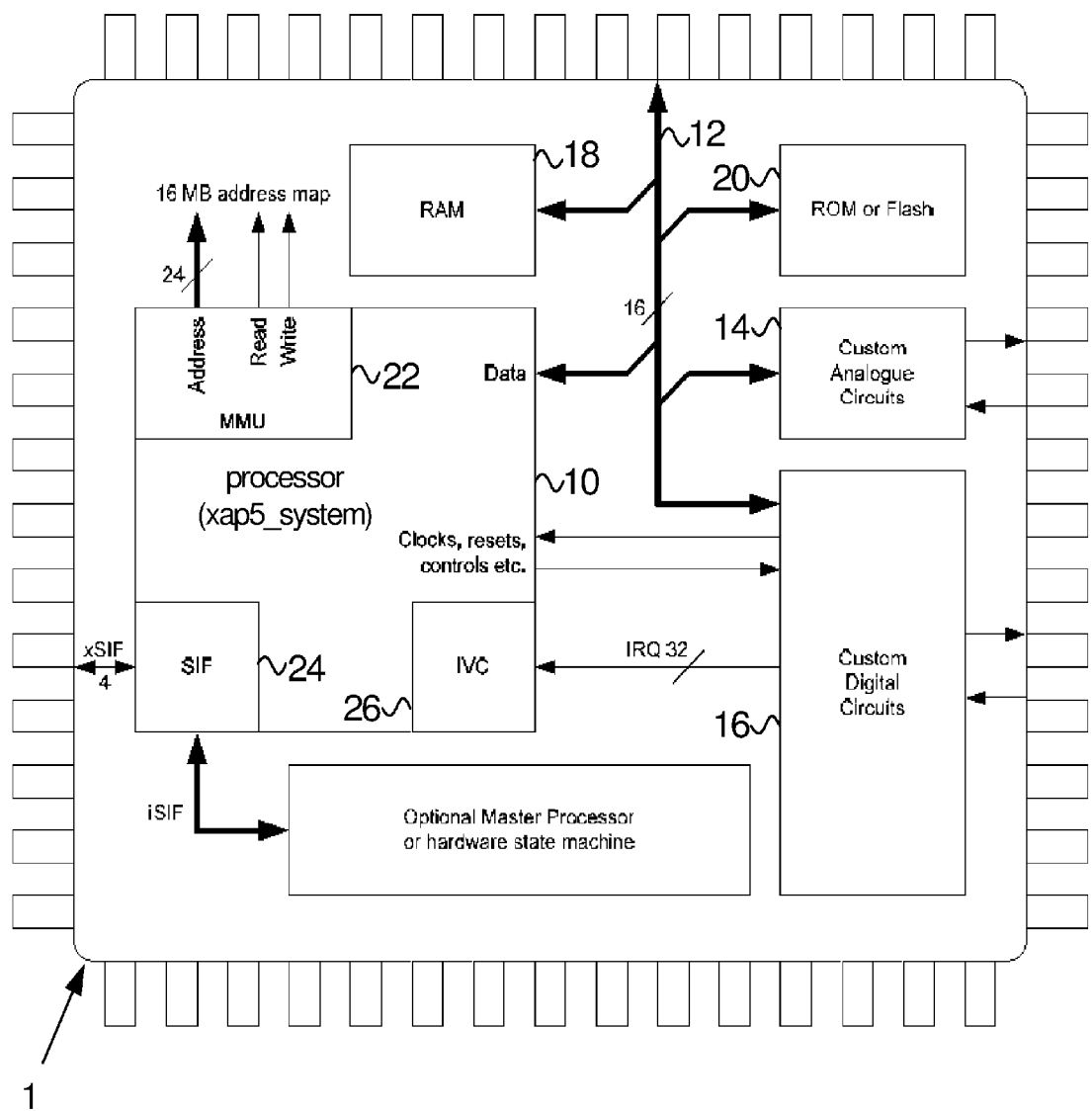
FIG. 1 is a schematic of a processor implemented within an ASIC (application specific integrated circuit) semiconductor device.

FIG. 1 shows a data processing apparatus 1 implemented in the form of an ASIC (application specific integrated circuit) semiconductor device, comprising a central processing unit or processor 10, for running user programs, connected via a data bus 12 to analogue circuitry 14 and digital circuitry 16, and also to random-access memory (RAM) 18 and read-only memory (ROM) 20.

Processor 10 may be, for example, one of the XAP range of processors as supplied by Cambridge Consultants Ltd, Cambridge, England, such as the XAP5, which is a 16-bit RISC processor with von Neumann architecture, the 16-bit XAP4 or the 32-bit XAP3. Further details relating to these processors and their associated instruction sets can be found in GB 2427722A, WO 20061120470 and WO2008/122746 (PCT/GB2007/001323), which are incorporated herein by reference. The processor 10 may be described to those skilled in the art as an IP-core using a hardware description language such as Verilog or VHDL in RTL (register transfer level) code.

The processor 10 further comprises a memory management unit 22 (MMU), for interfacing with the RAM 18, ROM 20, custom analogue circuits 14, and custom digital circuits 16; a serial interface (SIF) 24, to facilitate debugging and/or control of the processor 10; and an interrupt vector controller (IVC) 26, for handling interrupts (external asynchronous events), including both maskable interrupts and non-maskable interrupts.

Analogue circuitry 14 and digital circuitry 16 are custom built for specific applications; likewise, the MMU 22 and IVC 26 may be customised as required. The processor core 11 is intended to be fixed and unchanged from one ASIC to another. RAM 18 and ROM 20 may comprise on-chip or off-chip memory.

Persons skilled in the art will appreciate that the data processing unit 1 may be implemented, for example, in a semiconductor material such as silicon, for example, CMOS, and be suitable for ASIC or FPGA applications.

Architecture

Processor 10 uses a load-store architecture, as will be familiar to those skilled in the art of processor design.

Figure 2:
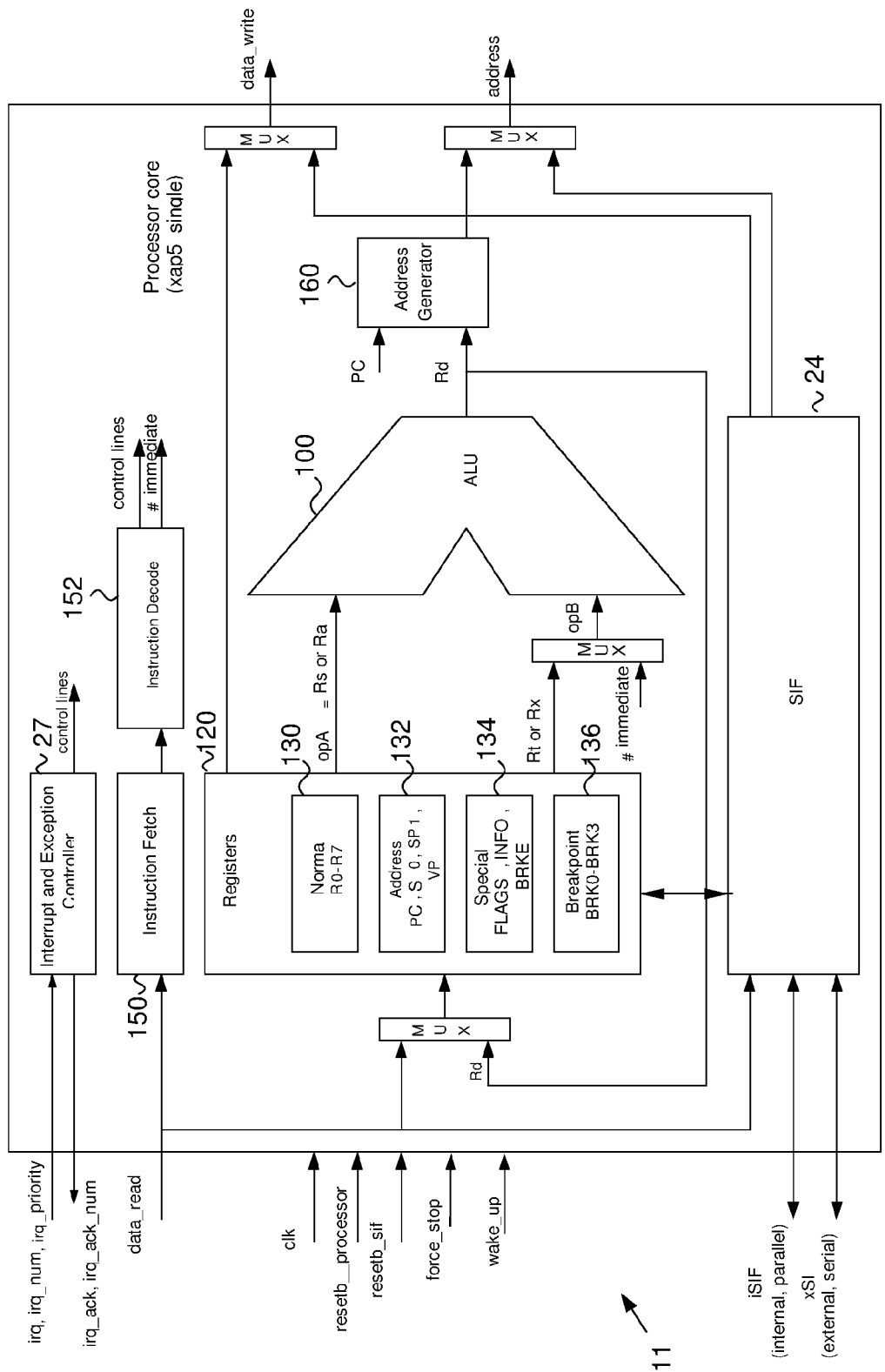
FIG. 2 is a schematic block diagram of the hardware architecture of the processor.

FIG. 2 shows a block diagram of the hardware architecture of the processor core 11. Processor core 11 can be seen to comprise an arithmetic logic unit (ALU) 100, serial interface unit (SIF) 24, interrupt and exception controller 27 and a bank of registers 120. The ALU 100 is connected to an address generator unit 160. The processor 10 is also provided with an instruction fetch unit 150 and an instruction decode unit 152. A plurality of data input and output lines are shown, both between the constituent units of the processor 10 and to/from the processor itself, as will be familiar to those skilled in the art. For example, in FIG. 2, the data lines and opcodes (op) use the following notation:

Rd destination register
Rs primary source register
Rt secondary source register
Rx index register
Ra base address register Memory Management Unit (MMU) and Interrupt Vector Controller (IVC)

Figure 13:
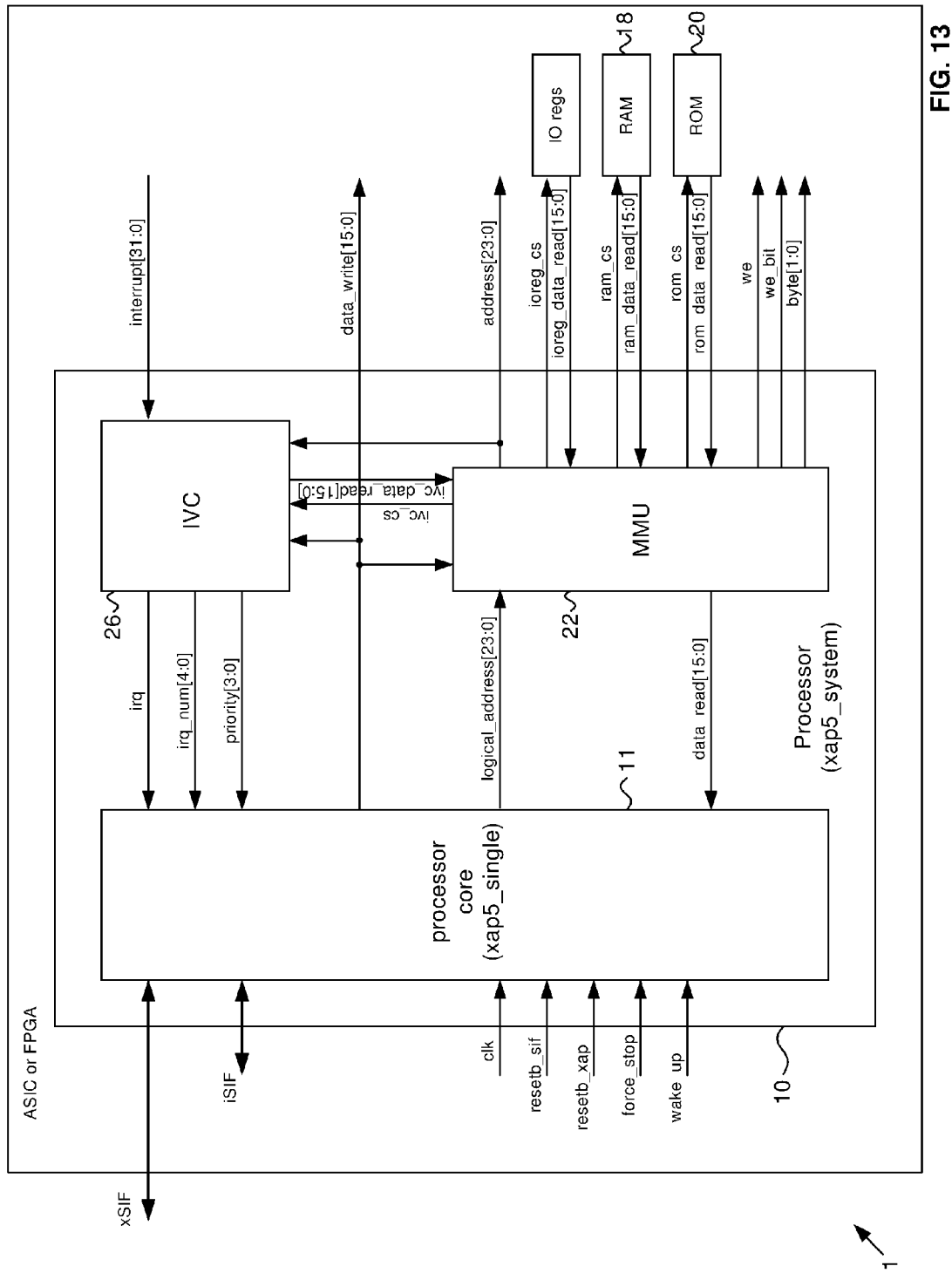
FIG. 13 is a schematic block diagram of the hardware architecture of the processor.

FIG. 13 shows the interconnection between the processor core 11, the MMU 22 and the IVC 26 in more detail. As can be seen from FIGS. 3 and 4, the processor core 11 may be packaged together with the IVC and the MMU, which are implemented as part of an ASIC or FPGA.

The MMU 22 is used to interface with various memories connected to the processor 10, for example, RAM, ROM, Flash and IO registers. The IVC 26 is used to prioritise interrupt sources and provide interrupt numbers and priority levels for the interrupts to the processor core 11.

Registers

Processor 10 includes a small amount of on-chip storage in the form of registers, which provides fast-accessible working memory for the processor.

FIG. 2 shows some of the registers used by the processor 10. These comprise several different types according to function, including:

general purpose registers 130—used for the normal operands for the majority of tasks of the instruction set
address registers 132—used to hold memory addresses
special registers 134—used, for example, to indicate processor status
breakpoint registers 136—used in debugging Temporary working storage for the processor 10 is provided by means of conventional stacks, as will be familiar to those skilled in the art, which are last-in first-out (LIFO) data structures, wherein register values may be 'pushed' onto, and subsequently 'popped' off, the stacks. A Stack Pointer register (SP) is used to refer to locations in the stack.

Referring now to the programmer's model shown in FIGS. 3 and 4 in one example the processor is provided with a plurality of registers comprising: eight 'normal' 16-bit registers (R0-R7); three 'special' 16-bit registers (read-only status register (INFO)), processor status register (FLAGS), and breakpoint enable register (BRKE)); four 24-bit address registers (Program Counter (PC), Stack Pointer 1 (SP0), Stack Pointer 2 (SP1), and Vector Pointer (VP)); and four 24-bit breakpoint registers (BRK0 to BRK3).

SP0 and SP1 are 'banked' or 'shadow' Stack Pointer registers which, in operation, may at any time point respectively to addresses in a first stack (Stack0) and a second stack (Stack1). The processor is configured to select one of these two Stack Pointer registers (SP0 and SP1), in operation, as a current Stack Pointer register (SP) for stack pointer operations, in dependence on an operating mode (or state) in which the processor is operating.

Operating Modes and Operating States

Figure 5:
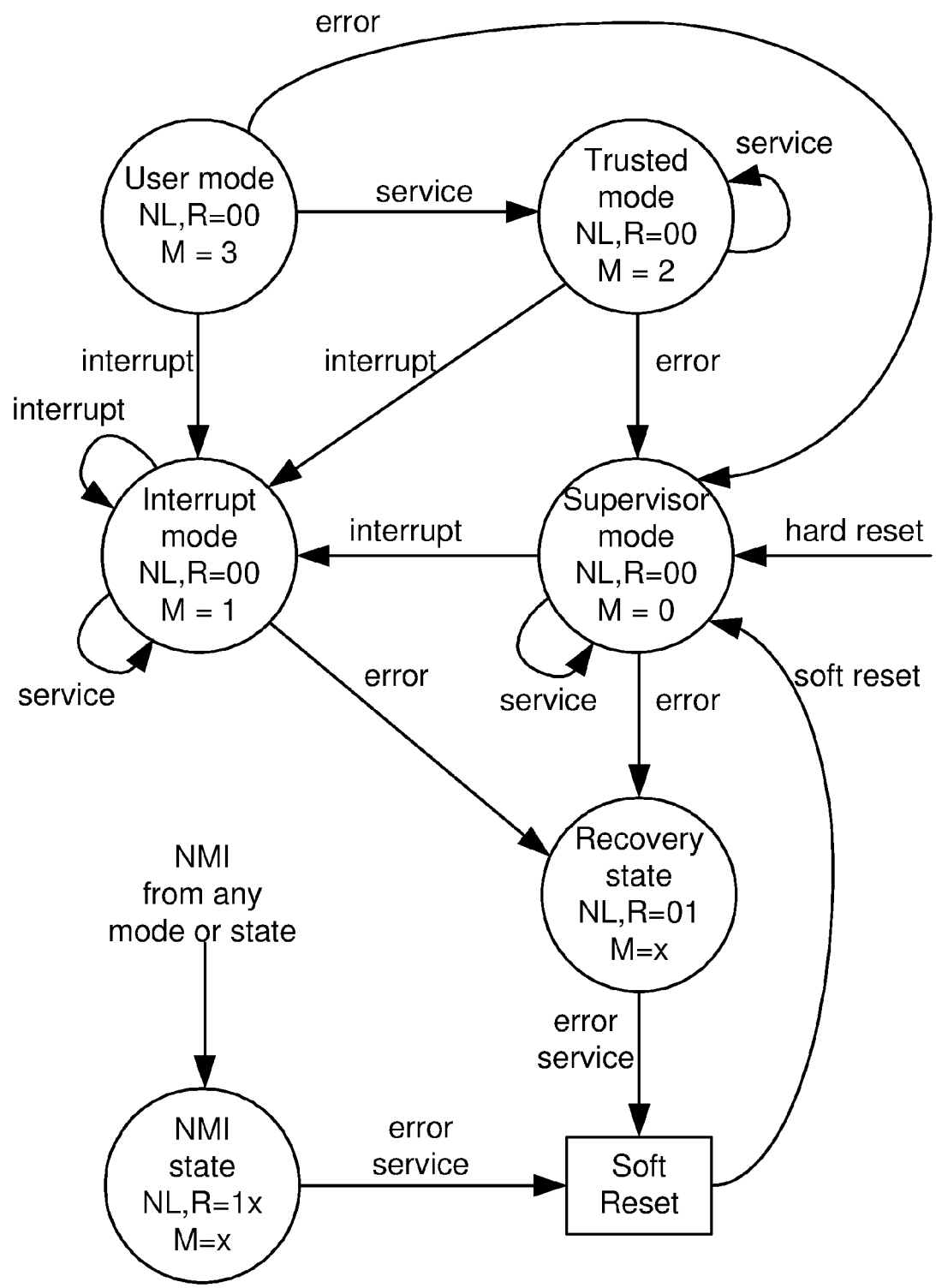
FIG. 5 is a state diagram showing operating modes and operating states of the processor.

As seen in FIG. 5, a range of modes and states are provided each having different characteristics and, in particular, different levels of protection and privilege. More specifically, the architecture supports four operating modes (User, Supervisor, Interrupt and Trusted) and two operating states (Recovery and Non-Maskable Interrupt (NMI)). The processor is at any one time in one of the User mode, Trusted mode, Interrupt mode, Supervisor mode, Recovery state, or NMI state.

All four operating modes are directly accessible (by execution of an associated instruction) by code running in the Supervisor, Interrupt and Trusted modes. Direct access to Privileged code (by execution of an associated instruction) by code running in the User mode, however, is restricted to Trusted mode Event handlers only (as described in more detail below).

The two operating states, on the other hand, are not directly accessible (by execution of an associated instruction) to code running in any other mode or state, and can only be reached in a controlled set of situations (as described in more detail below).

Privileged and Non-Privileged Code

The processor is configured for operation under the control of program/application code comprising instructions having a multiplicity of instructions. The instructions may provide any appropriate functionality, and typically comprise multi-cycle instructions to accelerate C function entry/exit, block copy instructions, block store instructions, and multiply and divide instructions, in addition to typical RISC load, store, ALU, branch, subroutine call, return, etc. A full listing of all the instructions provided in one example of the processor architecture is shown in Appendix A.

The architecture is designed such that the program code may be partitioned into "User mode code" or "Privileged code". User mode code is non-privileged code which is run in the User mode and which is not permitted, by the processor architecture, to execute some types of instructions, or to directly access some resources such as, for example, certain registers, memory areas and/or Input/Output (I/O) devices. Privileged code, on the other hand, is granted access to all instructions and system resources.

Partitioning the code in this manner limits the amount of code that has access to sensitive system resources thereby increasing system reliability and security and reducing the risk associated with programming errors or even intentional attack.

The processing architecture is also designed to allow the code to be divided into code for separate tasks or threads which run together under the control of a multi-tasking operating system. In this case the overall system may be designed to allocate separate memory areas to each task or thread, and to prevent tasks from being able to read and write to the memory areas allocated to another task. This provides yet further enhancements to system reliability and security and is enabled, in part, by the way in which the non-Privileged (User mode) code and Privileged code are partitioned.

Events (Interrupts and Exceptions)

In operation, a transition from one mode (or state) to another mode (or state) is initiated on occurrence of an Event, with the destination operating mode (or state) depending on the source mode (or state) and the nature of the Event. An Event may, for example, comprise an Interrupt or an Exception. An Interrupt is a response to an event outside of the processor core and may comprise a Maskable Interrupt ('MI') (which may occur in any operating mode) or a Non-Maskable Interrupt (NMI) (which may occur in any operating mode or the Recovery state). Exceptions, on the other hand, are caused by internal events and may comprise an Error, a Service, or a Reset and may occur in any operating mode or state.

On occurrence, an Event is dealt with by a corresponding Event handler which is a piece of software that is executed in response to an Event, to service an Interrupt or Service request, to respond to an Error, or to restore system operation after a Reset.

An Error (as referred to herein) is preferably a program behaviour that the microprocessor detects and determines to be in violation of a specified rule or other restriction. As with any computer system, there are many programming errors, or "bugs", that cannot be detected by associated microprocessor hardware, for example an incorrect coding of an algorithm.

Examples of Errors include: an attempt by a user program to access data or code outside an address range that it is allowed to access by the current MMU configuration; an attempt to execute a Privileged instruction in User mode; an attempt to execute an unknown instruction (i.e. an instruction with an opcode that has not been assigned to any operation); an attempt to divide by zero; a Null pointer access; alignment errors; etc.

The processor architecture is designed such that detectable Errors are caught and dealt with using up to three levels of Error handlers (including a Soft Reset handler) which allow for efficient logging of Errors and software controlled system recovery, shutdown, or restart.

Service Exceptions include System Call, SingleStep and Break. System Call is initiated by the (SysCall) instruction and is used to provide a controlled way of calling the operating system, especially from non-privileged User mode code. SingleStep and Break support software debug.

SingleStep is invoked by setting a flag (P1—also known as the 'T' flag) in User mode. If the SingleStep flag is enabled then a Service Exception will be triggered after every User mode instruction (assuming that the instruction does not itself cause another Exception).

Break is invoked by setting a flag (P0—also known as the 'B' flag) in User mode, and causes the processor to generate a Break Service event if either a brk instruction is executed or a break condition is satisfied in the breakpoint (BRK) registers.

Resets may be 'hard' or 'soft' and differ from other Exceptions in that their handlers do not need to return to code executing when the Exception occurred, and as such do not need to preserve processor state on the stack. Soft Reset effectively provides a final safety net by recording the cause of the reset and preserving most of the registers including the Stack Pointers intact. This allows Errors to be logged, recovery to be attempted, or a controlled shutdown or restart to be invoked.

SIF Debug Interface

The processor is provided with a SIF debug interface which allows a programmer to debug software and to read or write the registers, memory and IO registers of all the on-chip SIF Processors. The SIF is also used for data acquisition and analogue production test of the ASIC. The debug interface, and in particular the benefits of the processor to its use, are described in more detail in the section entitled 'SIF Interface' below.

Registers

The various registers and their function will now be described in more detail with reference to Tables 1 to 9.

Normal Registers

The use of the eight normal registers (R0 to R7), which form the normal register operands for the majority of the instruction set, is detailed in Table 1.

TABLE 1

| Assembler Syntax | Instruction Encoding | Register Name | Notes |
|---|---|---|---|
| % r0 | 0 | R0 | Used as: return value function argument 0 |
| % r1 | 1 | R1 | Used as: function argument 1 |
| % r2 | 2 | R2 | Used as: function argument 2 |
| % r3 | 3 | R3 | Used as: function argument 3 |
| % r4 | 4 | R4 | General purpose |
| % r5 | 5 | R5 | registers, preserved |
| % r6 | 6 | R6 | by functions |
| % r7 | 7 | R7 | |

R0 and R1 (and other registers described elsewhere) are pushed to one of the stacks when, in operation, an Interrupt or Exception (other than a reset) occurs. When the associated handler completes (for example with an rtie instruction), the registers are restored to their previous values from the associated stack.

Any pair of adjacent registers can be used to form a (32-bit) register-pair which may be used by many instructions, including for example: mult; div; rem; divrem; shift; and rotate instructions. Such register-pairs are referred to by the lower register of the pair, for example: {R2, R1} is referred to as % r1; {R5, R4} is referred to as % r4; and {R0, R7} is referred to as % r7.

In a possible example of the processor each register is only used for a single variable (whether it is 8-bit or 16-bit). All arithmetic and logical operations operate on full 16-bit words. In this example Load, Store and Compare instructions have 16-bit and 8-bit forms (zero extended), allowing programs to operate on 8-bit variables.

Address Registers

As described above the processor is provided with four address registers (which may be 24-bit): the Program Counter (PC); two Stack Pointers (SP0 and SP1); and the Vector Pointer (VP). These registers are summarised in Table 2.

TABLE 2

| Assembly name | Hardware register Name | Notes |
|---|---|---|
| % pc | PC | The program counter. This is used in all processor modes and is not accessible directly, although there are a range of PC-relative instructions. |
| % sp | SP0 or SP1 | The hardware register used as % sp depends on the processor mode. |
| % sp0 | SP0 | Supervisor and Interrupt mode, and Recovery and NMI state, stack pointer. In Supervisor and Interrupt modes, and Recovery and NMI states, this is accessed as % sp. |
| % sp1 | SP1 | User mode and Trusted mode stack pointer. In User and Trusted mode, this is accessed as % sp. |

TABLE 2-continued

| Assembly name | Hardware register Name | Notes |
|---|---|---|
| % vp | VP | The vector pointer. This can be accessed from privileged modes as % vp. It is also used whenever memory within the window is accessed, and when an event handler is entered. |

The single Program Counter (PC) is used by all processor modes and states. The Program Counter normally points to the next instruction to be executed. It is implicitly used by many instructions including, for example, the PC-relative variants of the *.i instructions and the rtie ('return from Interrupt or Exception') instruction.

All instructions start at word boundaries. The least-significant bit of the Program Counter is used to control the memory mode with PC[0]=0 representing Near mode and PC[0]=1 representing Far mode (further details of Near and Far mode are described in PCT/GB2007/001323).

Of the two hardware Stack Pointer registers (SP0 and SP1) the register used depends on the current processor mode or state. SP0 is shared between the Supervisor and Interrupt modes and the Recovery and NMI states. The Stack Pointer is always even to ensure that it is word-aligned for speed. As such, SP[0] is always zero.

When % sp is used as an operand (either implicitly or explicitly), the currently active Stack Pointer register is used. The movr2a.*('move register to address') and mova2r.*('move address to register') instructions allow the privileged modes to access each of the two Stack Pointers explicitly.

The Vector Pointer (VP) register points to the base of a vector table. The convention is to group a program (vectors, constants, initialisation data, code) into a contiguous block. If the convention has been adhered to, then VP points to the base of the whole program. The Hard Reset and Soft Reset reads the initial value of VP from memory at a predetermined address (for example 0xFFFFFC). The least significant byte VP [7:0] is always zero. VP[23:8] is the register. VP is initialised on reset by loading to it from the predetermined value. It can also be accessed from the privileged modes with the movr2a.*('move register to address') and mova2r.*('move address to register') instructions.

A possible example of a vector table is shown in Table 3.

TABLE 3

| VP-relative Event Offset | Event No | Event Type | Src Mode/ State | Dest Mode/ State | Dest P[3:0] | PC to Stack | Vector |
|---|---|---|---|---|---|---|---|
| 0x00 | Exc00 | | | | | | Reserved, to avoid NullPointer error if VP = 0. |
| 0x04 | Exc01 | Reset | UTSIRN | S | 0 | / | HardReset |
| 0x08 | Exc02 | Reset | TSIRN | S | 0 | / | SoftReset |
| 0x0C | Exc03 | Error | UT | S | ErrPval | next | InstructionError_S |
| 0x10 | Exc04 | Error | UT | S | ErrPval | next | NullPointer_S |
| 0x14 | Exc05 | Error | UT | S | ErrPval | next | DivideByZero_S |
| 0x18 | Exc06 | Error | UT | S | ErrPval | next | UnknownInstruction_S |
| 0x1C | Exc07 | Error | UT | S | ErrPval | next | AlignError_S |
| 0x20 | Exc08 | Error | UT | S | ErrPval | next | MMUDataError_S |
| 0x24 | Exc09 | Error | UT | S | ErrPval | current | MMUProgError_S |
| 0x28 | Exc10 | Error | U | S | ErrPval | next | MMUUserDataError_S |
| 0x2C | Exc11 | Error | U | S | ErrPval | current | MMUUserProgError_S |
| 0x30 | Exc12 | Service | UT | T | = | next | SysCall0_T |
| 0x34 | Exc13 | Service | UT | T | = | next | SysCall1_T |
| 0x38 | Exc14 | Service | UT | T | = | next | SysCall2_T |
| 0x3C | Exc15 | Service | UT | T | = | next | SysCall3_T |
| 0x40 | Exc16 | Service | U | T | = | next | SingleStep_T |
| 0x44 | Exc17 | Service | U | T | = | next or current | Break_T |
| 0x48 | Exc18 | Error | U | S | ErrPval | next | PrivInstruction_S |
| 0x4C | Exc19 | Error | SI | R | ErrPval | next | InstructionError_R |
| 0x50 | Exc20 | Error | SI | R | ErrPval | next | NullPointer_R |
| 0x54 | Exc21 | Error | SI | R | ErrPval | next | DivideByZero_R |
| 0x58 | Exc22 | Error | SI | R | ErrPval | next | UnknownInstruction_R |
| 0x5C | Exc23 | Error | SI | R | ErrPval | next | AlignError_R |
| 0x60 | Exc24 | Error | SI | R | ErrPval | next | MMUDataError_R |
| 0x64 | Exc25 | Error | SI | R | ErrPval | current | MMUProgError_R |
| 0x68 | Exc26 | Service | SI | = | = | next | |
| 0x6C | Exc27 | Service | SI | = | = | next | |
| 0x70 | Exc28 | Service | SI | = | = | next | SysCall0_SI |
| 0x74 | Exc29 | Service | SI | = | = | next | SysCall1_SI |
| 0x78 | Exc30 | Service | SI | = | = | next | SysCall2_SI |
| 0x7C | Exc31 | Service | SI | = | = | next | SysCall3_SI |
| 0x80-0x8C | Int00-Int03 | NMI | UTSIR | N | irq_priority [3:0] | next or current | Int00-Int03 = Non Maskable Interrupt |
| 0x90-0xFC | Int04-Int31 | MI | UTSI | I | irq_priority [3:0] | next or current | Int04-Int31 = Maskable Interrupt |

Special Registers

The movs2r ('move special to register') and movr2s ('move register to special') instructions allow Privileged modes access to the Special Registers illustrated in Table 4.

TABLE 4

| Assembler Syntax | Instruction Encoding | Register Name | Notes |
|---|---|---|---|
| % flags | 0 | FLAGS | Operational Flags Register |
| % info | 1 | INFO | Information Register (read only) |
| % brke | 2 | BRKE | Break Enable |
| | 3-7 | reserved | |

FLAGS Register

Table 5 describes the layout of the "operational flags" or FLAGS special register (which is cleared to 0 at reset). When an Interrupt or Exception occurs, the FLAGS register is pushed to the privileged stack and an appropriate handler is invoked. When the handler completes (with an rtie instruction), the FLAGS register is reinstated by popping from the stack.

TABLE 5

| Bit | Flag | Name | Description |
|---|---|---|---|
| 0 | Z | Zero | Set if result is zero (Rd = 0) |
| 1 | N | Negative | Set if result is negative (Rd[15] = 1) |
| 2 | C | Carry | Set if unsigned arithmetic overflowed |
| 3 | V | Overflow | Set if signed arithmetic overflowed |
| 5:4 | M[1:0] | Mode | 0 [00] Supervisor mode |
| | | | 1 [01] Interrupt mode |
| | | | 2 [10] Trusted mode |
| | | | 3 [11] User mode |
| | | | 0-2 = Privileged modes. |
| | | | 3 = Non-privileged mode. |
| | | | 0-1 use Stack0 and SP0. |
| | | | 2-3 use Stack1 and SP1. |
| | | | Note that INFO[NL] and INFO[R] take precedence over FLAGS[M]. FLAGS[M] is only interpreted when INFO[NL] = 0 and INFO[R] = 0. |
| | | | INFO[NL, R] = 1x is NMI state. |
| | | | INFO[NL, R] = 01 is Recovery state. |
| | | | Stack0 and SP0 are used when in NMI or Recovery states. |
| 6 | I | Interrupt Enable | If set, Interrupts are enabled. |
| 11:7 | S[4:0] | State | Indicates state of long multi-cycle instructions (e.g. push*, pop*, blk*). Enables shorter interrupt latency. |

TABLE 5-continued

| Bit | Flag | Name | Description |
|---|---|---|---|
| 15:12 | P[3:0] | Priority | Indicates: Priority level for Interrupts; ErrorPval for Error Exceptions; Enables Break and SingleStep behaviour in User mode. |

Z, N, C, and V are condition flags which are modified as instructions are executed, in dependence on the type of instruction. For example, the carry versions of the add, subtract and compare instructions update the Z flag as follows: If (result=0) and (Z=1), set Z=1. Otherwise set Z=0. Hence, if (Z=0) before the instruction, then Z will always be 0 after the instruction (regardless of the instruction result). This is particularly useful for 32-bit arithmetic.

The M[1:0] bits are 'Mode' bits which are used to control the operating mode of the processor. The use of these bits is described in more detail in the section entitled 'Operating Modes and Operating States' below.

The I bit is an 'Interrupt Enable' flag for enabling or disabling Maskable Interrupts. When the I bit is set Maskable Interrupts are enabled and when the I bit is clear Maskable Interrupts are disabled. It will be appreciated that Non-Maskable Interrupts (NMIs) cannot be disabled by software. The I bit is cleared when an Interrupt occurs but can be set to re-enable Maskable Interrupts by the software handler if required.

When an Exception or Interrupt event is taken, in addition to the information which is pushed to the stack (via a context push), the value of the I-bit (Maskable Interrupt enable bit) before the exception/interrupt event occurred is copied to the C (carry) bit. This functionality is described in greater detail in the patent application filed on the same date and having the Agent reference: P32694; the contents of which are incorporated by reference.

The S[4:0] bits are 'State' bits which may be used to track the position in a 'multi-part' instruction (e.g. having several 'Atoms') such as a push, push.i, pop, pop.ret or blk*instruction when it is suspended part-way due to an Interrupt. This allows the instruction to be resumed from substantially the Interrupt position for completion after the Interrupt is serviced. One advantage of this suspend/resume mechanism is the provision of faster Interrupt response times.

The interpretation of the 'Priority' bits P[3:0] depends on the operating mode (or state) as set out in Table 6. In Table 6 the 'fimode instruction value' column refers to a value returned when the fimode (flags and info mode) instruction is executed (a value which depends on FLAGS[M1, M0] and INFO[R, NL]). The fimode instruction can be used in any mode/state to find out the current mode/state.

TABLE 6

| fimode instruction value | Mode/State | Meaning of P[3:0] |
|---|---|---|
| 0 | Supervisor | ErrorPval indicates different sources of a particular Error Exception. In this mode, the processor will accept any Maskable Interrupt if FLAGS[I] = 1. |
| 1 | Interrupt | Priority is automatically set by the IVC (Interrupt Vector Controller) to indicate the priority level of Maskable Interrupts: 0 is processed first (highest priority) 15 is processed last (lowest priority) In this mode, the processor will not accept another Maskable Interrupt unless FLAGS[I] = 1 and the new Interrupt has a higher priority (lower P number). |
| 2 | Trusted | Reserved. In this mode, the processor will accept any Maskable Interrupt if FLAGS[I] = 1. |
| 3 | User | P[0] = Break = B bit. If set and the processor is in User Mode, a break as a result of a brk instruction or the BRK registers will throw the Break Exception. P[1] = Single Step = T bit. If set, each User Mode instruction that is executed will throw the SingleStep Exception. P[3:2] = reserved. In this mode, the processor will accept any Maskable Interrupt if FLAGS[I] = 1. |
| 4 | Recovery | ErrorPval indicates different sources of a particular Error Exception. In this state, the processor will not accept any Maskable Interrupts (they are held in the pool). |
| 5 | NMI | In this state, the processor will not accept any Interrupts (they are held in the pool). |

P[3:0] may be set manually by an operating system (in a privileged mode) such that P[0] will be interpreted as a break flag 'B' (Break) and P[1] as a SingleStep flag 'T' when the processor returns to User mode.

When SingleStep is flagged, a SingleStep Exception is triggered after every User Mode instruction (unless that instruction has itself caused another Exception, e.g. DivideByZero) which transfers execution to Trusted mode whilst maintaining use of the same stack (Stack1). Hence, this supports remote debugging and single stepping of User Mode applications.

The Priority bits P[3:0] may be set automatically to an error indication value ('ErrorPval') as part of the context push for an Error Exception to Supervisor mode or Recovery state. The Error handler can then take different actions depending upon the ErrorPval. ErrorPval is 0 for all Errors except: NullPointer; AlignError; MMUDataError; and MMUUserDataError. For these Errors ErrorPval provides an indication of where the Error occurred as shown in Table 7.

TABLE 7

| ErrorPval | Meaning |
|---|---|
| 0 | Error occurred at any other point. |
| 1 | Error occurred during context push. |
| 2 | Error occurred during rtie. |

Hence, a corresponding Error handler may be designed to perform different actions for different values of ErrorPval.

The Priority bits P[3:0] may also be set automatically to a priority as part of the Event entry sequence for a Maskable Interrupt to Interrupt mode.

When in a Privileged mode, the entire FLAGS register can be modified by executing the movr2s ('move register to special') instruction. The movs2r ('move special to register') instruction allows the FLAGS register to be read. The mov.1.*, mov.2.* and mov.4.*('move 1/2/4 bit*') instructions can be executed in Privileged modes. They enable specific Flags bits to be read and written.

When an Event occurs, certain bits in the FLAGS register are automatically updated. In the case of Exceptions the mode (M) bits are generally updated. In the case of Interrupts the Mode (M), Priority (P) and Interrupt Enable (I) bits are generally updated. The other bits remain unchanged.

INFO Register

The INFO register is a read-only register (from the point of view of software) the contents of which are set out in Table 8.

TABLE 8

| Bit | Bit Ref | Name | Description |
|---|---|---|---|
| 0 | K0 | Stack0-Enable | Set to 1 by a successful write to SP0 (StackPointer0) with movr2a.32. Once set to 1, it cannot be set back to 0. Interrupts (NMIs and MIs) cannot be processed until K0 = 1. If not processed immediately, they are held in the interrupt pool until K0 = 1. When K0 goes to 1, the XAP will process the highest priority Interrupt waiting in the pool (does not depend on the sequence in which the Interrupts arrived). |

TABLE 8-continued

| Bit | Bit Ref | Name | Description |
|---|---|---|---|
| | | | Exceptions cannot be processed when K0 = 0, because XAP can't do a Context Push until Stack0 is initialised. If an Exception occurs when K0 = 0, XAP generates a Soft Reset.<br>Any XAP attempt to read or write Stack0 memory (i.e address relative to SP0) when K0 = 0, causes a Soft Reset. The instruction is completed and registers updated before the Soft Reset. However, memory writes are prevented.<br>SIF memory reads and writes are unaware of whether the memory region is part of Stack0, so are not affected by K0. |
| 1 | K1 | Stack1-Enable | Set to 1 by a successful write to SP1 (StackPointer1) with movr2a.32 if K0 = 1. If K0 = 0, the movr2a.32 will update SP1 but will leave K1 at 0. This means that K1 can only be set to 1 after K0 has been set to 1. Once set to 1, it cannot be set back to 0.<br>Any XAP attempt to read or write Stack1 memory (i.e address relative to SP1) when K1 = 0, causes a Soft Reset. The instruction is completed and registers updated before the Soft Reset. However, memory writes are prevented.<br>SIF debug memory reads and writes are unaware of whether the memory region is part of the Stack1, so are not affected by K1. |
| 3:2 | | | FREE |
| 4 | NL | NMI-Lock | 0 = not in NMI state.<br>1 = in NMI state.<br>Set to 1 when an NMI is accepted and started.<br>Set to 0 by rtie.<br>When INFO[NL] = 1:<br>Interrupts (NMI and enabled MI) are not accepted but held in the interrupt pool for later.<br>Service and Error Exceptions cause a Soft Reset. |
| 5 | R | Recovery | INFO[NL, R]:<br>00 = not in Recovery state.<br>01 = in Recovery state.<br>10 = not in Recovery state.<br>11 = not in Recovery state.<br>Set to 1 when an Error Exception occurs in Supervisor or Interrupt mode.<br>Set to 0 by rtie unless INFO[NL] = 1 (in which case INFO[R] is not changed).<br>In Recovery state:<br>NMI Interrupts are still accepted.<br>MI Interrupts are not accepted but held in the interrupt pool for later.<br>Service and Error Exceptions cause a Soft Reset. |
| 7:6 | | | FREE |
| 8 | SR | Soft-Reset | Set to 1 after a Soft Reset.<br>A bug-free program should never cause a Soft Reset, so this bit should always be 0. If the programmer sees that this bit is 1, they know that there has been 1 or more Soft Resets since the XAP received a Hard Reset. This tells them that there is a software bug that needs to be investigated. |
| 15:9 | | | FREE |

The INFO register is cleared to 0 after a Hard Reset and set to 0x100 after a Soft Reset (i.e. setting the 'Soft-Reset' or 'SR' bit to 1). The INFO register can be read by using the privileged movs2r ('move special to register') instruction (in a Privileged mode) or by the SIF. However, if a privileged movr2s ('move register to special') instruction is used in an attempt to explicitly write to the INFO register, the instruction is executed, but the register is not updated.

The processor is configured to set the K0 and K1 bits to indicate initialisation of the SP0 register and SP1 register respectively. The use of these bits, in the context of initialisation, is described in more detail in the section entitled 'Stack Pointer Initialisation' below.

The K0 bit is also used by the processor as an 'NMI-Enable' or 'NE' bit which must be set before Interrupts (Non-Maskable or Maskable) are enabled. Of course, Maskable Interrupts can be further delayed by leaving FLAGS[I] at 0, but Non-Maskable Interrupts (NMIs) cannot be delayed once the K0 bit is set. Use of an 'NE' bit is described in more detail in PCT/GB2007/001323 which is incorporated herein by reference.

The processor sets the NL ('NMI-Lock') bit to indicate operation in the NMI operating state when a Non-Maskable Interrupt event occurs. The NMI-Lock bit is used to effectively prevent (or 'lock') any further NMIs from being taken until the NMI handler for the Event has completed and executed an rtie instruction which causes the processor to clear the NL bit thereby 'unlocking' NMIs.

The R ('Recovery') bit is set by the processor to indicate operation in the Recovery operating state after a corresponding Error event.

The SR ('Soft Reset') bit is set by the processor after a Soft Reset event occurs to indicate, in operation, that one or more Soft Resets have occurred since the most recent Hard Reset (which clears the INFO register and hence the SR bit).

The section entitled 'Operating Modes and Operating States' describes the use of certain bits of the INFO register in more detail.

BRKE Register

The contents of the BRKE register are set out in Table 9. The BRKE register is cleared to 0 at reset.

TABLE 9

| Bit(s) | Flag(s) | Name | Description |
| --- | --- | --- | --- |
| 0, 4, 8, 12 | W0, W1, W2, W3 | Write | If set, an instruction making a memory write to the address matching the corresponding BRKn register will halt the processor after the instruction has executed. The PC will point at the next instruction to be executed. |
| 1, 5, 9, 13 | R0, R1, R2, R3 | Read | Similar to above, but for memory reads. |
| 2, 6, 10, 14 | E0, E1, E2, E3 | Execute | If set, an instruction fetch from the address matching the corresponding BRKn register will halt the processor before the instruction is executed. The PC remains at the address of the instruction that caused the break. |

The movs2r and movr2s instructions allow read and write access to the BRKE register.

Stacks and Stack Pointers

SP1 is the current Stack Pointer register (SP) when the processor is in either User mode or Trusted mode and therefore Stack1 may be thought of as the current stack when the processor is operating in either of these modes. Hence, any instruction such as a subroutine call (e.g. bsr.i, bsr.m) or a push or a pop that implicitly uses the value in the Stack Pointer register to compute memory addresses, will use the value in the SP1 register.

SP0, on the other hand is the current Stack Pointer register when the processor is operating in the Interrupt mode, Supervisor mode, Recovery state, or the NMI state. In this case, therefore, Stack0 may be thought of as the current stack, and those instructions that implicitly use the value in the Stack Pointer register to compute memory addresses will use the value in the SP0 register.

Stack0 may be considered as a 'Privileged' stack or an 'operating system' or kernel stack for non-task code. Stack0 may be used for various operations including, for example, Supervisor mode event handlers, Maskable and Non-Maskable Interrupt handlers, Recovery handlers, and Hard and Soft Reset handlers.

Stack1, on the other hand, may be considered as a 'General' stack (for access by both privileged and non-privileged code) or a 'task', 'process', or 'thread' stack for task-code. Stack1 may be used, for example, for non-privileged application code running in User mode, and for Service handlers in Trusted mode.

The two stacks grow downwards as the handlers use them to store more temporary variables.

Multiple Stacks

It will be appreciated that although the processor is described with reference to two stacks (Stack0 and Stack1), any number of stacks may be provided in memory in dependence on the size of memory available for them. For example, in an exemplary system, a plurality of task stacks may be provided, each for a different 'task', 'process' or 'thread' with SP1 being set to point to the stack ('Stack1') corresponding to the current task being processed. Similarly, a system designer may define a plurality of privileged stacks in memory with SP0, being set to point to the privileged stack in current use. It will be appreciated, however, that the configuration of the processor advantageously negates the need for implementation of multiple privileged sacks.

Stack Pointer Initialisation

As described above, the K0 and K1 bits of the INFO register are used to indicate initialisation of the SP0 register and SP1 register respectively. This allows the processor to effectively prevent programs from erroneously using the Stacks (Stack0, Stack1) before, the relevant Stack Pointers (SP0, SP1) have been initialised. Specifically, programs are prevented from accessing Stack0 until the K0 bit is set. Similarly, programs are prevented from accessing Stack1 until SP1 is initialised. If any attempt is made to use SP0 or SP1 when they are uninitialised (i.e. when K0 or K1 respectively are 0) then the processor performs a Soft Reset.

The processor also provides an 'interlock' which inhibits the K1 bit from being set before the K0 bit has been set. If an attempt is made to initialise SP1 before SP0, the K1 bit will not be set to 1, and so the initialisation is in effect ignored. This effectively prevents programs from being run in a convenient manner in either the User or the Trusted mode until both SP0 and SP1 are initialised, because basic facilities such as subroutine calls, which use the stack, cannot be used. In effect, this strongly encourages early initialisation of the stack pointers in the reset handlers so that facilities that use the stack, such as subroutine calls, can be used. This early initialisation of the stack pointers has the additional beneficial effect of enabling NMIs relatively early. Thus, the interlock beneficially prevents software from initialising SP1, and then switching to User mode or Trusted mode to run large amounts of code using Stack 1, while SP0 is still uninitialised and NMIs are therefore still disabled.

Operating Modes and Operating States

The operating mode or state of the processor affects which instructions can be used and which of the two Stack Pointers SP0 and SP1 is used as the current stack pointer SP, as shown in Table 10.

TABLE 10

| Mode/State | Instructions | Stack (Stack pointer) |
| --- | --- | --- |
| User mode | User | Stack1 (SP1) |
| Trusted mode | User and Privileged | Stack1 (SP1) |
| Supervisor mode | User and Privileged | Stack0 (SP0) |
| Interrupt mode | User and Privileged | Stack0 (SP0) |
| Recovery state | User and Privileged | Stack0 (SP0) |
| NMI state | User and Privileged | Stack0 (SP0) |

As seen in Table 10, of the four modes of operation, three are Privileged modes (Trusted, Supervisor, Interrupt) in which Privileged or non-Privileged (User) code can be run, and one is a non-Privileged mode (User mode) in which only non-Privileged (User) code is permitted to run. The two states (NMI and Recovery) are both Privileged.

Transition to any operating mode from any Privileged mode may be initiated directly by using an appropriately formulated privileged instruction to write to the mode bits of the FLAGS register. Transition into and out of an operating state, however, is restricted to a controlled set of situations, and cannot be initiated directly by a privileged mode instruction attempting to write directly to the NL and R bits of the INFO register.

As mentioned previously, when operating in either the User mode or the Trusted mode, the processor uses Stack Pointer SP1 as the current stack pointer (and hence Stack1). Thus, in Trusted mode the 'Task' stack of the current task (Stack1) is used rather than Stack0.

The operating mode or state of the processor is dependant on the contents of the FLAGS and INFO registers as illustrated in Table 11. Specifically, the two 'M' bits of the FLAGS register (FLAGS[M1:0]) control the operating mode, and the NL (NMI-Lock) and R (Recovery) bits of the INFO register (INFO[NL] and INFO[R]) control the operating state.

TABLE 11

| INFO[NL] | INFO[R] | FLAGS[M] | Mode/State | Code | fimode instruction value |
|---|---|---|---|---|---|
| 0 | 0 | 3 [11] | User mode | U | 3 |
| 0 | 0 | 2 [10] | Trusted mode | T | 2 |
| 0 | 0 | 0 [00] | Supervisor mode | S | 0 |
| 0 | 0 | 1 [01] | Interrupt mode | I | 1 |
| 0 | 1 | x | Recovery state | R | 4 |
| 1 | x | x | NMI state | N | 5 |

Operation in one of the two operating states takes precedence over operation in one of the four operating modes. Hence, when the operating state bits (INFO[NL] and INFO[R]) indicate the processor is in an operating state, the operating mode bits are effectively over-ridden/ignored and the processor is 'forced' into the NMI or Recovery state. Similarly, if both the NL and R bits are set, NL takes precedence, and the processor operates in the NMI state. Hence, Non-Maskable Interrupts will be serviced when the processor is in the Recovery state, just as in any of the four operating modes.

The 'M' bits (M[1:0]) of the FLAGS register are software writable when the processor is operating in the Privileged modes. The M[1:0] bits are also changed when Events cause a transition to a new mode, or when a return from Interrupt/Exception (rtie) instruction returns the processor to a different mode.

Contrastingly, the INFO register can be read by Privileged code, but is not software writable. Hence, the NL and R bits can only be changed in a controlled set of situations, for example: by Events that cause a transition to the Recovery state or the NMI state; by an rtie instruction returning from those states; or by a Hard or Soft Reset.

Mode and State Transitions

Transitions between different modes and/or states are caused by the occurrence of Events (Interrupts or Exceptions) as illustrated in FIG. 5, Table 12, Table 13 and Table 14.

Both Interrupts and Exceptions involve a context switch, where (with the exception of resets) the processor state is pushed to the stack (of the destination mode) and an appropriate Event handler is run. In the normal course of operation, the handler ultimately restores the original processor state with the rtie instruction.

TABLE 12

| | | | From | | | | | |
|---|---|---|---|---|---|---|---|---|
| | | | Mode | | | | State | |
| | | | User | Trusted | Supervisor | Interrupt | Recovery | NMI |
| To | Mode | User | | | | | | |
| | | Trusted | Service | Service | | | | |
| | | Supervisor | Hard Reset Error | Hard Reset Soft Reset Error | Hard Reset Soft Reset Service | Hard Reset Soft Reset | Hard Reset Soft Reset | Hard Reset Soft Reset |
| | | Interrupt | Interrupt | Interrupt | Interrupt | Interrupt Service | | |
| | State | Recovery | | | Error | Error | | |
| | | NMI | NMI | NMI | NMI | NMI | NMI | |

In addition to the Events illustrated in Table 12, the movr2s ('move register to special'), mov.2.i ('move, 2-bit, immediate') and rtie ('return from Interrupt/Exception') instructions may be used to change from any privileged mode to any other mode.

Table 13 is more detailed and shows which Events take priority over a current mode (and therefore switch processing to service the new Event). The table conveys similar information to Table 14 below but shows Events within modes rather than modes within Events.

TABLE 13

| Current Mode | | New Event | | Action |
|---|---|---|---|---|
| INFO [NL, R] | FLAGS M[1:0] | Type | Condition | (In all cases, other than resets, a context push is also performed) |
| 00 | User | Exception | Service (syscall, break, singlestep) | Change to Trusted mode. Branch to selected Exception vector address. |
| | | | Reset | Change to Supervisor mode. |
| | | | Error | Branch to selected Exception vector address. |
| | | Interrupt | NMI | Set NMI-Lock = 1. Branch to selected Interrupt vector address (NMI). |
| | | | MI && I = 1 | Change to Interrupt mode. Branch to selected Interrupt vector address. |
| 00 | Trusted | Exception | syscall Service | Stay in Trusted mode. Branch to selected Exception vector address. |
| | | | Reset | Change to Supervisor mode. |
| | | | Error | Branch to selected Exception vector address. |
| | | Interrupt | NMI | Set NMI-Lock = 1. Branch to selected Interrupt vector address (NMI). |
| | | | MI && I = 1 | Change to Interrupt mode. Branch to selected Interrupt vector address. |
| 00 | Supervisor | Exception | Reset syscall Service | Stay in Supervisor mode. Branch to selected Exception vector address. |
| | | | Error | Change to Recovery state. Set Recovery = INFO[R] = 1. Branch to selected Exception vector address. |
| | | Interrupt | NMI | Set NMI-Lock = 1. Branch to selected Interrupt vector address (NMI). |
| | | | MI && I = 1 | Change to Interrupt mode. Branch to selected Interrupt vector address. |
| 00 | Interrupt | Exception | Reset | Change to Supervisor mode. Branch to selected Exception vector address. |
| | | | Error | Change to Recovery state. Set Recovery = INFO[R] = 1. Branch to selected Exception vector address. |
| | | | syscall Service | Stay in Interrupt mode. Branch to selected Exception vector address. |
| | | Interrupt | NMI | Set NMI-Lock = 1. Branch to selected Interrupt vector address (NMI). |
| | | | MI && I = 1 && NewP < CurrentP | Stay in Interrupt mode. Branch to selected Interrupt vector address. |
| 01 Recovery state | Any | Exception | Reset | Change to Supervisor mode. Branch to selected Exception vector address. |
| | | | syscall Service Error | Soft Reset. |

TABLE 13-continued

| Current Mode | | Action | | |
|---|---|---|---|---|
| INFO | FLAGS | New Event | | (In all cases, other than resets, a context |
| [NL, R] | M[1:0] | Type | Condition | push is also performed) |
| | | Interrupt | NMI | Set NMI-Lock = 1. Branch to selected Interrupt vector address (NMI). |
| 1x NMI state | Any | Exception | Reset | Change to Supervisor mode. Branch to selected Exception vector address. |
| | | | syscall Service Error | Soft Reset. |

Interrupt Induced Transitions

As seen in FIG. 5 and the associated tables when a Maskable Interrupt is serviced from an operating mode, the processor moves into (or remains in) the Interrupt mode.

If a Non-Maskable Interrupt occurs in any of the operating modes, or the recovery state, the processor transitions to the NMI operating state to service the NMI (by setting NL=1, and the mode bits of the FLAGS register remain the same). While the NMI is being serviced, it cannot be interrupted (not even by another NMI). Interrupts which occur while the processor is servicing an NMI are therefore pooled and are serviced after the handler returns to the original mode or state. Operation of the processor on Interrupt is described in more detail below in the section entitled 'Event Handling' and in particular the sub-section entitled 'Interrupts'.

Exception Induced Transitions

The processor's response when an Exception occurs is dependent on the type of Exception and the mode or State in which it occurs.

Resets: Resets (of either type) cause the processor to transition to (or remain in) Supervisor mode. At reset, therefore, the processor starts executing code in Supervisor mode. The characteristics of the two reset mechanisms are described in more detail in the sub-sections entitled 'Hard Reset' and 'Soft Rest' below.

Services: A Service Event initiated from User mode causes a transition to Trusted mode whereas Services in any of the Privileged modes result in no mode transition. Services from either of the operating states cause a Soft Reset.

Errors: Errors occurring in either the User or Trusted mode cause a transition to Supervisor mode. Errors occurring in the Supervisor or Interrupt modes on the other hand result in the INFO[R] bit being set and hence a transition to the Recovery state. Errors from the NMI or Recovery state cause a Soft Reset.

Operation of the processor on Exception is described in more detail below in the section entitled 'Event Handling' and in particular the sub-section entitled 'Exceptions'.

'Simultaneous' Events

Interrupts and Exception events can happen substantially simultaneously (on the same clock cycle). Hence the processor is provided with a prioritisation scheme as shown in Table 14 which specifies which should be serviced first. Thus, when an Event is detected, the processor deals with it in accordance with the prioritisation scheme, processing the highest priority pending Event only. In the case of Exceptions only the highest priority Exception is processed (any other Exception is discarded). Interrupts, which are not the highest priority pending Event, are not discarded, but are instead kept in an interrupt pool (in the Interrupt Vector Controller) for subsequent processing.

In Table 14 the Event priority is organised in groups in which the priority decreases from the highest priority Events (at the top of the table) to the lowest priority Events (at the bottom). Soft Reset characteristics are described in more detail below in the sub-section entitled 'Soft Reset'. Table 14 shows modes within Events which is, in effect, the way the hardware sees the information this contrasts with Table 13 above which conveys similar information as Events within modes.

TABLE 14

| Group | Comment | Event | Source Mode | Resultant Action |
|---|---|---|---|---|
| Hard Reset Exception | | Rst_xap input signal = 1 | Any | See Hard Reset description below |
| Stack0 errors | SP0 not initialised, so INFO[K0] = 0, so Stack0 not available. | Error Exception | Any | SoftReset |
| | | Service Exception | SIRN | SoftReset |
| | | Attempt to read or write Stack0. | SIRN | SoftReset |
| Stack1 errors | SP1 not initialised, so INFO[K1] = 0, so Stack1 not available. | Service Exception | UT | SoftReset |
| | | Attempt to read or write Stack1. | UT | SoftReset |
| Context push memory Exceptions. From current | Interrupts and Exceptions start by pushing (writing) the current context to the Stack. This may in turn cause a memory | MMU: data_error = 1 | UT | MMUDataError_S |
| | | | SIRN | SoftReset |
| | | Alignment error (to Address register). This can't actually happen in XAP5 | UT | AlignError_S |
| | | | SIRN | SoftReset |

TABLE 14-continued

| Group | Comment | Event | Source Mode | Resultant Action |
|---|---|---|---|---|
| instruction. | Exception. | because of F-bit. | | |
| | | Attempt to read or write address 0 (=NullPointer). | UT<br>SIRN | NullPointer_S<br>SoftReset |
| Non-memory Exceptions. From current instruction. | Only one of these Exceptions can occur in a given clock cycle, so the order is not significant. However, implementations should follow this order. | softreset instruction | TSIRN | SoftReset |
| | | brk instruction | U | Break_T |
| | | Attempt to execute a privileged instruction | U | PrivInstruction_S |
| | | Divide by zero | UT<br>SI<br>RN | DivideByZero_S<br>DivideByZero_R<br>SoftReset |
| | | Instruction error | UT<br>SI<br>RN | InstructionError_S<br>InstructionError_R<br>SoftReset |
| | | Unknown instruction | UT<br>SI<br>RN | UnknownInstruction_S<br>UnknownInstruction_R<br>SoftReset |
| | | syscall.i 0, #imm<br>syscall.r 0, Rs | UT<br>SI<br>RN | SysCall0_T<br>SysCall0_SI<br>SoftReset |
| | | syscall.i 1, #imm<br>syscall.r 1, Rs | UT<br>SI<br>RN | SysCall1_T<br>SysCall1_SI<br>SoftReset |
| | | syscall.i 2, #imm<br>syscall.r 2, Rs | UT<br>SI<br>RN | SysCall2_T<br>SysCall2_SI<br>SoftReset |
| | | syscall.i 3, #imm<br>syscall.r 3, Rs | UT<br>SI<br>RN | SysCall3_T<br>SysCall3_SI<br>SoftReset |
| Data Read/Write memory Exceptions. From current instruction. | These Exceptions can happen when the processor reads or writes data from or to memory. These can be caused by errors in the following instructions:<br>ld*<br>st*<br>push*<br>pop*<br>swap*<br>blk*<br>bsr*<br>bra.m<br>bra.i (0, Ra)<br>rtie | MMU: user_data_error = 1 | U | MMUUserDataError_S |
| | | MMU: data_error = 1 | UT<br>SI<br>RN | MMUDataError_S<br>MMUDataError_R<br>SoftReset |
| | | Alignment error (to Address Register) | UT<br>SI<br>RN | AlignError_S<br>AlignError_R<br>SoftReset |
| | | Attempt to read or write address 0(=NullPointer). | UT<br>SI<br>RN | NullPointer_S<br>NullPointer_R<br>SoftReset |
| | | Hardware break (Read or Write break address).<br>% flags[p0] =<br>% flags[b] = 1<br>& (R or W = 1) | Us | Break_T |
| Inter-Instruction events | | Non-Maskable Interrupt (NMI) | UTSIR | Context push to NMI state (set INFO[NL] = 1) and service NMI. |
| | | Maskable Interrupt when FLAGS[I] = 1 | UTS | Context push to Interrupt mode and service MI. |
| | | | I | If new Interrupt is higher priority than the current one: Context push, stay in Interrupt mode, service MI. |
| | | % flags[p1] =<br>% flags[t] = 1 | U | SingleStep_T |
| Instruction Fetch memory Exceptions. From next instruction. | These Exceptions can happen when the XAP reads an instruction from memory. | MMU: user_prog_error = 1 | U | MMUUserProgError_S |
| | | MMU: prog_error = 1 | UT<br>SI<br>RN | MMUProgError_S<br>MMUProgError_R<br>SoftReset |
| | | Hardware break (Execute break address).<br>% flags[p0] =<br>% flags[b] = 1<br>& (E = 1) | U | Break_T |

Modes, States and Stacks—Summary

Figure 7:
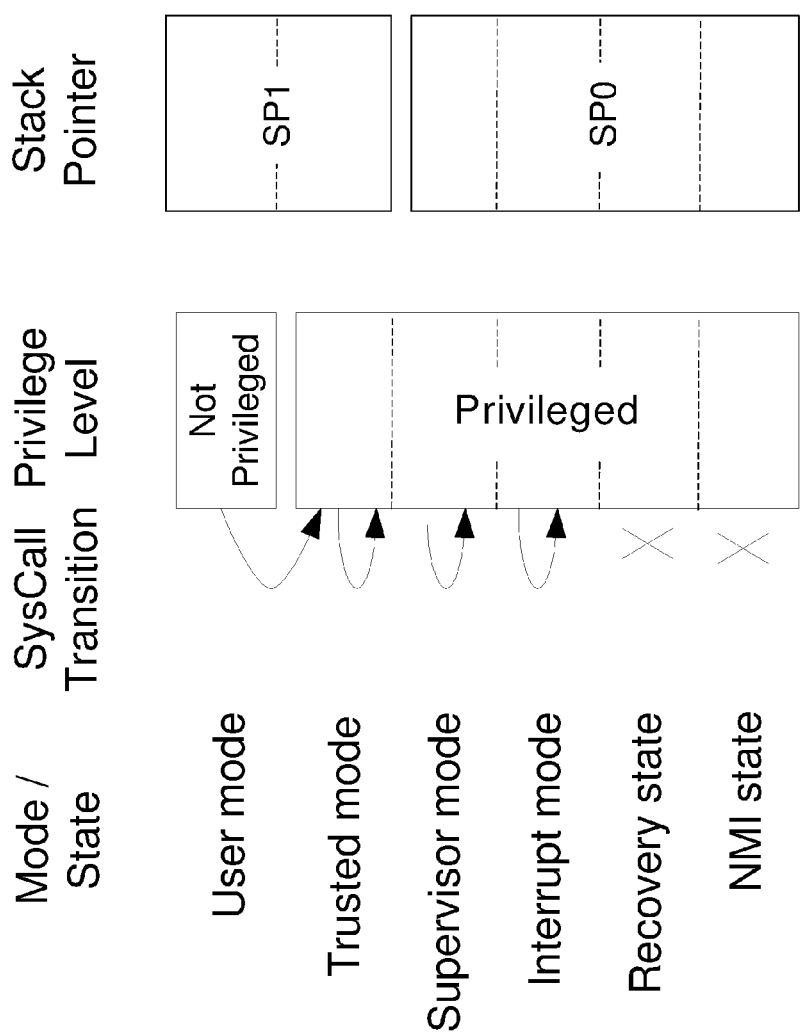
FIG. 7 is a diagram further illustrating stack usage for the modes and operating states of FIG. 5.

The modes and states configuration of the processor is summarised in FIGS. 6 and 7. As seen in FIGS. 6 and 7, the processor is provided with two "banked" Stack Pointer registers SP0 and SP1. Hence, stack operations either for subroutine calls, or for instructions which implicitly use the stack (e.g. push and pop) may use whichever is the "current" Stack Pointer (SP), based on the current mode or state. Stack operations that push context to a stack when taking an Event use the stack that will be the default stack after the Event is processed (i.e. the stack associated with the destination mode).

SP1 is used both when the processor is in User mode (which is a non-Privileged mode) and when the processor is in a single Privileged mode (Trusted mode). SP0, on the other hand, is used by all other modes and states. Hence, System Calls (and other Service requests) that occur in User mode cause a transition directly from User mode to Trusted mode and push context and return address information to SP1. All other Events push context and return information to SP0.

The die instruction which is used to return from an Event (Interrupt or Exception) pops the context including the return address from the current stack (which is not always Stack 0).

One of the main distinctions between operating modes and operating states is that modes are controlled by the FLAGS register, which is software writable in Privileged modes whereas states are controlled by the INFO register which is read only. The mode bits of the FLAGS register may also be changed when Events take the processor to a new mode, or when an "rtie" instruction returns the processor to a different mode. The NL and R bits may be changed when Events take the processor to the associated state, when an "rtie" instruction returns the processor from that state, or on a reset.

Code running in the User mode may be inhibited from affecting the operation of code running in the other modes, and some instructions (Privileged instructions) are prohibited. For example, in a typical system, the MMU may be used to restrict access by user code to a particular memory area. Code running in User mode is also inhibited from accessing certain registers. It can, for example, access registers R0-R7 and the stack to which SP1 is pointing, but can only perform a limited set of operations on the FLAGS register. User mode is therefore suitable for running 'untrusted' application code.

Thus, the User Mode may be used to run thread/task/process code that does not need to be Privileged. However, the User mode code can invoke privileged code running in Trusted Mode to perform specific tasks for it (using SysCall instructions). User Mode and Trusted Mode both use the same Stack Pointer register (SP1) rather than different stack pointers. This facilitates greater efficiency when passing parameters, and allows the use of a single stack for both the non-privileged and privileged code running on behalf of a specific thread/task/process.

Code running in Trusted mode, on the other hand, is allowed to execute all instructions and can control the activity of tasks running in User mode. Trusted mode is therefore suitable for operating system services. Trusted mode may therefore be used to run Privileged code working at a direct request of a particular thread's User code, in response to a Service Exception such as, for example, a System Call, Single Step, or Run-to-Breakpoint (BRK).

Like Trusted mode code, code running in Supervisor mode is also Privileged (and hence allowed to execute all instructions) and can therefore control the activity of tasks running in the User mode. Supervisor mode is typically entered after a reset or when an Error occurs in User mode or Trusted mode (or when explicitly requested by writing to the mode bits in a privileged mode). Supervisor mode is particularly suitable for operating system services.

Supervisor mode may therefore be used for inter alia running a task scheduler (which may also be run in Interrupt mode), for Virtual Memory management, and/or for Error Handling for Errors in tasks (i.e. Errors in User mode or Trusted mode code).

Interrupt mode is entered on a hardware interrupt and may be used for running Interrupt handlers (for Maskable Interrupts) and/or for running a task scheduler (which may also be run in Supervisor mode).

Recovery state is entered when Errors occur in Supervisor or Interrupt mode and may be used for running short fast handlers to allow efficient recovery from Errors. The Recovery state thus represents a safety net for catching Errors in Supervisor mode code and Maskable Interrupt handlers. It provides the opportunity to log Errors, attempt recovery or controlled shutdown or restart.

The NMI state is entered when an NMI occurs in any other mode/state and may be used for running handlers for NMI Events.

The provision of the NMI operating state which, unlike the operating modes, cannot be entered by execution of Privileged instructions can help to ensure that software cannot be used to intentionally or inadvertently block or disable processing of Non-Maskable Interrupts. If software were allowed to switch to the NMI state, NMIs could effectively (and undesirably) be artificially blocked because they are not re-entrant. Thus, NMIs are only blocked when a genuine NMI Event occurs and the processor transitions into the NMI state in which the Event mechanism guarantees that the NMI handler will be executed. The presence of the Recovery state (rather than having a Recovery mode) minimises the width required for the M[1:0] field and discourages use of Recovery state for anything other than Error handling, thereby promoting good software practice.

Simple applications may therefore execute in Supervisor mode and make no use of User and Trusted mode. Interrupt mode is used for Interrupt handlers. Error handlers are likely to simply halt the processor or ignore the Error. For more complex applications, however, it is likely that most of the processing will occur in User mode whilst services are provided by an operating system that will generally run in Supervisor, Trusted and/or Interrupt mode.

By adding MMU restrictions, the processor can allow an operating system to restrict user code to only accessing memory allocated to it. User code will be unable to affect the operation of the rest of the operating system.

Event Handling

All Events other than Resets are handled in a consistent manner. Specifically, when an Event (other than a Reset) occurs, the processor saves the current context by pushing the address of the next instruction to be executed (the return address) and various registers to the stack associated with the destination mode or state. This causes a transition to the destination mode or state (which may be the current mode or state).

The location of the corresponding entry in the Vector Table is then determined to allow the Program Counter register to be loaded with the vector (i.e. the start address) of the appropriate Event handler from the Vector Table for subsequent execution of the associated Event handler.

Resets do not push any information to the stack, but do write initialisation values (Hard Reset) or initialisation values and debug information (Soft Reset) to selected registers. Resets are described in more detail in the sub-sections entitled 'Hard Reset' and 'Soft Reset' below.

Event Atoms

Events may only take place at certain times during execution of an instruction. Generally, for example, an Event can only occur after one instruction has completed and before processing begins on the next instruction (i.e. an instruction boundary). However, for some instructions (e.g. the push instruction) Events may occur at specific points during processing before an instruction boundary is reached. These instructions may thus be conceptually subdivided into smaller units or 'Atoms' at the boundaries of which Exceptions or Interrupts may occur. For a few instructions (e.g. div*, divrem* and rem*), Interrupts (but not Exceptions) can also occur at specific points within the constituent Atom(s). The Atoms may thus be conceptually subdivided into smaller units or 'Nucleons' at the boundaries of which only Interrupts may occur.

Most Instructions contain only one Atom and most Atoms only contain one Nucleon. Atoms are effectively provided for by the introduction of intra-instruction Exception/Interrupt checks. Similarly, Nucleons are effectively provided for by the introduction of Interrupt checks at intra-Atom boundaries. These intra-Atom boundaries are, in effect, instruction-abort points. If an intra-Atom Interrupt is detected, it is processed and the associated Atom is aborted. When the handler finishes it returns to the beginning of the Atom (to restart execution). To keep track of intra-instruction processing, and to allow a return to the correct Atom after an Event, the FLAGS[S] bits are incremented when each Atomic boundary is reached but are cleared at the next instruction boundary.

The sub-division of instructions into Atoms and Nucleons therefore allows intra-instruction Interrupt and Exception checks.

The different activities that may occur at the various types of boundary are illustrated in Table 15.

TABLE 15

|  | Instruction boundary | Atom boundary | Intra-Atom Boundary |
|---|---|---|---|
| Visible register reads | 0 or more | 0 or more | 0 |
| Visible register writes | 0 or more | 0 or more | 0 |
| Memory reads | 0 or more | 0 or more | 0 |
| Memory writes | 0 or more | 0 or more | 0 |
| SIF check ? | Yes | No | No |
| Exception check ? | Yes | Yes | No |
| Single-step ? | Yes | Yes | No |
| Interrupt check ? | Yes | Yes | Yes |
| Return after rtie ? | Yes | Yes | No |
| FLAGS[S] updates | Set to 0 at end of multi-atom instructions and at end of context push | Increment by 1 | No |

In the case of Events, the processor's 'Event entry sequence' from detecting the Event, through to starting the associated Event handler, is 'atomic' comprising exactly one Atom (which contains exactly one Nucleon). The Event entry sequence cannot therefore be interrupted by another Event until the associated Event handler has started (but possibly before commencement of the first handler instruction). For example, if an Interrupt occurs during the atomic time window for an Event 'A', it may be processed at the start of the software handler for Event 'A' (even before the first instruction is executed).

Context Push

Figure 8:
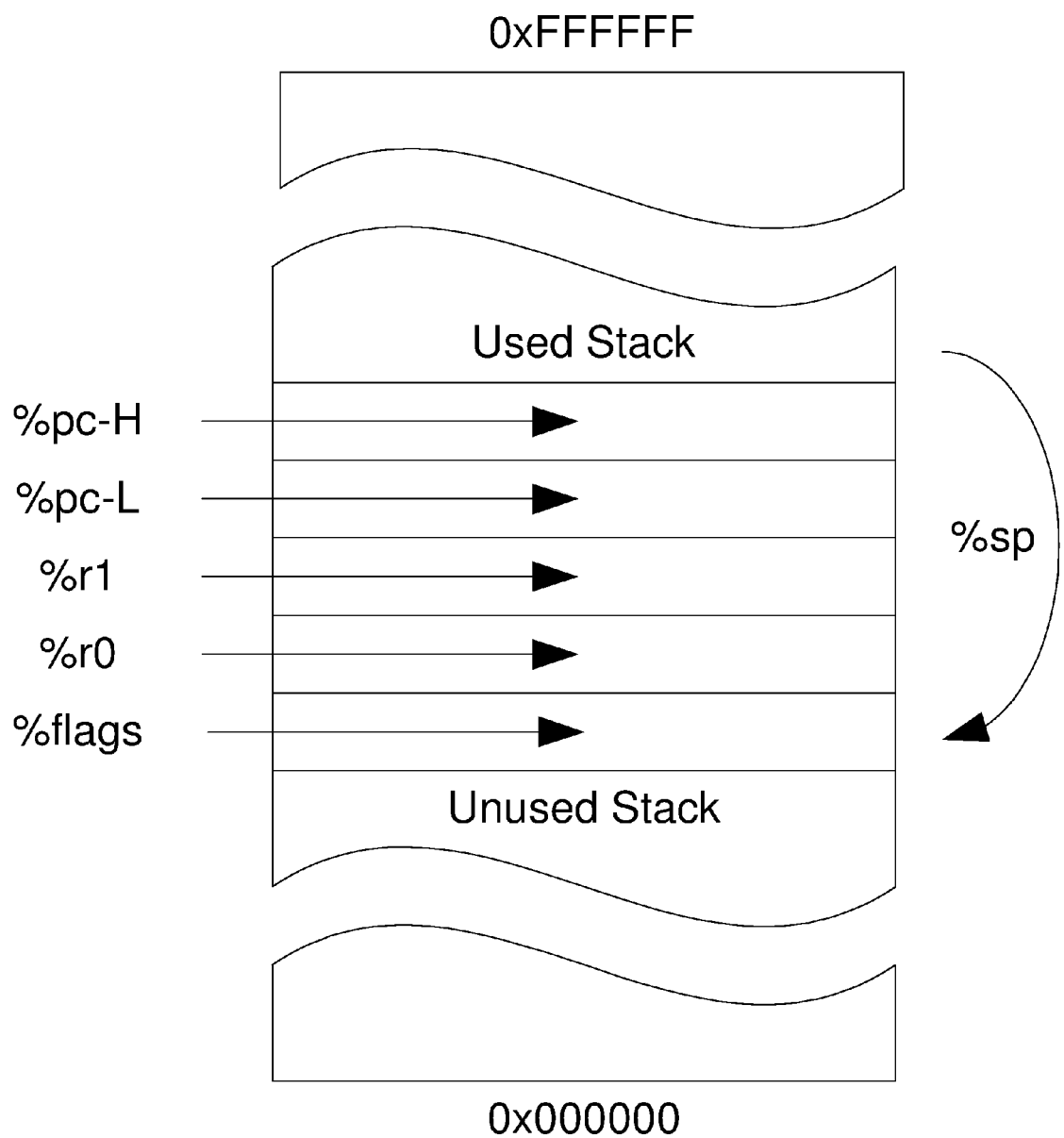
FIG. 8 is a diagram illustrating a context push to a stack when an Event occurs.

When an Interrupt or Exception occurs, the processor does a context-switch. It stores the current processor state by pushing five words to the Stack (Stack0 or Stack1) of the destination mode or state as shown in FIG. 8. Specifically, the Program Counter PC (% pc-H and % pc-L), registers R0 and R1 (% r0 and % r1), and the contents of the FLAGS register (% flags) are all pushed to the destination stack. The FLAGS register is then updated and the processor branches to the address identified by the vector for that particular Event after which the software handler will start executing.

Thus, the context stored on the stack consists of {PC, R1, R0, FLAGS}. These values will be popped from the stack to their respective registers when the Event handler ends by executing the rtie instruction. This means that the PC value stored on the stack is for the instruction to be executed immediately after the rtie. The {R1, R0, FLAGS} values stored on the stack are those in the respective registers at the point that the Event is detected. For Exceptions this occurs at atom-boundaries whereas for Interrupts this is at Nucleon-boundaries.

Thus, when there is an Interrupt or Exception, the current state is pushed onto the new stack (in the Context Push) and the processor transitions to a new operating mode (or state). It will be appreciated that when the NL or R bit of the INFO register is set the processor is in one of the two operating states and the operating mode bits of the FLAGS register are effectively ignored.

Interrupts

Interrupts are generally serviced promptly by the processor. Nevertheless, the Events which trigger Interrupts are not all necessarily of equivalent urgency.

Accordingly, each Interrupt is accompanied by an interrupt number (0 to 31) and also an interrupt priority (0=highest to 15=lowest). The new Interrupt Number, Interrupt Priority, NL and I Flags determine whether the Interrupt is processed immediately, or kept in the pool for later processing. Priorities are only meaningful for Maskable Interrupts—not for Exceptions or NMIs.

Interrupt handlers use Stack0 and the associated Stack Pointer (SP0). Hence, Interrupts cannot be serviced until SP0 has been initialised (i.e. until after K0=1). If an Interrupt occurs when K0=0, it is delayed (held in the IVC) and is not serviced until K0=1.

Maskable Interrupts are nestable and an NMI can pre-empt Maskable Interrupt handlers. NMI handlers cannot generally be pre-empted. Nested Interrupts can be achieved by re-enabling Interrupts in an Interrupt handler. Maskable Interrupts can then be interrupted by Maskable Interrupts of greater importance (lower priority number) and by NMIs. Services can be invoked from an MI handler, and will cause a Soft Reset if requested in an NMI handler.

When a Maskable Interrupt is serviced, it causes the processor to switch to Interrupt Mode and sets FLAGS[I] to 0. Privileged mode software can set FLAGS[I] directly, for example, with a mov.1.i ('move 1-bit immediate') or mov.1.r ('move 1-bit register') instruction (setting the single bit immediately or to a value stored in a register) or by using the movr2s (write to a special register) instruction. The required processing in Interrupt mode is completed with an rtie instruction that returns to the original mode where the Interrupt occurred.

Maskable Interrupts are disabled (FLAGS[I]=0) on all Exceptions (Resets, Services, Errors) and Interrupts (MI and NMI). It is good practice to have Maskable Interrupts disabled at the start of any Interrupt or Exception handler as it prevents further Maskable Interrupts from being serviced until the first one has been serviced to a safe state. Consequently, all Interrupt and Exception events automatically set FLAGS[I]=0.

When a Non-Maskable Interrupt is serviced, it causes the processor to switch to the NMI state. It does not change the value of FLAGS[M]. The required processing in the NMI state is completed with an rtie instruction that returns to the original mode or state where the NMI occurred. While an NMI is being serviced, it cannot be interrupted. Interrupts which are requested while the processor core is doing this are remembered and are serviced after the handler returns. If an Exception occurs in an NMI handler, a Soft Reset is triggered.

Exceptions

Exceptions that switch to Supervisor or Interrupt mode use Stack0 and SP0 and cannot be serviced before SP0 is initialised (i.e. while K0=0). Exceptions that switch to Trusted mode use Stack1 and SP1 and cannot be serviced before SP0 and SP1 are initialised (i.e. while K1=0). If an Exception occurs before the required K0 or K1 bit has been set to 1 a Soft Reset is generated.

When a Reset Exception occurs in any mode, the processor switches to Supervisor mode. When a Service Exception occurs in User mode the processor switches to Trusted mode. When an Error Exception occurs in User or Trusted mode, the processor switches to Supervisor mode. When an Error Exception occurs in Supervisor or Interrupt mode the processor switches to the Recovery state. When a Service Exception occurs in a Privileged mode, the processor stays in that same mode. When an Exception is detected the current context is pushed to the new Stack.

System Call instructions (syscall.i, syscall.r) are the standard way for a User mode application to call an operating system function (running in Trusted mode). System Call instructions can also be used from the Privileged modes in which case the mode is not changed. In all cases, the same stack is used before and after a SysCall. Hence, the same library functions can be used from any mode. However, when in a Privileged mode, it is more efficient to do a direct function call to the relevant part of the operating system, than to generate an Exception by using the SysCall instructions.

The system call Exceptions (syscall.i, syscall.r) are nestable. The SysCall instructions should not, however, be used in an NMI handler or Recovery handler. If they are they will simply initiate a Soft Reset.

The processor hardware monitors behaviour to detect Errors (e.g. a null pointer (attempt to access address 0) or a divide by zero. An Error detected in User or Trusted mode generates an Exception which transfers to Supervisor mode. An Error detected in Supervisor or Interrupt modes generates an Exception which causes a transition to the Recovery state. An Error detected in the NMI state or the Recovery state generates a Soft Reset which transfers control back to Supervisor mode.

Service and Error handlers should end with an die instruction which will pop the current Stack to return to the original mode. This is not required for the Reset handlers.

Event Errors

The Event process can itself generate Errors (referred to herein as 'Event Errors'). Event Errors can occur, for example: if the memory accesses required to push context information to the stack attempt to use an uninitialised Stack Pointer register; if the memory accesses, or accesses to read the Vector Table entry, are to an invalid address (MMU signals a data_error); if the memory accesses attempt to access location 0 (NullPointer error); or if the Vector Table entry violates the processor's alignment rules for instruction addresses (Alignment error). Event Errors indicate that the Event process has failed to save context correctly or failed to initiate execution of an associated Event handler.

As a general rule, on detection of an Event Error the current Event processing is abandoned and a Soft Reset event is initiated, which records debug information (in appropriate registers) and invokes a Soft Reset handler without attempting to push any (further) information to the stack. This is particularly useful if the cause of the problem is a stack overflow into an invalid memory address.

The Soft Reset Event handler is configured not to raise further Error events (and ignores any Errors signalled by the MMU) to ensure the Event processing stops so that a debugger attached to the microprocessor can take control of it (discussed in more detail in the section entitled 'SIP Interface'). Since most Events attempt to push context to Stack0, invoking Soft Reset after an Event Error reflects the fact that something may have gone fundamentally wrong with the software system, and that a possible cause is that Stack0 (the 'OS' or 'Privileged' stack) is not at a usable address.

As an Exception to the general rule, a Service Request (e.g. a SysCall) made in either User Mode or Trusted Mode will invoke an Event process which will attempt to push context information to Stack1 and cause a transition to the Trusted Mode. If this results in an Event Error, the processor abandons the Event process that generated the Event Error and initiates a new Error event that attempts to push context to Stack0 and cause a transition to Supervisor mode. This Exception prevents User mode code from being able to deliberately or unintentionally generate a Soft Reset by setting the Stack1 Stack Pointer (SP1) to an illegal address (or just above an illegal address) and then invoking a Service Request.

All Events disable (further) Maskable Interrupts by setting FLAGS[I]=0 (which may be subsequently re-enabled by the software handler). This effectively allows the time-window of the Event atom during which Maskable Interrupts cannot be serviced to be lengthened until Maskable Interrupts are enabled. However, The Event time window for NMIs cannot be lengthened. If an NMI request occurs during a context push, it will be processed immediately after the Event atom (before the first instruction in the software handler).

As described previously, in operation the processor will not do a context push until the new Stack has been initialised by writing a start value to SP0 or to SP1 thereby setting the K0 or K1 bits (in INFO register) to 1. Events that result in a transition to Supervisor or Interrupt modes will not be processed until K0=1. Similarly, Events that result in a transition to Trusted mode cannot be processed until K1=1. Events which occur before this will either be delayed (in the case of Interrupts) or will cause a Soft Reset.

Returning from Interrupts and Exceptions

The rtie (Return from Interrupt, Exception) instruction is used to return from all Exceptions and Interrupts. It can only be executed in the Privileged modes or states. It pops the context from the current Stack (Stack1 in Trusted mode, Stack0 in Supervisor and Interrupt modes and Recovery and NMI states). From all modes and states (Trusted, Supervisor, Interrupt, Recovery, NMI), it carries out the same operation, which is:

Load FLAGS from the current stack.
Load R0 from the current stack.
Load R1 from the current stack.
Load PC from the current stack.
Clear the INFO[NL] bit when executed in NMI state
Clear the INFO[R] bit when executed in Recovery state A "null" Interrupt handler can be created using a single die instruction, to return immediately by restoring R0, R1, FLAGS and PC, disabling NMI state or Recovery state, and then returning to the original code (being executed when the Event originally happened).

Hence the die instruction will always clear the NL bit if it is set thereby returning operation of the processor from the NMI state (which takes precedence regardless of the setting of the 'M' bits of the FLAGS register or the 'R' bit of the INFO register). If the NL bit is not set, and the R bit is set, then it will clear the R bit to return operation of the processor from the Recovery state. However, if both NL and R are set, then it only the NL bit is cleared, leaving the R bit set thereby returning the processor from the NMI state to the Recovery state. In this case the mode indicated in the context popped from the current stack is ignored because the R bit, which takes precedence, remains set.

This behaviour helps to ensure that returning from a NMI handler or Recovery handler works correctly, including the case where an NMI has occurred during a Recovery handler.

Note that in most cases, the context information popped from the stack specifies the mode the processor will be in following an die instruction. However, if both NL and R are set, the die will cause the processor to switch from NMI state to Recovery state, regardless of the mode specified in the context information on the stack.

Fimode Signals

The 'fimode' value (indicating the current mode or state) is signalled from the processor to the MMU to indicate the current privilege level. The MMU uses these 'fimode' signals to identify which mode or state the processor is in and hence the privilege level associated with the current memory access. For example, an exemplary MMU design can be configured to allow different access rules for: data access by User mode; data access by a Privileged mode; program access by User mode; or program access by a Privileged mode.

Each Event entry sequence consists of some memory writes (e.g. a push of PC, R1, R0, FLAGS) followed by some memory reads (Vector for software handler, first handler instruction). The timing of the mode (or state) change within a context push is therefore important. The processor therefore sets the fimode value signalled to the MMU using appropriate timing to ensure the correct operating mode (or state) and hence Privilege level is used throughout the Event Entry sequence as shown in Table 16.

privileged area of memory which cannot be accessed in User mode (which is non-privileged) the fimode value is changed to the Trusted mode value before the vector for the Service handler is read from memory.

An Interrupt or Exception handler will generally end with an rtie instruction (which can only be executed in Privileged mode or state) which will pop the five words originally pushed to the current Stack to restore the processor to the original condition before the Interrupt or Exception event occurred. The processor stays in the original mode or state (the fimode value remains unchanged) until the end of the context pop initiated by the rtie (whether it is from Stack1 or from Stack0). After the context pop the operating mode or state changes (the fimode value is set) to the mode represented by the M bits of the FLAGS register just popped from the stack or possibly the Recovery state if the R bit is set. The new mode or state is then used for the first instruction fetch of the address just popped from the stack.

In certain circumstances a double context push may be generated which is, nevertheless, treated as atomic.

A double context push may occur, for example, when a program running in the User or Trusted mode initiates a Service Exception (SysCall, SingleStep or Break) which results in a first context push to Trusted mode on Stack1. At the end of the first context push (after all memory writes and reads), the processor will check if any Errors occurred during the first context push (for example MMUUserDataError, MMUDataError, NullPointer, or AlignError). If an Error is found to have occurred during the first context push, the processor does not update the PC register, but instead initiates a second context push, this time to Stack0 because the Error Exception results in a transition to Supervisor mode, for the Error that occurred during the first context push.

At the end of the second context push (after all memory writes and reads), the processor will check if any Errors occurred during the second context push (for example MMUDataError, NullPointer, AlignError). If an Error is found to have occurred, the processor will initiate a Soft

TABLE 16

| Source Mode | Source Stack | Destination Mode | Destination Stack | Event Type | Mode during Context Push |
|---|---|---|---|---|---|
| U | Stack1 | T | Stack1 | Service | Stay in User mode for all memory writes. Change to Trusted mode before first memory read. |
| T | Stack1 | T | Stack1 | Service | Stay in Trusted mode throughout the Event entry sequence. |
| UT | Stack1 | SIN | Stack0 | Error MI NMI | Change to Destination mode before first memory write. i.e change to Privileged mode at start of context push. |
| SIR | Stack0 | SIRN | Stack0 | Service Error MI NMI | Stay in Source mode for all memory writes. Change to Destination mode before first memory read. i.e stay in Privileged mode throughout context push. |

As seen in Table 16, when a Service Exception (SysCall, SingleStep, or Break) initiates a transition from User to Trusted mode, the fimode value remains at the User mode value throughout the memory writes. This is important because User mode code can change SP1 to any value, so it is important that the writes to Stack1 are correctly checked to be within allowed addresses for User mode memory access. However, since the vectors are generally stored in a Reset. If the second context push did not cause an Error, however, the processor simply proceeds to the relevant Error handler in Supervisor mode.

In the 'double context' push scenario, the timing of the fimode signals from the processor to the MMU is as follows. At the start of the first context push fimode is set to the value for either User or Trusted Mode (depending on which mode the Service Exception was initiated from). The fimode value remains at this value until the last memory write has completed after which fimode is set to the value for Trusted mode before the processor reads the Vector for the Service handler start address. If an Error is found to have occurred during the memory writes or reads, the processor initiates the second context push. At the start of the second context push fimode is set to the value for Supervisor mode and this value is retained throughout.

Hard Reset

After a hardware reset (or Hard Reset), the processor enters a predetermined state, for example a state in which the registers are cleared, the processor is configured as follows:

R0-R7=0
PC=0
SP0=SP1=0
VP=0
FLAGS=0:
INFO=0:
BRKE=0
BRK0=BRK1=BRK2=BRK3=0

Program Running

On Hard Reset, the processor first reads from a predetermined address (for example, 0xFFFFFC) and loads the contents of that address into the Vector Pointer register (VP). The processor then reads from the address in the VP register plus a non-zero offset (HardResetOffset) to retrieve the HardResetVector. The HardResetVector is then loaded into the Program Counter register (PC) so the processor branches to this address.

The processor is configured such that it never needs to read address 0 so that Null Pointer checking can always be enabled in all modes. This is one benefit of the HardReset vector being stored at an address (for example VP+0x04) offset from VP.

The processor is configured such that during Hard Reset all Exceptions are ignored. Since the Hard Reset atom cannot generate any Exceptions there cannot be an Event pending (Exception or Interrupt) before the first instruction of the software handler. This means that any pending SIF instruction will be executed which effectively guarantees that the SIF can take control after a Hard Reset even with uninitialised memory (thus avoiding a bootstrap problem).

Soft Reset

The processor is also configured for completing a Soft Reset which is intended for recovery from error conditions. For example, a Soft Reset can occur from either the Recovery or the NMI operating state, if an Error Exception or Service Exception occurs.

A Soft Reset may also occur from any mode/state if an attempt is made to access Stack0 before SP0 has been initialised or if an attempt is made to access Stack1 before SP1 has been initialised.

A Soft Reset may occur from Supervisor or Interrupt mode, or from Recovery or NMI state, if an Error occurs during a context-push (i.e. to Stack0). Errors to Stack1 should not generally cause a Soft Reset. Instead they should invoke the relevant Error handler in Supervisor mode (using Stack0).

In this case there is no global asynchronous hardware reset. Whilst some registers are synchronously set to new values to record the cause of the Soft Reset and enable a re-start, other registers are left with the value at the time of the Error. Hence, the Reset handler has sufficient information to discover the cause of the Soft Reset, which may be logged to facilitate debug.

After a Soft Reset the BRK0 register is set to equal the value of the PC at the time of the Error and the BRK1 register is set to equal the contents of the VP register at time of the Error. If the Soft Reset is caused by an instruction, the PC value stored in the BRK0 register will be that of the offending instruction. As in the case of a Hard Reset, during a Soft Reset the VP register is reloaded from a predetermined address (for example, 0xFFFFFC). The PC Register is set to equal the absolute address of the Soft Reset handler (loaded from an offset from the new VP value).

The absolute address of the Soft Reset handler loaded into PC is generated as follows. Firstly, the processor reads from a predetermined address (for example, 0xFFFFFC) and the result is loaded into the VP register. Then the processor reads from the address in the VP register plus a non-zero offset (SoftResetOffset) to retrieve the SoftResetVector. The SoftResetVector is then loaded into the Program Counter register (PC) so the processor branches to this address.

The Soft Reset (SR) bit of the INFO register is set to 1 (e.g. INFO=0x0100) to maintain an indicator that a Soft Reset has occurred. The R0 register is set to equal the contents of the FLAGS register at the time of the Error and the R1 register is set to equal the code of the Error that caused the Soft Reset. The R2 register is set to equal the contents of the BRKE register at the time of the Error.

The FLAGS and BRKE registers are cleared (as for Hard Reset), but the R3 to R7, SP0, SP1, BRK2 and BRK3 registers are left un-changed (i.e. they retain their value at the time of the Error). Thus, the Soft Reset handler is able to log this information so a program can analyse this information. Whenever the processor generates a Soft Reset, it also causes the 'error' output signal to go high for 1 clock cycle.

In one possible example, the Error code stored in the R1 register may be formed as shown in Table 17.

TABLE 17

| Bit | Name | Description | | |
|---|---|---|---|---|
| 4:0 | Event No . . . that caused the Soft Reset. | Event No is within Event Type. Event No can have values 0-31. Details of Event No values for each of the 8 Event Types are given below. | | |
| 7:5 | | FREE | | |
| 10:8 | Event Type . . . that caused the Soft Reset. | Event Type | Description | Event No |
| | | 0 | Exception with initialised StackPointer (K0 = 1 or K1 = 1) | Exception Number (0-31). Uses exception numbers (2, 19-31). See Vector table. |
| | | 1 | Interrupt with initialised StackPointer0 (K0 = 1) | Interrupt Number (0-31). This is not used in practice at present. |

TABLE 17-continued

| Bit | Name | Description | | |
|---|---|---|---|---|
| | | 2 | Stack0 errors | 0 Memory error during context push to Stack0 (when K0 = 1). This can only happen from MMUDataError_* or NullPointer_* Exceptions. |
| | | | | 1 Exception to Stack0 when SP0 is not initialised (K0 = 0). |
| | | | | 2 SP-relative instruction to Stack0 when SP0 is not initialised (K0 = 0). |
| | | | | 3-31 FREE |
| | | 3 | Stack1 errors | 0 Memory error during context push to Stack1 (when K1 = 1). This can only happen from MMUDataError_* or NullPointer_* Exceptions. |
| | | | | 1 Exception to Stack1 when SP1 is not initialised (K1 = 0). |
| | | | | 2 SP-relative instruction to Stack1 when SP1 is not initialised (K1 = 0). |
| | | | | 3-31 FREE |
| | | 4-7 | FREE | |
| 11 | Soft-Reset | INFO[SR] before the error. | | |
| 12 | Stack0-Enable | INFO[K0] before the error. | | |
| 13 | Stack1-Enable | INFO[K1] before the error. | | |
| 14 | NMI-Lock | INFO[NL] before the error. | | |
| 15 | Recovery | INFO[R] before the error. | | |

The processor is configured such that during Soft Reset all Exceptions are ignored. Since the Soft Reset atom cannot generate any Exceptions there will not be an Event pending (Exception or Interrupt) before the first instruction of the corresponding software handler. Hence, any pending SIF instruction will be executed which effectively guarantees that the SIF can take control after reset even with uninitialised memory (thereby avoiding a bootstrap problem).

SIF Interface

As described previously the processor is provided with a SIF interface (in one example with 4 or 5 external pins) which allows the user to debug software and to read or write the registers, memory and IO registers of all the on-chip SIF Processors. The SIF is also used for data acquisition and analogue production test of the ASIC. All memory and IO register reads and writes are performed in a non-invasive manner. The processors continue to operate in functional mode without having their timing affected.

The SIF interface is designed for flexibility. For example, the default SIF provided with the XAP5 processor can support up to 8 on-chip SIF Processors. These can all be XAP5 or can be a variety of different processors. Each can have its own or shared address space. The SIF can be accessed by an external serial (xSIF) interface or by an internal parallel (iSIF) interface.

The processor architecture helps to ensure that the SIF interface can generally take control of the processor, for debugging purposes, in any situation, for example, in the presence of any programming errors, or when powering up a system with an uninitialised or corrupted memory system.

When a specific debug action is requested over the interface, the SIF debug interface is configured to take control of the processor when the processor is at an instruction boundary (i.e. the point where the processor is ready to commence execution of a new instruction).

An instruction boundary occurs, for example: at the completion of the Hard Reset Sequence; at the completion of the Soft Reset Sequence; and at the completion of all Event entry sequences that follow the execution of an instruction.

The Event entry sequences may comprise:
Service Exception entry for the SysCall or brk (debug Break) instruction (or Soft Reset sequence if in the NMI operating state or Recovery State);
Service Exception entry if in the User operating mode and the P0 or P1 flags bits are set to request a SingleStep or Break event;
Error Exception entry if the instruction caused an Error (a Soft Reset sequence occurs instead if the processor is in NMI state or Recovery State);
Interrupt entry sequence if an NMI or enabled MI request of appropriate priority is pending; and/or
Soft Reset Exception entry if any of the Event entry sequences themselves cause a Stack error (attempt to use a non-initialised Stack Pointer) or a Context Push Memory Exception.

However, Event entry sequences can themselves generate Errors. For example, Event entry sequences typically push information onto one of the stacks (with the exception of the Hard and Soft Reset Events which do not push any information). This can generate Errors if the Stack Pointers are not initialised, or if the Stack Pointers point to an address to which the MMU forbids memory accesses. Furthermore, Event entry sequences also read the address of the Event handler from the Vector Table. This can generate Errors if the MMU forbids the read access (for example if the VP is pointing to an invalid address); or if the address read from the Vector Table fails to meet alignment rules for instruction addresses.

The ability of Event entry sequences to generate Errors, and for Errors invoke an Event entry sequence, create the possibility of an infinite recursive loop of Event entry sequences which would theoretically prevent an instruction boundary ever being reached. In this undesirable scenario the SIF debug interface could be prevented from ever taking control of the processor.

The processor architecture described herein, however, mitigates the risk of such an infinite loop occurring. The organisation of the different operating modes and states and, in particular, the operation of the transitions from one operating mode or state to another ensure that repeated Errors inevitably lead to Soft Reset after a maximum of three Errors (as described with reference to FIG. 5). Furthermore, the configuration of the Hard Reset and Soft Reset sequences (as described above) such that they do not generate further Exception entry sequences, ensures that if any Errors do occur during a Reset sequence, they are ignored. Therefore, as all Interrupts (including NMIs) are disabled by Hard Reset and Soft Reset, an instruction boundary will always be reached within a small, finite, number of clock cycles, thereby allowing the SIF debug interface to take control of the processor.

For example, in operation, if a memory system is completely uninitialised, or has been corrupted, the Vector Pointer start value (VP_start), which is typically stored in the last word in memory may point to an address at which no memory is mapped. Any attempt to access such an address may therefore be signalled as an Error by the MMU raising an abort. In this case, the Hard Reset or Soft Reset sequence would generate an abort when it attempts to read the address of the appropriate Reset handler from the vector table starting at the address pointed to by VP_start. The Reset sequence ignores this Error, and so completes, providing an instruction boundary, at which point the SIF debug interface can gain control of the processor.

Applications of the Processor

The processing apparatus as described herein provides many benefits and allows for efficient operation of a range of different RTOS (Real Time Operating Systems) and OS (Operating Systems) on a processor core. This is achieved by providing simple and effective mechanisms for maintaining separate Task and Operating System stacks, and related to this, for making efficient Service Requests (e.g. System Calls) to the operating system. System Calls are primarily needed to allow non-Privileged User mode code to call Privileged operating system code running in Trusted mode. System Calls may also be used by Privileged code to make operating system Service requests, which has the advantage of maintaining a single interface into the operating system.

There are many beneficial ways in which software systems could use the Stack Pointers SP1 and SP0. For example, Software is not limited to maintaining just a single stack for each Stack Pointer register. In fact, software may maintain multiple stacks, and associated Stack Pointers, in memory.

Access to the multiple stacks may be achieved using normal load and store operations, for example by first loading a stack pointer from memory into a general purpose register. Software may also load any of the stored stack pointers from memory into the current Stack Pointer (one of SP1 or SP0). Hence, the associated stack in memory will be used as the 'current' stack (Stack1 or Stack0). Similarly, software may save the current Stack Pointer to memory to "release" the Stack Pointer for another use.

Privileged code can explicitly choose to read or write to SP1 or SP0, regardless of which one is the current Stack Pointer which allows, for example, an operating system to set up the stack for a User mode task during a context switch. User mode code, on the other hand, may only manipulate SP1 and not SP0.

As described previously, Privileged mode code can change processor mode directly to any other processor mode. Code running in Trusted mode, for example, can switch operation to Supervisor Mode to change the current Stack Pointer to SP0. It can be seen, therefore, that software has enormous flexibility in how it can structure its use of stacks.

An example of a particularly efficient method for a multi-tasking operating system to structure its use of stacks will now be described, by way of example only with reference to FIG. 9.

Figure 9:
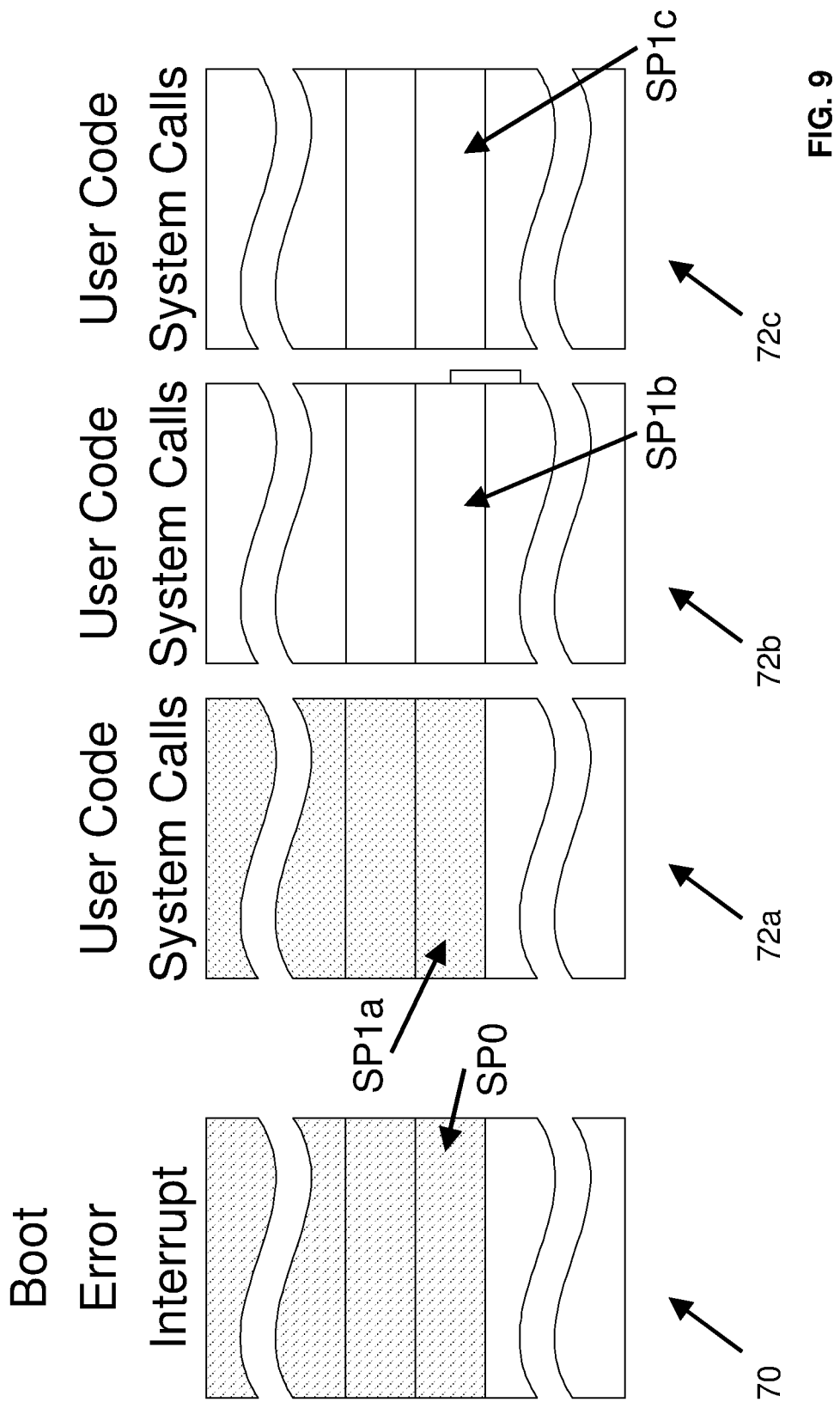
FIG. 9 is a diagram illustrating a stack structure for an exemplary implementation of a multi-tasking operating system using the processor.

In FIG. 9, the operating system uses SP0 to maintain a single persistent Stack0 70 for all operating system stack operations that are not related to any particular thread. This stack (Stack0) will be referred to herein as the OS Stack. The OS stack is used to store the return address and the state when an Event is taken (other than Service Requests made in the User mode or the Trusted mode; and by Event handlers and the OS task scheduler and other OS kernel functions) and for temporary storage needs including subroutine call and return.

The operating system (OS) uses SP1 to maintain a different stack 72*a* to 72*b* for each respective task (TaskA, TaskB, TaskC), each of which will be referred to as a Task Stack. In operation, the OS saves and reloads SP1 when it performs a task context switch to a different task.

The tasks run in User mode (non-Privileged) using the corresponding Task Stack for temporary storage needs (including subroutine call and return). The User mode code can invoke Privileged code that runs in the Trusted mode by using a Service Request as described previously (typically a SysCall instruction). On transition from User mode to the Trusted mode, the current Stack Pointer remains as SP1. The Trusted mode code does not change SP1 to point to a different stack, but rather continues to use the Task Stack of the current task for which it is performing a service.

The Trusted mode code may invoke the OS kernel by invoking a transition to Supervisor mode and then doing a subroutine call or a SysCall. For example, this may be done to initiate inter-task communication (also known as inter-process communication), or to "sleep" the current task (switch it out) until a future Event "wakes" the task. Once in System Mode, these OS kernel tasks use the OS Stack. The task scheduler is part of the OS kernel, and hence it is practical for the designers of the OS kernel to save any return information that is on the OS Stack should a task switch be required.

Based on this example software structure, some of the benefits of the modes and stacks scheme described herein will now be discussed.

Firstly, the scheme allows efficient System Calls because when the processor moves from User mode to Trusted mode in response to a SysCall Instruction, it continues to use the same Stack Pointer register (SP1). This allows the User mode task to place parameters on the stack, and then initiate the System Call. The Trusted mode code can then access the parameters on the stack directly and efficiently.

Secondly, the scheme allows the operating system to perform efficient and rapid task context switch, with only a single stack per task. The software structure ensures that Trusted mode code running to service a request from the Thread puts all of its temporary stack storage, such as subroutine return addresses and local variables for C functions, onto the Thread Stack. It puts nothing onto the OS Stack other than the return context information pushed when an Event is taken.

This avoids a known problem (illustrated in FIGS. 10 to 12) in pre-emptive multi-tasking operating systems which results in the OS having to wait for a System Call to complete before a task context switch can be performed.

Figure 10:
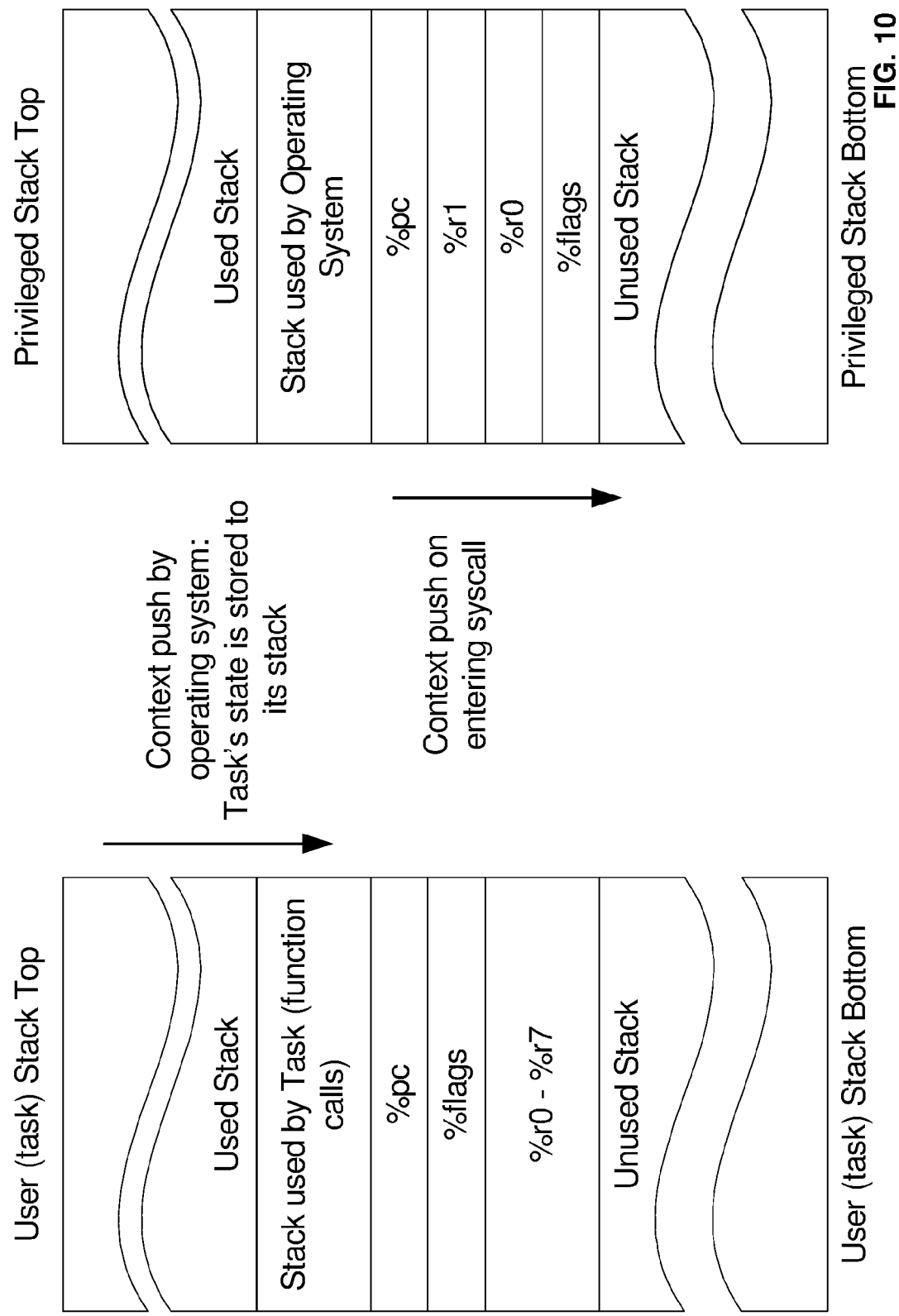
FIGS. 10-12 illustrate operation of a typical stack structure as implemented on a conventional processor.

In FIG. 10, for example, a first task (Task A) has initiated a System Call and its associated context (PC, R0, R1, FLAGS) has been pushed to the 'OS' (or 'Privileged') stack. If a further task (Task B) were to initiate a system call the privileged stack will then contain context information for both Task A and Task B (FIG. 11).

Figure 11:
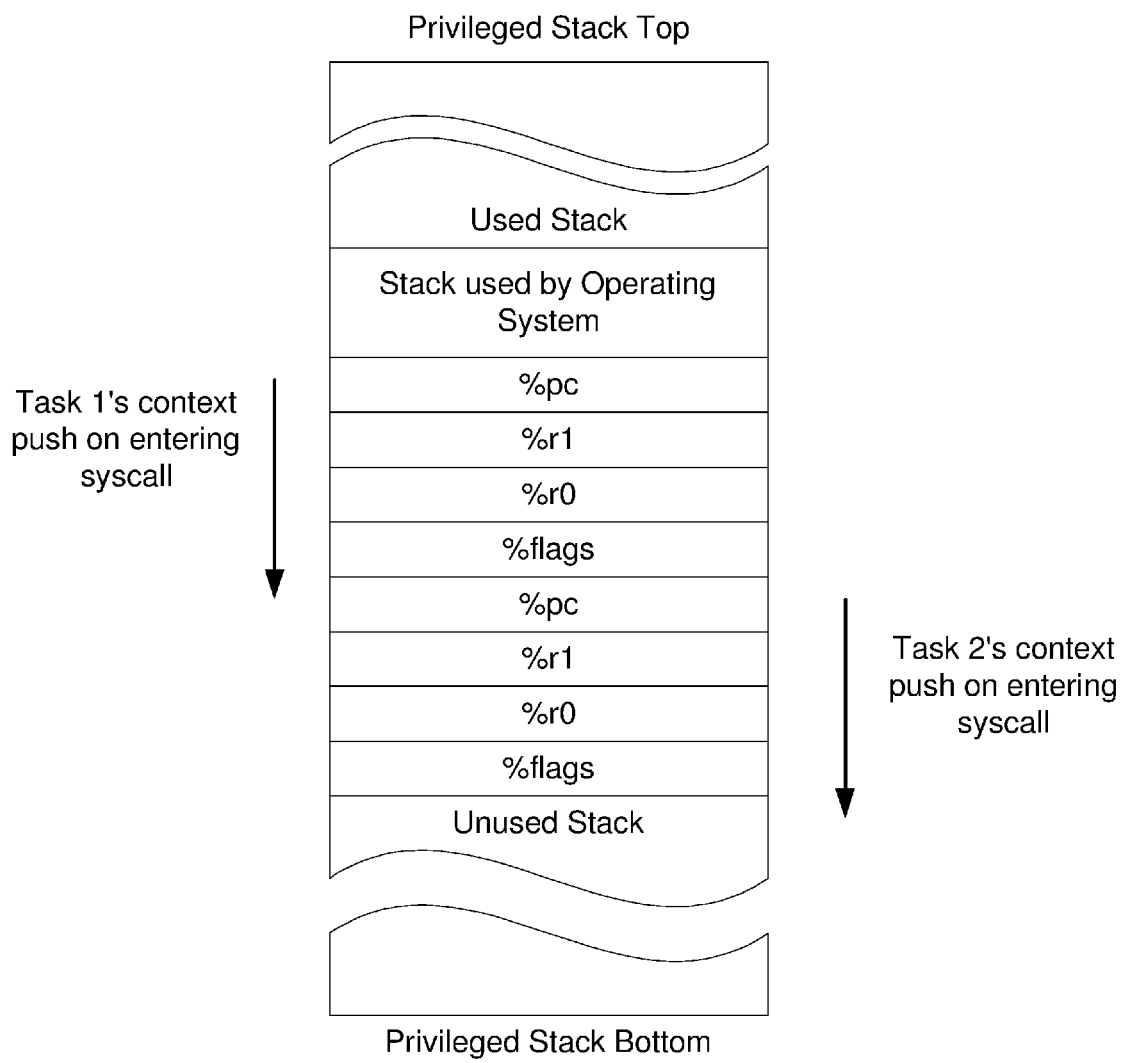
Figure 12:
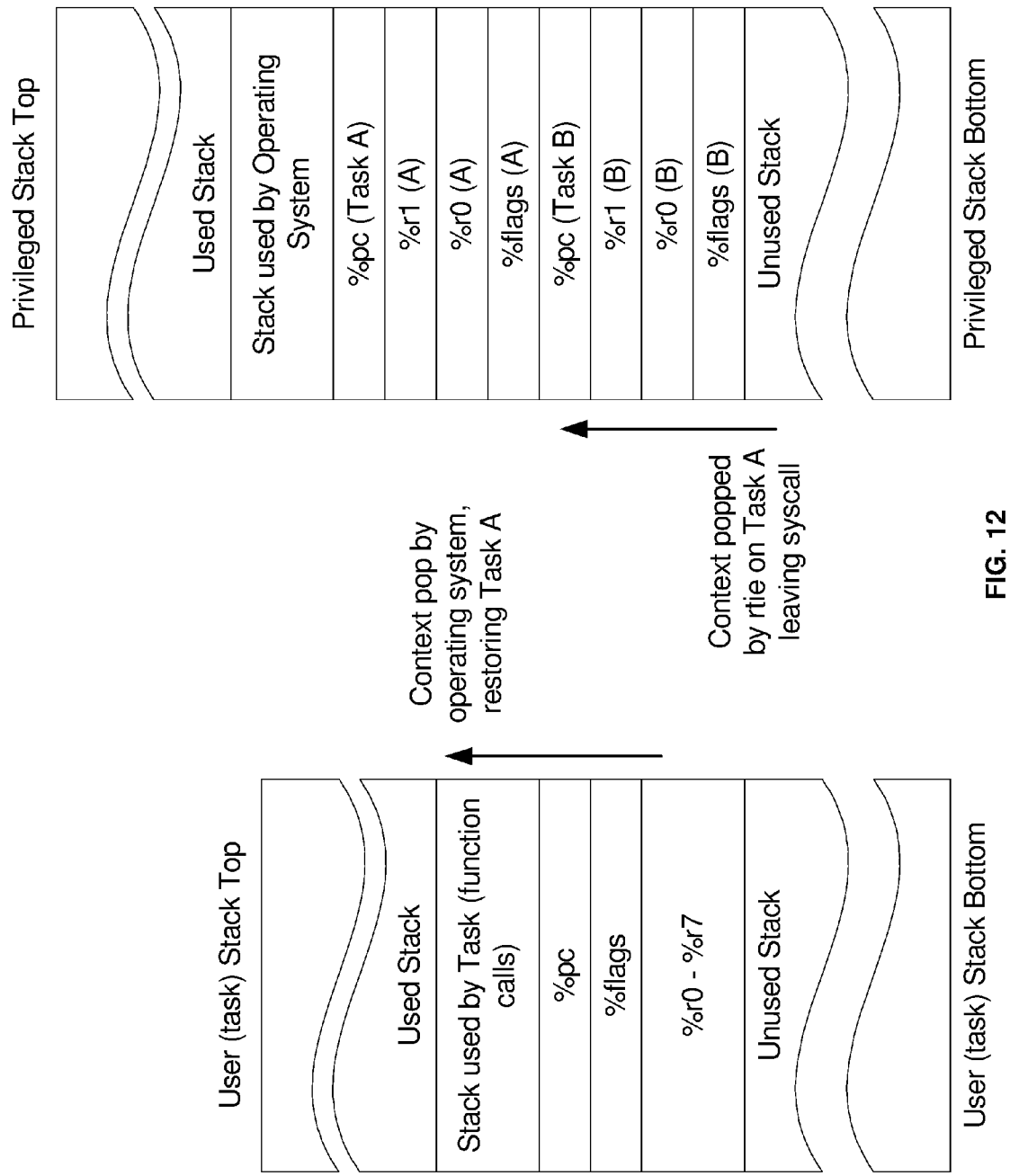

It will be appreciated that whilst FIGS. 10-12 only show the context push information on the Privileged stack, in fact there could be more information for each task on the stack if the Privileged code that implements the SysCall pushes data to the stack or does subroutine calls that push return addresses to the stack. This mixing of information from two tasks on the same stack is a problem because it constrains the order that the tasks can be scheduled. In the example shown in FIG. 12, Task A cannot be re-started by the task scheduler until Task B has removed its data from the privileged mode stack, which will only occur when its system call has completed with an rtie instruction that returns that task to User mode.

In summary, the problem arises if Privileged code running on behalf of a task uses the OS Stack for its temporary storage, and it cannot be determined at the time of desired pre-emption how much task related data is on the OS Stack, or if the cost of moving the task related data somewhere else is too high. By delaying the pre-emption until the System Call is complete, it is guaranteed that no task related data is on the OS Stack at the time of pre-emption. This delay is however undesirable, especially in hard-real-time applications such as engine management, and avoiding the delay is therefore advantageous.

The scheme proposed above avoids this problem by having the privileged code that implements a system call use the same task stack as the User mode code that made the system call. As mentioned above, the return context information, pushed when an Event is taken does go onto the OS stack in this scheme. This does not cause problems, however, because it is a small packet of information, and it is always the same number of bytes on the stack. The task scheduler can save this data in a table indexed by task number, or onto the Task Stack, early in the context switch process.

The scheme also allows simplification of the operating system's task switch code, and saves memory and simplifies the MMU by avoiding the need for two stacks per task. Allocating two stacks has the disadvantage that it often uses more memory, because of minimum allocation sizes supported by the memory management unit, and because the two stacks may not be at maximum depth at the same time. Furthermore, if memory protection is to be implemented, the allocation of two stacks per task requires two memory regions to be allocated for stacks for each Thread, rather than just one as in the exemplary system. This requires a more complex MMU.

System calls (and other Service requests) made in Trusted mode, Interrupt mode, and Supervisor mode, do not change the processor mode. This maintains the consistent rule that the same Stack Pointer register is used before and after a system call. For Trusted mode that is SP1. For Interrupt and Supervisor modes that is SP0. This consistent rule allows the same code sequences to be used for Service requests regardless of the mode of the code that initiated the Service request. Therefore, a Service request handler can always find the Service request parameters on the default stack of the mode that the handler is running in.

Closing Summary

In summary, therefore, in preferred embodiments the processor architecture has the potential to increase system reliability and security by providing mechanisms which assist to:

Maximise the amount of code run in User mode which, being a non-privileged mode, allows the potential effects of programming errors or intentional attacks are limited. When in User Mode, most Errors caused by User mode code cause a transition to Supervisor mode.

Run the majority of remaining code, which is privileged code, in a Trusted mode (where most Errors will cause a transition to Supervisor mode), or in Supervisor mode (where most Errors will cause a transition to Recovery state).

Run a very small amount of code as Event handlers in the NMI state or the Recovery state where Errors will lead directly to a Soft Reset.

The majority of code therefore runs with a "safety net" that Errors cause a transition to Supervisor Mode or Recovery State, where they can be logged, and the system recovered, shut-down, or restarted.

While some information is lost by the overwriting of registers when a Soft Reset occurs in one of the two operating states, information is recorded about the cause of the Error, which can thus be logged, and the system then recovered, shut-down, or restarted according to the software design of the Soft Reset handler.

User mode cannot execute all instructions, is restricted from accessing some registers, and subject to the specific MMU design chosen for a particular chip, and is restricted from accessing Privileged memory areas. The Privileged modes and states (Trusted, Supervisor, and Interrupt Modes; and NMI and Recovery States) can execute all instructions, access all registers (although some bits may be read only), and access all memory, subject to the specific MMU design chosen for a particular chip.

The processor architecture incorporates features that enable efficient operation of a wide range of operating systems of different complexity and design; that enable detection and logging of Errors and recovery of the system to known state in the face of software errors; and that enable control to be taken of the system with a debugger, via the SIF interface, even in the presence of software errors or in the presence of a completely uninitialised memory system.

Logging Errors is valuable during system development and debug, and in the field continues to be valuable for longer-term product improvements via firmware upgrades.

Giving software the opportunity to choose system recovery, shutdown, or restart on the detection of Errors is valuable, especially when the microprocessor is controlling some important equipment, such as a heart pacemaker or a large machine, where a carefully controlled shutdown may be very important.

It will be understood that the present invention has been described above purely by way of example, and modifications of detail can be made within the scope of the invention.

Each feature disclosed in the description, and (where appropriate) the claims and drawings may be provided independently or in any appropriate combination.

Appendix A: Example Instruction Set for XAP5 Processor

Notation Conventions

In the following sections the following conventions are used to describe various aspects of the instruction set.

- Registers are prefixed by %.
- Rd is the destination register of the instruction
- Rs, and Rt are the primary and secondary registers containing source operands
- Ra, and Rx are registers containing a base address and index for an operand. An offset may also be added to the register contents to form the actual address of the operand. Ra is a byte address for the base. Rx is a scaled address for the index (*4 for 32-bit, *2 for 16-bit, *1 for 8-bit data). Both Ra and Rx are unsigned numbers.
- Immediate[] indicates a constant operand encoded as part of the instruction. In the documentation #immediate[highbit:lowbit]s or #immediate[highbit:lowbit]u is used to distinguish between signed and unsigned immediates. Immediates are prefixed by #. Note, the # is not used for address offsets (e.g. @(0, %r1))
- Address[] indicates an absolute address. This is a byte-address, unless specified otherwise. Addresses are prefixed by @. In Near mode, Absolute addresses are interpreted as 16-bit unsigned numbers. In Far mode, Absolute addresses are interpreted as 24-bit unsigned numbers.
- Base addresses stored in Ra should be interpreted as byte addresses. Index offsets stored in Rx should be multiplied by (1, 2, 4) respectively for (8, 16, 32) bit data to get the desired byte address offset (16 bits, 17 bits, 18 bits). In Near mode, Ra is a single 16-bit register. In Far mode, Ra is a 32-bit register pair.
- Offset[] indicates an address offset. This may be relative to the program counter (in branch instructions, for example), or to a pointer read from a register (the stack pointer, for example) or to 0 (i.e absolute addressing). Offsets can be signed or unsigned numbers (indicated by appended s or u). Offsets are byte-address values, unless specified otherwise. In the documentation offset[highbit:lowbit]s or offset[highbit:lowbit]u is used to distinguish between signed, unsigned and index offsets. In Near mode, an offset should be extended to a 16-bit word before calculating an address. In Far mode, an offset should be extended to a 24-bit word before calculating an address. A signed offset should be sign extended. An unsigned offset should be zero extended.

| Programmer's Model | | | |
|---|---|---|---|
| Memory | 16 MB, byte addressing, little-endian. All 16 MB available for programs. | Low memory = 0x000000 to 0x00FFFF | Available for Near and Far mode data accesses. |
| | Reset starts execution by reading VP start value from 0xFFFFFC, then branching to HardReset handler. | High memory = 0x010000 to 0xFFFFFF | Available for Far mode data accesses. |
| Registers | 16-bit | R0-R7, FLAGS, INFO, BRKE | |
| | 24-bit | PC, SP0, SP1, VP, BRK0-BRK3 | |
| Flags | 16-bit | 15 14 13 12 11 10 9 8 7 6 5 4 3 2 1 0<br>P3 P2 P1 P0 S4 S3 S2 S1 S0 I M1 M0 V C N Z | |

| Assumptions |
|---|
| Flags are not updated when Rd == SP. PC, SP, VP imply all 24-bits of each register. |
| SP is SP0 in Supervisor mode, Interrupt mode, Recovery state and NMI state, SP1 in User mode and Trusted mode. |
| Rd, Rs, Rt, Ra, Rx imply all 16-bits of each register. Rd = Destination. Rs, Rt = Source. Ra = Address. Rx = Index. |
| Rad = Destination Address. Ras = Source Address, Rn = Number of bytes. |
| Possible register values are R0-R7 unless stated otherwise. |
| The figures for number of cycles assume aligned memory accesses. Add one cycle per unaligned access. |
| All figures for number of cycles assume 16-bit single cycle memory is used. |
| This example of the XAP5 processor has 190 instructions. |
| Further details relating to the instruction formats and addressing are provided following the instruction listing. |

| Mnemonic | Operands | Operation | Flags | Cycles | | |
|---|---|---|---|---|---|---|
| | | | | 16-bit instr | 32-bit instr | 48-bit instr |
| Branches | | | | | | |
| Unconditional | | | | | | |
| bra.i | (label, 0) | PC = label. Zero-relative. | ---- | - | - | 4 |
| | (label, PC) | PC = label. PC-relative. | ---- | 2 | 3 | - |
| | (0, Ra) | PC = {R(a+1), Ra}[23:0]. Ra-relative. | ---- | 2 | - | - |
| bra.i.2 | (label, PC) | PC = label. PC-relative. | ---- | 2 | - | - |
| bra.i.4 | (label, PC) | PC = label. PC-relative. | ---- | - | 3 | - |
| bra.m | @(label, 0) | PC = *(label) | ---- | - | 6 | - |
| | @(0, Ra) | PC = *(Ra) | ---- | 5 | - | - |
| bsr.i | (label, 0) | Stack = nextPC; PC = label. Zero-relative. | ---- | - | - | 6 |
| | (label, PC) | Stack = nextPC; PC = label. PC-relative. | ---- | 4 | 5 | - |
| | (0, Ra) | Stack = nextPC; PC = {R(a+1), Ra}[23:0]. Ra-relative. | ---- | 4 | - | - |
| bsr.m | @(label, 0) | Stack = nextPC; PC = *(label) | ---- | - | 7 | - |
| | @(0, Ra) | Stack = nextPC; PC = *(Ra) | | 6 | - | - |
| Conditional | | | | | | |
| bcc (= bge.u) | (label, PC) | if (C == 0) PC = label; else PC = next_instruction; | ---- | 1 / 2 | 2 / 3 | - |
| bcs (= blt.u) | (label, PC) | if (C == 1) PC = label; else PC = next_instruction; | ---- | 1 / 2 | 2 / 3 | - |
| beq | (label, PC) | if (Z == 1) PC = label; else PC = next_instruction; | ---- | 1 / 2 | 2 / 3 | - |
| bez.r | Rs, (label, PC) | Flags set for (cmp.i Rs, #0); if (Rs == 0) PC = label; else PC = next_instruction; | ZNCV | 1 / 2 | 2 / 3 | - |
| bge.s | (label, PC) | if (N == V) PC = label; else PC = next_instruction; | ---- | 1 / 2 | 2 / 3 | - |
| bge.u (= bcc) | (label, PC) | if (C == 0) PC = label; else PC = next_instruction; | ---- | 1 / 2 | 2 / 3 | - |
| bgt.s | (label, PC) | if ((N == V) && (Z == 0)) PC = label; else PC = next_instruction; | ---- | 1 / 2 | 2 / 3 | - |
| bgt.u | (label, PC) | if ((C == 0) && (Z == 0)) PC = label; else PC = next_instruction; | ---- | 1 / 2 | 2 / 3 | - |
| ble.s | (label, PC) | if ((N != V) \|\| (Z == 1)) PC = label; else PC = next_instruction; | ---- | 1 / 2 | 2 / 3 | - |
| ble.u | (label, PC) | if ((C == 1) \|\| (Z == 1)) PC = label; else PC = next_instruction; | ---- | 1 / 2 | 2 / 3 | - |
| blt.s | (label, PC) | if (N != V) PC = label; else PC = next_instruction; | ---- | 1 / 2 | 2 / 3 | - |

| | | | | | | |
|---|---|---|---|---|---|---|
| blt.u (= bcs) | (label, PC) | if (C == 1) PC = label; else PC = next_instruction; | ---- | 1/2 | 2/3 | - |
| bmi | (label, PC) | if (N ==1) PC = label; else PC = next_instruction; | ---- | - | 2/3 | - |
| bne | (label, PC) | if (Z == 0) PC = label; else PC = next_instruction; | ---- | 1/2 | 2/3 | - |
| bnz.r | Rs, (label, PC) | Flags set for (cmp.i Rs, #0); if (Rs != 0) PC = label; else PC = next_instruction; | ZNCV | 1/2 | 2/3 | - |
| bpl | (label, PC) | if (N == 0) PC =label; else PC = next_instruction; | ---- | - | 2/3 | - |
| bvc | (label, PC) | if (V == 0) PC = label; else PC = next_instruction; | ---- | - | 2/3 | - |
| bvs | (label, PC) | if (V == 1) PC = label; else PC = next_instruction; | ---- | - | 2/3 | - |
| Note: | The number of cycles = a / b. a = branch not taken. B = branch taken. | | | | | |

Load and Store

Load (displacement)

| | | | | | | |
|---|---|---|---|---|---|---|
| ld.8z.i | Rd, @(offset, Ra) | Rd = (uint16) (* (int8*) (offset + Ra ) ) <br> Ra = R0-R7, PC, SP, 0 | ZN-- | 2 | 3 | 4 |
| ld.i | Rd, @(offset, Ra) | Rd = * (int16*) ( offset + Ra ) <br> Ra = R0-R7, PC, SP, 0 | ZN-- | 2 | 3 | 4 |
| ld.32.i | Rd, @(offset, Ra) | {R(d+1), Rd} = * (int32*) (offset + Ra ) <br> Ra = R0-R7, PC, SP, 0 | ZN-- | 3 | 4 | 5 |
| Note: | offset range depends on Ra : R0-R7=[15:0]s, PC=[23:0]s, SP=[23:0]u, 0=[23:0]u | | | | | |

Load Far (displacement)

| | | | | | | |
|---|---|---|---|---|---|---|
| ld.8z.fi | Rd, @(offset, Ra) | Rd = (uint16)(*(int8*)(offset[23:0]s + {R(a+1),Ra}[23:0] ) ) <br> Ra = R0-R7 | ZN-- | 2 | 3 | 4 |
| ld.fi | Rd, @(offset, Ra) | Rd = * (int16*) ( offset[23:0]s + {R(a+1), Ra}[23:0] ) <br> Ra = R0-R7 | ZN-- | 2 | 3 | 4 |
| ld.32.fi | Rd, @(offset, Ra) | {R(d+1),Rd} = *(int32*)(offset[23:0]s + {R(a+1),Ra}[23:0] ) <br> Ra = R0-R7 | ZN-- | 3 | 4 | 5 |

Load (indexed)

| | | | | | | |
|---|---|---|---|---|---|---|
| ld.8z.r | Rd, @(Rx, Ra) | Rd = (uint16) (* (int8*) ( Rx + Ra )) <br> Ra = R0-R7, SP | ZN-- | 2 | 3 | - |
| ld.r | Rd, @(Rx, Ra) | Rd = * (int16*) ( 2*Rx + Ra ) <br> Ra = R0-R7, SP | ZN-- | 2 | 3 | - |
| ld.32.r | Rd, @(Rx, Ra) | {R(d+1), Rd} = * (int32*) ( 4*Rx + Ra ) <br> Ra = R0-R7, SP | ZN-- | 3 | 4 | - |

Load Far (indexed)

| | | | | | | |
|---|---|---|---|---|---|---|
| ld.8z.fr | Rd, @(Rx, Ra) | Rd = (uint16) (* (int8*) ( Rx + {R(a+1), Ra} [23:0])) <br> Ra = R0-R7 | ZN-- | 2 | 3 | - |
| ld.fr | Rd, @(Rx, Ra) | Rd = * (int16*) ( 2*Rx + {R(a+1), Ra}[23:0] ) <br> Ra = R0-R7 | ZN-- | 2 | 3 | - |
| ld.32.fr | Rd, @(Rx, Ra) | {R(d+1), Rd} = * (int32*) ( 4*Rx + {R(a+1), Ra}[23 :0] ) <br> Ra = R0-R7 | ZN-- | 3 | 4 | - |

Store (displacement)

| | | | | | | |
|---|---|---|---|---|---|---|
| st.8.i | Rs, @(offset, Ra) | *(int8*) (offset + Ra ) = Rs[7:0] <br> Rs = R0-R7, #0, #1, #0xFF <br> Ra = R0-R7, PC, SP, 0 | ---- | 2 | 3 | 4 |

| st.i | Rs, @(offset, Ra) | *(int16*) (offset + Ra ) = Rs<br>Rs = R0-R7, #0, #1, #0xFFFF<br>Ra = R0-R7, PC, SP, 0 | ---- | 2 | 3 | 4 |
|---|---|---|---|---|---|---|
| st.32.i | Rs, @(offset, Ra) | *(int32*) (offset + Ra ) = {R(s+1), Rs}<br>Rs = R0-R7, #0, #1<br>Ra = R0-R7, PC, SP, 0 | ---- | 3 | 4 | 5 |
| Note: | offset range depends on Ra : R0-R7=[15:0]s, PC=[23:0]s, SP=[23:0]u, 0=[23:0]u | | | | | |
| Store Far (displacement) | | | | | | |
| st.8.fi | Rs, @(offset, Ra) | *(int8*) (offset[23:0]s + {R(a+1),Ra}[23:0]) = Rs[7:0]<br>Rs = R0-R7, #0, #1, #0xFF<br>Ra = R0-R7 | ---- | 2 | 3 | 4 |
| st.fi | Rs, @(offset, Ra) | *(int16*) (offset[23:0]s + {R(a+1),Ra}[23:0]) = Rs<br>Rs = R0-R7, #0, #1, #0xFFFF<br>Ra = R0-R7 | ---- | 2 | 3 | 4 |
| st.32.fi | Rs, @(offset, Ra) | *(int32*) (offset[23:0]s + {R(a+1),Ra}[23:0]) = {R(s+1),Rs}<br>Rs = R0-R7, #0, #1<br>Ra = R0-R7 | ---- | 3 | 4 | 5 |
| Store (indexed) | | | | | | |
| st.8.r | Rs, @(Rx, Ra) | • (int8*) ( Rx + Ra ) = Rs[7:0]<br>Rs = R0-R7, #0, #1, #0xFF<br>Ra = R0-R7, SP | ---- | 2 | 3 | - |
| st.r | Rs, @(Rx, Ra) | • (int16*) ( 2*Rx + Ra ) = Rs<br>Rs = R0-R7, #0, #1, #0xFFFF<br>Ra = R0-R7, SP | ---- | 2 | 3 | - |
| st.32.r | Rs, @(Rx, Ra) | • (int32*) ( 4*Rx + Ra ) = {R(s+1), Rs}<br>Rs = R0-R7, #0, #1<br>Ra = R0-R7, SP | ---- | 3 | 4 | - |
| Store Far (indexed) | | | | | | |
| st.8.fr | Rs, @(Rx, Ra) | • (int8*) ( Rx + {R(a+1), Ra}[23:0] ) = Rs[7:0]<br>Rs = R0-R7, #0, #1, #0xFF<br>Ra = R0-R7 | ---- | 2 | 3 | - |
| st.fr | Rs, @(Rx, Ra) | • (int16*) ( 2*Rx + {R(a+1), Ra}[23:0] ) = Rs<br>Rs = R0-R7, #0, #1, #0xFFFF<br>Ra = R0-R7 | ---- | 2 | 3 | - |
| st.32.fr | Rs, @(Rx, Ra) | • (int32*) ( 4*Rx + {R(a+1), Ra}[23:0] ) = {R(s+1), Rs}<br>Rs = R0-R7, #0, #1<br>Ra = R0-R7 | ---- | 3 | 4 | - |
| Swap | | | | | | |
| swap.i | Rd, @(0, Ra) | Swap Register with low memory: *Ra <-> Rd | ZN-- | - | 4 | - |
| swap.fi | Rd, @(0, Ra) | Swap Register with high or low memory:<br>*{R(a+1), Ra}[23:0] <-> Rd | ZN-- | - | 4 | - |
| | | | | | | |
| Push and Pop | | | | | | |
| push | RegList, #offset | Push registers in RegList to stack. | ---- | n + 1 | n + 2 | - |
| push.i | ImmList, #0 | Push up to four immediates to stack. | ---- | n + 1 | n + 2 | - |
| pop | RegList, #offset | Pop registers in RegList from stack. | ---- | n + 1 | n + 2 | - |
| pop.ret | RegList, #offset | Pop registers in RegList and PC from stack. (i.e return). | ZNCV | n + 5 | n + 6 | - |

| Note: | RegList example (push) : {%r6-%r3, %r1, %r0} | | | | | |
|---|---|---|---|---|---|---|
| | ImmList examples (push.i): {#1, #2, #3} {#0x8000} | | | | | |
| | RegList example (pop, pop.ret) : {%r0, %r1, %r3-%r6} | | | | | |
| | n = number of 16-bit words pushed/popped. | | | | | |
| Move | | | | | | |
| mov.i | Rd, #imm | Rd = #imm[15:0] | ZN-- | 1 | 2 | - |
| | Rd, (label, 0) | Rd = label. Zero-relative. | ZN-- | 1 | 2 | - |
| mov.r | Rd, Rs | Rd = Rs | ZN-- | 1 | 2 | - |
| mov.32.i | Rd, #imm | {R(d+1), Rd} = #imm[23:0] | ZN-- | 1 | 2 | - |
| | Rd, (label, 0) | {R(d+1), Rd} = label. Zero-relative. | ZN-- | 1 | 2 | - |
| | Rd, (label, PC) | {R(d+1), Rd} = data label. PC-relative. | ZN-- | - | 2 | 3 |
| | Rd, !(label, PC) | {R(d+1), Rd} = code label. PC-relative. | ZN-- | - | 2 | 3 |
| mov.32.r | Rd, Rs | {R(d+1), Rd} = {R(s+1), Rs}<br>Rd = R0-R7, SP<br>Rs = R0-R7, SP | ZN-- | 1 | 2 | - |
| mov.32s.r | Rd, Rs | R(d+1) = Rs[15], Rd = Rs | ZN-- | 1 | - | - |
| mov.32z.r | Rd, Rs | R(d+1) = 0, Rd = Rs | ZN-- | 1 | - | - |
| ALU Operations | | | | | | |
| Add | | | | | | |
| add.i | Rd, Rs, #imm | Rd = Rs + #imm[15:0]s | ZNCV | 1 | 2 | - |
| add.r | Rd, Rs, Rt | Rd = Rs + Rt | ZNCV | 1 | - | - |
| add.c.i | Rd, Rs, #imm | Rd = Rs + #imm[15:0]s + C | ZNCV | 1 | 2 | - |
| add.c.r | Rd, Rs, Rt | Rd = Rs + Rt + C | ZNCV | 1 | - | - |
| add.32.i | Rd, Rs, #imm ** | {R(d+1), Rd} = {R(s+1), Rs} + #imm[15:0]s | ZNCV | 1 / 2 * | 2 / 3 * | - |
| add.32c.i | Rd, Rs, #imm ** | {R(d+1), Rd} = {R(s+1), Rs} + #imm[15:0]s + C | ZNCV | - | 3 | - |
| Subtract | | | | | | |
| sub.r | Rd, Rs, Rt | Rd = Rs - Rt | ZNCV | 1 | - | - |
| sub.c.r | Rd, Rs, Rt | Rd = Rs - Rt - C | ZNCV | 1 | - | - |
| sub.x.i | Rd, Rs, #imm | Rd = #imm[15:0]s - Rs | ZNCV | - | 2 | - |
| sub.xc.i | Rd, Rs, #imm | Rd = #imm[15:0]s - Rs - C | ZNCV | - | 2 | - |
| sub.32x.i | Rd, Rs, #imm ** | {R(d+1), Rd} = #imm[15:0]s - {R(s+1), Rs} | ZNCV | - | 3 | - |
| sub.32xc.i | Rd, Rs, #imm ** | {R(d+1), Rd} = #imm[15:0]s - {R(s+1), Rs} - C | ZNCV | - | 3 | - |
| Logical | | | | | | |
| and.i | Rd, Rs, #imm | Rd = Rs & #imm[15:0]u | ZN-- | 1 | 2 | - |
| and.r | Rd, Rs, Rt | Rd = Rs & Rt | ZN-- | 1 | - | - |
| or.i | Rd, Rs, #imm | Rd = Rs \| #imm[15:0]u | ZN-- | 1 | 2 | - |
| or.r | Rd, Rs, Rt | Rd = Rs \| Rt | ZN-- | 1 | - | - |
| xor.i | Rd, Rs, #imm | Rd = Rs ^ #imm[15:0]u | ZN-- | 1 | 2 | - |
| xor.r | Rd, Rs, Rt | Rd = Rs ^ Rt | ZN-- | 1 | - | - |
| Multiply | | | | | | |

| | | | | | | |
|---|---|---|---|---|---|---|
| mult.i | Rd, Rs, #imm | Rd = (int16*) (Rs * #imm[15:0]s) | ZN-- | - | 4 | - |
| mult.r | Rd, Rs, Rt | Rd = (int16*) (Rs * Rt) | ZN-- | - | 4 | - |
| mult.32s.i | Rd, Rs, #imm | {R(d+1), Rd} = Rs * #imm[15:0]s | ZN-- | - | 5 | - |
| mult.32s.r | Rd, Rs, Rt | {R(d+1), Rd} = Rs * Rt | ZN-- | - | 5 | - |
| mult.32u.i | Rd, Rs, #imm | {R(d+1), Rd} = Rs * #imm[15:0]u | ZN-- | - | 5 | - |
| mult.32u.r | Rd, Rs, Rt | {R(d+1), Rd} = Rs * Rt | ZN-- | - | 5 | - |
| mult.sh.r | Rd, Rs, Rt, #imm | Rd = (Rs * Rt) >> #imm[4:0]u | ZN-V | - | 6 | - |
| Divide and Remainder (signed) | | | | | | |
| div.s.i | Rd, Rs, #imm | Rd= Rs / #imm[15:0]s | ZN-V | - | 20 | - |
| div.s.r | Rd, Rs, Rt | Rd = Rs / Rt | ZN-V | - | 20 | - |
| div.32s.i | Rd, Rs, #imm | Rd = {R(s+1), Rs} / #imm[15:0]s | ZN-V | - | 20 | - |
| div.32s.r | Rd, Rs, Rt | Rd = {R(s+1), Rs} / Rt | ZN-V | - | 20 | - |
| divrem.s.i | Rd, Rs, #imm | Rd = Rs / #imm[15:0]s ; R(d+1) = Rs % #imm[15:0]s | ---V | - | 20 | - |
| divrem.s.r | Rd, Rs, Rt | Rd = Rs / Rt ; R(d+1) = Rs % Rt | ---V | - | 20 | - |
| divrem.32s.i | Rd, Rs, #imm | Rd = {R(s+1), Rs} / #imm[15:0]s ; R(d+1) = {R(s+1), Rs} % #imm[15:0]s | ---V | - | 20 | - |
| divrem.32s.r | Rd, Rs, Rt | Rd = {R(s+1), Rs} / Rt ; R(d+1) = {R(s+1), Rs} % Rt | ---V | - | 20 | - |
| rem.s.i | Rd, Rs, #imm | Rd = Rs % #imm[15:0]s | ZN-V | - | 20 | - |
| rem.s.r | Rd, Rs, Rt | Rd = Rs % Rt | ZN-V | - | 20 | - |
| rem.32s.i | Rd, Rs, #imm | Rd = {R(s+1), Rs} % #imm[15:0]s | ZN-V | - | 20 | - |
| rem.32s.r | Rd, Rs, Rt | Rd = {R(s+1), Rs} % Rt | ZN-V | - | 20 | - |
| Divide and Remainder (unsigned) | | | | | | |
| div.u.i | Rd, Rs, #imm | Rd = Rs / #imm[15:0]u | ZNC- | - | 18 | - |
| div.u.r | Rd, Rs, Rt | Rd = Rs / Rt | ZNC- | - | 18 | - |
| div.32u.i | Rd, Rs, #imm | Rd = {R(s+1), Rs} / #imm[15:0]u | ZNC- | - | 18 | - |
| div.32u.r | Rd, Rs, Rt | Rd = {R(s+1), Rs} / Rt | ZNC- | - | 18 | - |
| divrem.u.i | Rd, Rs #imm | Rd = Rs / #imm[15:0]u ; R(d+1)[15:0] = Rs % #imm[15:0]u | --C- | - | 18 | - |
| divrem.u.r | Rd, Rs, Rt | Rd = Rs / Rt ; R(d+1) = Rs % Rt | --C- | - | 18 | - |
| divrem.32u.i | Rd, Rs, #imm | Rd = {R(s+1), Rs} / #imm[15:0]u ; R(d+1) = {R(s+1), Rs} % #imm[15:0]u | --C- | - | 18 | - |
| divrem.32u.r | Rd, Rs, Rt | Rd = {R(s+1), Rs} / Rt ; R(d+1) = {R(s+1), Rs} % Rt | --C- | - | 18 | - |
| rem.u.i | Rd, Rs, #imm | Rd = Rs % #imm[15:0]u | ZNC- | - | 18 | - |
| rem.u.r | Rd, Rs, Rt | Rd = Rs % Rt | ZNC- | - | 18 | - |
| rem.32u.i | Rd, Rs, #imm | Rd = {R(s+1), Rs} % #imm[15:0]u | ZNC- | - | 18 | - |
| rem.32u.r | Rd, Rs, Rt | Rd = {R(s+1), Rs} % Rt | ZNC- | - | 18 | - |
| * Note: | if (Rs == SP) Instruction takes one fewer clock cycle (as shown); | | | | | |
| ** Note: | 16-bit #imm is sign extended to 32-bits | | | | | |
| Compare Operations | | Flags set for | | | | |
| cmp.8.i | Rs, #imm | Rs[7:0] - #imm[7:0] | ZNCV | 1 | 2 | - |
| cmp.8.r | Rs, Rt | Rs[7:0] – Rt[7:0] | ZNCV | 1 | - | - |
| cmp.8c.i | Rs, #imm | Rs[7:0] - #imm[7:0] – C | ZNCV | - | 2 | - |

| cmp.8c.r | Rs, Rt | Rs[7:0] – Rt[7:0] – C | ZNCV | 1 | - | - |
| cmp.8x.i | Rs, #imm | #imm[7:0] – Rs[7:0] | ZNCV | - | 2 | - |
| cmp.8xc.i | Rs, #imm | #imm[7:0] – Rs[7:0] – C | ZNCV | - | 2 | - |
| | | | | | | |
| cmp.i | Rs, #imm | Rs - #imm[15:0] | ZNCV | 1 | 2 | - |
| cmp.r | Rs, Rt | Rs – Rt | ZNCV | 1 | - | - |
| cmp.c.i | Rs, #imm | Rs - #imm[15:0] – C | ZNCV | - | 2 | - |
| cmp.c.r | Rs, Rt | Rs – Rt – C | ZNCV | 1 | - | - |
| cmp.x.i | Rs, #imm | #imm[15:0] – Rs | ZNCV | - | 2 | - |
| cmp.xc.i | Rs, #imm | #imm[15:0] – Rs – C | ZNCV | - | 2 | - |
| cmp.32.i | Rs, #imm ** | {R(s+1), Rs} - #imm[15:0]s | ZNCV | 2 | 3 | - |
| cmp.32.r | Rs, Rt | {R(s+1), Rs} – {R(t+1), Rt} | ZNCV | 2 | - | - |
| cmp.32c.i | Rs, #imm ** | {R(s+1), Rs} - #imm[15:0]s – C | ZNCV | - | 3 | - |
| cmp.32c.r | Rs, Rt | {R(s+1), Rs} – {R(t+1), Rt} – C | ZNCV | 2 | - | - |
| cmp.32x.i | Rs, #imm ** | #imm[15:0]s – {R(s+1), Rs} | ZNCV | - | 3 | - |
| cmp.32xc.i | Rs, #imm ** | #imm[15:0]s – {R(s+1), Rs} – C | ZNCV | - | 3 | - |
| ** Note: | 16-bit #imm is sign extended to 32-bits | | | | | |
| Shift and Rotate | | | | | | |
| shiftl.i | Rd, Rs, #imm | As shiftl.32.i, but not including R(s+1) → R(d+1) and repeated #imm[3:0] times. | ZNC- | 1 | - | - |
| shiftl.r | Rd, Rs, Rt | As shiftl.i, but repeated Rt[3:0] times. | ZNC- | 1 | - | - |
| shiftl.32.i | Rd, Rs, #imm | 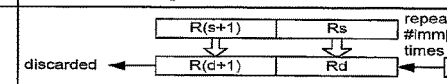 | ZNC- | - | 2 | - |
| shiftl.32.r | Rd, Rs, Rt | As shiftl.32.i, but repeated Rt[4:0] times. | ZNC- | - | 2 | - |
| shiftr.s.i | Rd, Rs, #imm | As shiftr.32s.i, but not including R(s+1) → R(d+1) and repeated #imm[3:0] times. | ZNC- | 1 | - | - |
| shiftr.s.r | Rd, Rs, Rt | As shiftr.s.i, but repeated Rt[3:0] times. | ZNC- | 1 | - | - |
| shiftr.32s.i | Rd, Rs, #imm | 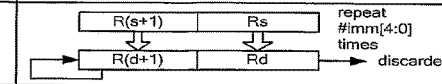 | ZNC- | - | 2 | - |
| shiftr.32s.r | Rd, Rs, Rt | As shiftr.32s.i, but repeated Rt[4:0] times. | ZNC- | - | 2 | - |
| shiftr.u.i | Rd, Rs, #imm | As shiftr.32u.i, but not including R(s+1) → R(d+1) and repeated #imm[3:0] times. | ZNC- | 1 | - | - |
| shiftr.u.r | Rd, Rs, Rt | As shiftr.u.i, but repeated Rt[3:0] times. | ZNC- | 1 | - | - |
| shiftr.32u.i | Rd, Rs, #imm | 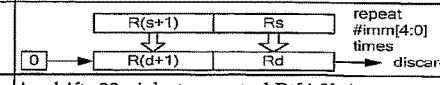 | ZNC- | - | 2 | - |
| shiftr.32u.r | Rd, Rs, Rt | As shiftr.32u.i, but repeated Rt[4:0] times. | ZNC- | - | 2 | - |
| rotatel.i | Rd, Rs, #imm | As rotatel.32.i, but not including R(s+1) → R(d+1) and repeated #imm[3:0] times. | ZNC- | - | 2 | - |
| rotatel.r | Rd, Rs, Rt | As rotatel.i, but repeated Rt[3:0] times. | ZNC- | - | 2 | - |

| | | | | | | |
|---|---|---|---|---|---|---|
| rotatel.32.i | Rd, Rs, #imm | 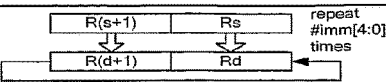 repeat #imm[4:0] times | ZNC- | - | 2 | - |
| rotatel.32.r | Rd, Rs, Rt | As rotatel.32.i, but repeated Rt[4:0] times. | ZNC- | - | 2 | - |
| Block Copy and Store | | | | | | |
| Near (immediate) | | | | | | |
| blkcp.i | @(0, Rad), @(0, Ras), #num | Copy #num bytes from memory starting at Ras to memory starting at Rad. | ---- | - | 2n + 4 | - |
| blkst.8.i | Rs, @(0, Ra), #num | Store #num bytes to memory starting at Ra. All bytes equal Rs[7:0]. Rs = R0-R7, #0, #0xFF. | ---- | - | n + 4/ n + 3* | - |
| blkst.i | Rs, @(0, Ra), #num | Store #num bytes to memory starting at Ra. All byte pairs equal Rs[15:0]. Rs = R0-R7. | ---- | - | n + 4 | - |
| Near (register) | | | | | | |
| blkcp.r | @(0, Rad), @(0, Ras), Rn | Copy Rn bytes from memory starting at Ras to memory starting at Rad. | ---- | - | 2n + 4 | - |
| blkst.8.r | Rs, @(0, Ra), Rn | Store Rn bytes to memory starting at Ra. All bytes equal Rs[7:0]. Rs = R0-R7, #0, #0xFF. | ---- | - | n + 4/ n + 3* | - |
| blkst.r | Rs, @(0, Ra), Rn | Store Rn bytes to memory starting at Ra. All byte pairs equal Rs[15:0]. Rs = R0-R7. | ---- | - | n + 4 | - |
| Far (immediate) | | | | | | |
| blkcp.fi | @(0, Rad), @(0, Ras), #num | Copy #num bytes from memory starting at {R(as+1), Ras}[23:0] to memory starting at {R(ad+1), Rad}[23:0]. | ---- | - | 2n + 4 | - |
| blkst.8.fi | Rs, @(0, Ra), #num | Store #num bytes to memory starting at {R(a+1), Ra}[23:0]. All bytes equal Rs[7:0]. Rs = R0-R7, #0, #0xFF. | ---- | - | n + 4/ n + 3* | - |
| blkst.fi | Rs, @(0, Ra), #num | Store #num bytes to memory starting at {R(a+1), Ra}[23:0]. All byte pairs equal Rs[15:0]. Rs = R0-R7. | ---- | - | n + 4 | - |
| Far (register) | | | | | | |
| blkcp.fr | @(0, Rad), @(0, Ras), Rn | Copy Rn bytes from memory starting at {R(as+1), Ras}[23:0] to memory starting at {R(ad+1), Rad}[23:0]. | ---- | - | 2n + 4 | - |
| blkst.8.fr | Rs, @(0, Ra), Rn | Store Rn bytes to memory starting at {R(a+1), Ra}[23:0]. All bytes equal Rs[7:0]. Rs = R0-R7, #0, #0xFF. | ---- | - | n + 4/ n + 3* | - |
| blkst.fr | Rs, @(0, Ra), Rn | Store Rn bytes to memory starting at {R(a+1), Ra}[23:0]. All byte pairs equal Rs[15:0]. Rs = R0-R7. | ---- | - | n + 4 | - |
| Note: | Rn and #num are the number of bytes copied or stored. See C7508-UM-002 for more details. N is the number of transfers, not the number of bytes. * One fewer clock cycle when using #imm versions, as shown. | | | | | |
| DSP instructions | | | | | | |
| flip.r | Rd, Rs | Flip bits; 0-15, 1-14, ... | ZN-- | - | 2 | - |
| flip.8.r | Rd, Rs | Flip byte bits; 0-7, 8-15; 1-6, 9-14; ... | ZN-- | - | 3 | - |

| | | | | | | |
|---|---|---|---|---|---|---|
| abs.r | Rd, Rs | if (Rs ≥ 0) Rd = Rs; else Rd = -Rs; | ZN-- | - | 2 | - |
| msbit.r | Rd, Rs | Rd = (1 + highest bit to contain a 1 in Rs) | ZN-- | - | 2 | - |
| Single-bit instructions | | | | | | |
| ld.1.i | %flags[c], @(offset[bit], 0) | Load selected bit into C flag. | --C- | - | 3 | 4 |
| ldand.1.i | %flags[c], %flags[c], @(offset[bit], 0]) | AND C flag with selected bit, then store result in C flag. | --C- | - | 3 | 4 |
| ldor.1.i | %flags[c], %flags[c], @(offset[bit], 0) | OR C flag with selected bit, then store result in C flag. | --C- | - | 3 | 4 |
| ldxor.1.i | %flags[c], %flags[c], @(offset[bit], 0) | XOR C flag with selected bit, then store result in C flag. | --C- | - | 3 | 4 |
| st.1.i | imm, @(offset[bit], 0) | Store 1-bit immediate to selected bit in bit-enabled IO register. | ---- | - | 3 | 4 |
| | %flags[c], @(offset[bit], 0) | Store C flag to selected bit in bit-enabled IO register. | ---- | - | 3 | 4 |
| | imm, @(offset[bit], 0) | Store 1-bit immediate to selected bit in bit-enabled IO register. | ---- | - | 3 | 4 |
| | %flags[c], @(offset[bit], 0) | Store C flag to selected bit in bit-enabled IO register. | ---- | - | 3 | 4 |
| Miscellaneous instructions | | | | | | |
| sext.r | Rd | Sign Extend: Set Rd[15:8] = Rd[7] | ZN-- | 1 | - | - |
| System Instructions | | | | | | |
| Rtie | - | Return from Interrupt, Exception | ZNCV | 8 | - | - |
| Brk | - | Break | ---- | 1 | - | - |
| Halt | - | Halt | ---- | 1 | - | - |
| Softreset | - | Perform a Soft Reset | ---- | 13 | - | - |
| Sleepnop | - | Sleep | ---- | 1 | - | - |
| Sleepsif | - | Sleep and allow SIF | ---- | 1 | - | - |
| Nop | - | No Operation | ---- | 1 | - | - |
| Sif | - | Perform SIF cycle | ---- | 7 | 8 | - |
| print.r | Rs | Print Register | ---- | - | 2 | - |
| Fimode | Rd | Flags and info mode | ---- | 1 | - | - |
| Lic | Rd | {R(d+1), Rd} = XAP5 licence number | ---- | - | 3 | - |
| Ver | Rd | {R(d+1), Rd} = XAP5 version number | ---- | - | 3 | - |
| syscall.i | num, #imm | System Call - Immediate | ---- | - | 13 | - |
| syscall.r | num, Rs | System Call - Register | ---- | - | 13 | - |
| Flags Register | | | | | | |
| mov.1.i | %flags[F], #imm | F flag = #imm[0]<br>F = p3, p2, p1, p0, s4, s3, s2, s1, s0, i, m1, m0, v, c, n, z | | 1 | - | - |
| mov.1.r | %flags[c], Rs | C flag = Rs[0] | --C- | - | 2 | - |
| | Rd, %flags[F] | Rd[15:1] = 0; Rd[0] = F flag<br>F = p3, p2, p1, p0, s4, s3, s2, s1, s0, i, m1, m0, v, c, n, z | ZN-- | - | 2 | - |
| | %flags[i], %flags[c] | I flag = C flag | ---- | 1 | - | - |

| | | | | | | |
|---|---|---|---|---|---|---|
| mov.2.i | %flags[m], #imm | {M1, M0} flags = #imm[1:0] | --- | 1 | - | - |
| mov.2.r | Rd, %flags[m] | Rd[15:2] = 0; Rd[1:0] = {M1, M0} flags | ZN-- | - | 2 | - |
| mov.4.i | %flags[p], #imm | {P3, P2, P1, P0} flags = #imm[3:0] | --- | 1 | - | - |
| mov.4.r | Rd, %flags[p] | Rd[15:4] = 0; Rd[3:0] = {P3, P2, P1, P0} flags | ZN-- | - | 2 | - |
| xor.1.i | %flags[c],%flags[c],#1 | Toggle C flag. | --C- | 1 | - | - |
| Address Registers | | | | | | |
| mova2r.16 | Rd, As | Rd = As[15:0] | ZN-- | - | 2 | - |
| mova2r.32 | Rd, As | R(d+1) = {0x00, As[23:16]}; Rd = As[15:0] | ZN-- | - | 2 | - |
| movr2a.16 | Ad, Rs | Ad[23:16] = 0; Ad[15:0] = Rs | ---- | - | 2 | - |
| movr2a.32 | Ad, Rs | Ad[23:16] = R(s+1)[7:0]; Ad[15:0] = Rs | ---- | - | 2 | - |
| Breakpoint Registers | | | | | | |
| movb2r.32 | Rd, Bs | R(d+1) = {0x00, Bs[23:16]}; Rd = Bs[15:0] | ZN-- | - | 2 | - |
| movr2b.32 | Bd, Rs | Bd[23:16] = R(s+1)[7:0]; Bd[15:0] = Rs | ---- | - | 2 | - |
| Special Registers | | | | | | |
| movs2r | Rd, Ss | Rd = Ss | ZN-- | - | 2 | - |
| movr2s | Sd, Rs | Sd = Rs | ---- | - | 2 | - |

Instruction Format

Instructions can take several forms :

- mnemonic label            // Conditional and Unconditional Branches
- mnemonic %registers
- mnemonic     %registers, #immediates
- mnemonic     %registers, @address The convention is to have a tab between the mnemonic and the first argument. This should not be required by the binutils assembler, but should be generated by the C compiler.

Instructions must explicitly list every argument for each instruction. e.g. :

- ld.i     %r2, @(0, %r4)          // NOT          ld.i     %r2, @%r4

Instruction Mnemonics
The mnemonic is a string in one of the following formats :
- Base
- Base.Parameters
- Base.Type
- Base.Parameters.Type
- Base.Parameters.Type.Size
    Examples of Base are :
- add
- mov
- ld
- bra
    Examples of Parameter are :

- c    // with carry
- x    // exchange order (= reverse order)
- z    // zero-extend
- s    // signed
- u    // unsigned
- 8    // 8-bit operation
- 32   // 32-bit operation Examples of Type are :
- r    // register
- i    // immediate
- h    // high immediate
- a    // absolute address
- p    // PC-relative address
- f    // far pointer (32-bit base address register, Ra)

Examples of Size are :
- 2    // 2byte, 16-bit instruction
- 4    // 4byte, 32-bit instruction
- 6    // 6byte, 48-bit instruction Instruction mnemonics do not normally include Size. It is only used when the xap5-gcc compiler wants to force the binutils assembler/linker to use a particular instruction size. This is sometimes needed for branch instructions.

Here are some alternative versions of the add instruction :
- add.r   // Add Rt to Rs and store result in Rd
- add.c.r // Add Rt to Rs with carry and store result in Rd
- add.i   // Add Immediate to Rs and store result in Rd

Registers

The registers are named in the assembler as follows :
- 8 normal registers are referred to as %r0 to %r7.
- Program Counter is referred to as %pc.
- Stack Pointer is referred to as %sp.
- Vector Pointer is referred to as %vp
- Zero (when used for zero-relative addressing) is referred to as 0.

There can be several Registers in each instruction. They will be in the following sequence from left to right :
- Rd    // Destination Register
- Rs    // Primary Source Register
- Rt    // Secondary Source Register
- Rx    // Index Address Register (scaled by {1, 2, 4} for {8, 16, 32}-bit data)
- Rn    // Count Number Register
- Ra    // Base Address Register (address in bytes)
- Ras   // Source Base Address Register (address in bytes)
- Rad   // Destination Base Address Register (address in bytes)

Each Register will be separated by, and prefixed by %.

Some instructions (push, pop, pop.ret) require a list of registers as an argument. The number of registers can vary. Such lists are enclosed in { }. e.g. :
- push    {%r6, %r3}, #6
- pop     {%r3, %r6}, #6
- pop.ret {%r3, %r6}, #6

Within such register lists, registers can be specified in ranges as follows :

- %r3-%r6        // The first register must be lower than the second in pop and pop.ret.
- %r6-%r3        // The first register must be higher than the second in push.

This enables more compact Assembler code (from the C compiler and Disassembler).
Within the register list, the same register must not be specified more than once :

- {%r3-%r5, %r4}        // Not valid because %r4 has been specified twice
- {%r3, %r5-%r6}        // This is a valid register list

Register Pairs

Some instructions use 2 adjacent registers grouped together as a single 32-bit register-pair. XAP5 can use any adjacent register pair as a 32-bit register-pair. This assumes little-endian ordering and the register-pair is referenced by the lower register.

Immediates

There can be several immediates in each instruction. Each Immediate will be separated by ','. Immediates outside '( )' are prefixed by #. For example:

shiftl.i %r4, %r6, #6

Immediate values in the assembly files are treated as 16-bit numbers. It is the responsibility of the assembler to decide whether the immediate value is compatible with the values permitted by the instruction mnemonics.

The assembler will sign-extend positive and negative decimal numbers, but not hex or binary. The assembler will then calculate whether the resultant 16-bit number is in a valid range for the Immediate field for that particular instruction. e.g. :

```
add.i   %r1, %r2, #0x1234        // valid positive immediate
add.i   %r1, %r2, #35            // valid positive immediate
add.i   %r1, %r2, #-356          // valid negative immediate
add.i   %r1, %r2, #0xF234        // valid negative immediate
add.i   %r1, %r2, #0x111234      // invalid (immediate > 16 bit)
add.i   %r1, %r2, #0xABCD1234    // invalid (immediate > 16 bit)
add.i   %r1, %r2, #-100000       // invalid (immediate > 16 bit)
```

Addresses

There can only be one data address in each instruction. This will be prefixed by @.
Address indirection is specified as one of :

- @(offset, Ra)    @(-56, %r7)    // Ra = byte address
- @(offset, SP)    @(-56, %sp)    // SP-relative addressing
- @(offset, PC)    @(125, %pc)    // PC-Relative addressing
- @(label, PC)     @(name1, %pc)    // PC-Relative label

- @(offset, 0)      @(125, 0)       // Zero-Relative (absolute) addressing
- @(label, 0)       @(name1, 0)     // Zero-Relative label
- @(Rx, Ra)         @(%r4, %r7)     // Rx = scaled addr, Ra = byte addr
- @(Rx, SP)         @(%r4, %sp)     // Rx = scaled addr, SP = byte addr Code addresses are always resolved as 24-bit byte addresses. They are stored in registers and memory as 32-bit. The following instructions set 24-bit byte addresses :

- mov.32.i
- bra.*
- bsr.*

Data addresses are resolved as 24-bit when Far pointers are used. . They are stored in registers and memory as 32-bit.

Data addresses are resolved as 16-bit when Near pointers are used. . They are stored in registers and memory as 16-bit.

Syntax Examples

Here are some valid instructions in XAP5 Assembler :

| | | |
|---|---|---|
| ld.i | %r2, @(1256, %r0) | // Load value at specified address into R2 |
| ld.i | %r3, @(156, 0) | // Load value at (156 + 0) into R3 |
| st.r | %r5, @(%r3, %r6) | // Store register R5 at specified address |
| add.r | %r4, %r3, %r5 | // Add R5 to R3 and store in R4 |
| add.c.r %r7, %r2, %r4 | | /* Start of Block comment |
| foo bar | | |
| End of Block Comment */ | add.r %r6, %r3, %r1 | // this add.r is executed |
| or.i | %r3, %r7, #-563 | // OR –563 with R7 and store in R3 |
| and.i | %r1, %r5, #0xABcd | // AND hex ABCD with R5 and store in R1 |
| xor.i | %r1, %r5, #0x1230 | // XOR 0x1230 with R5 and store in R1 |
| mult.r %r6, %r4, %r2 | | // 16x16 unsigned multiply of R4 with R2. |
| | | // 16-bit result stored in R6. |
| mult.32s.r %r5, %r4, %r2 | | // 16x16 signed multiply of R4 with R2. |
| | | // 32-bit result stored in {R6, R5}. |
| mov.32.i %r1, (0x123456, %pc) | | // R1 = PC + 0x123456. |

What is claimed is:

1. A data processing apparatus comprising:
a processor configured to operate under control of an executable comprising instructions, and in any of a plurality of operating modes including a non-privileged mode and a plurality of privileged modes including a trusted mode;
an associated memory for storing a plurality of stacks;
a first stack pointer register for storing a pointer to an address in a first of said plurality of stacks; and
a second stack pointer register for storing a pointer to an address in a second of said plurality of stacks, wherein said data processing apparatus is configured to use said second stack pointer register both when said processor is operating in the non-privileged mode and when said processor is operating in the trusted mode;
said data processing apparatus is configured to use said first stack pointer register when said processor is operating in any other privileged mode other than said trusted mode; and
the processor and the associated memory transfer operation of said processor from the non-privileged mode to the trusted mode in response to an event, whilst maintaining use of the second stack pointer register instead of switching to the first stack pointer register.

2. The data processing apparatus as claimed in claim 1 wherein the processor is configured to do at least one of the following:
use the first of said plurality of stacks as a privileged stack;
use the second of said plurality of stacks as a general stack;
use a plurality of said plurality of stacks stored by the associated memory as general stacks wherein said second of said plurality of stacks is used as a current general stack; and
operate in only one of said plurality of operating modes at a given time.

3. The data processing apparatus as claimed in claim 2 wherein the processor is configured to use each of said general stacks to store data for a different task.

4. The data processing apparatus as claimed in claim 3 wherein the processor is configured to switch between one task and another task by changing a pointer in said second stack pointer register to point to an address in a general stack for the another task.

5. The data processing apparatus as claimed in claim 1 wherein said processor and the associated memory are configured for transferring operation from the non-privileged mode to at least one privileged mode in response to an event, and/or transferring operation from the non-privileged mode to at least one privileged mode invoked by execution of at least one of said instructions; and/or maintaining operation in a current privileged mode in response to a service event occurring in the current privileged mode.

6. The data processing apparatus as claimed in claim 1 wherein said non-privileged mode is configured for running non-privileged application code comprising a subset of said instructions from an instruction set.

7. The data processing apparatus as claimed in claim 1 further comprising a plurality of status registers wherein access of said processor to said status registers is restricted when said processor is operating in said non-privileged mode.

8. The data processing apparatus as claimed in claim 1 wherein said plurality of privileged modes are configured for running privileged code.

9. The data processing apparatus as claimed in claim 1 wherein the plurality of operating modes comprise at least one further privileged mode, and wherein said processor is configured to use the first stack pointer register when in the at least one further privileged mode, and wherein at least one of the following is the case:
the plurality of operating modes comprise a plurality of further privileged modes, wherein said processor is configured to use the first stack pointer register when in each of said further privileged modes;
the plurality of operating modes comprise at least three privileged modes and at least one non-privileged mode;
said processor and the associated memory are configured for transferring operation from the non-privileged mode to the at least one or each further privileged mode other than said trusted mode in response to an event;
the or at least one said further privileged mode is configured for servicing interrupts, wherein said processor and the associated memory are configured for transferring operation from any of said plurality of operating modes to the or at least one said further privileged mode for servicing interrupts in response to an interrupt event; and
the at least one further privileged mode other than said trusted mode is configured as a mode for servicing errors which occur in at least one other mode, wherein the mode for servicing errors is configured for servicing errors which occur in the non-privileged mode and/or in the trusted mode which uses the second stack pointer register.

10. The data processing apparatus as claimed in claim 1 wherein said processor is configured for operation in at least one operating state, and wherein said processor and the associated memory are configured for transferring operation from an operating mode to an or said at least one operating state in response to an event, and wherein at least one of the following is the case:
said processor is configured for operation in any of a plurality of said operating states;
said processor is configured to operate in only one of a plurality of operating states at a given time;
said processor is configured to operate in only one of a plurality of operating modes or operating states at a given time;
the at least one or each operating state is privileged;
said at least one operating state is configured for use by the processor for recovery from errors occurring in a further privileged mode other than said trusted mode;
said at least one operating state is configured for servicing non-maskable interrupts and wherein the processor and the associated memory are configured for transferring operation from an operating mode to said at least one operating state for servicing non-maskable interrupts in response to a non-maskable interrupt event occurring in any other mode or state other than said operating state configured for servicing non-maskable interrupts; and
the data processing apparatus comprises a first status register for storing an indicator of the at least one operating state of the processor, and wherein said first status register is read-only to said instructions.

11. The data processing apparatus as claimed in claim 10 further comprising a second status register for storing an indicator of the operating mode of the processor.

12. The data processing apparatus as claimed in claim 11 wherein said second status register is writable by executing at least one of said instructions from an instruction set when the processor is in at least one of said operating modes.

13. The data processing apparatus as claimed in claim 10 wherein the processor and the associated memory are configured for transferring operation from one of said privileged modes to said operating state for recovery from errors in response to at least one exception event.

14. The data processing apparatus as claimed in claim 13, wherein the at least one exception event is an error event.

15. The data processing apparatus as claimed in claim 1 further comprising a signal for indicating a current mode (or state) during a transfer from a source mode (or state) to a destination mode (or state).

16. The data processing apparatus as claimed in claim 15 wherein said signal is configured for timing a change in the current mode (or state) indicated from said source mode (or state) to said destination mode (or state), in dependence on both the source mode (or state) and the destination mode (or state).

17. A data processing apparatus comprising:
- a processor configured to operate under control of an executable comprising instructions;
- an associated memory for storing a plurality of stacks;
- a first stack pointer register for storing a pointer to an address in a first of said stacks;
- a second stack pointer register for storing a pointer to an address in a second of said stacks; and
- a status register for individually indicating when said first stack pointer register has been initialised and when said second stack pointer register has been initialised;

wherein the processor is configured to run privileged instructions using said second stack pointer register;

the processor and the associated memory are for initialising said stack pointer registers; and changing an initialisation state of the second stack pointer by the processor is inhibited in dependence on an initialisation state of the first stack pointer.

18. The data processing apparatus as claimed in claim 17 wherein a first bit of said status register is allocated for use to indicate said first stack pointer register is initialised, and wherein a second bit of said status register is allocated for use to indicate said second stack pointer register is initialised.

19. The data processing apparatus as claimed in claim 18, wherein each bit of said status register is read-only for all instructions in an instruction set.

20. The data processing apparatus as claimed in claim 17 wherein said processor is configured to perform a soft reset when an attempt is made to use the first or second of said stacks when the status register does not indicate the corresponding stack pointer register has been initialised and/or to inhibit said status register from indicating the second stack pointer register has been initialised before said first stack pointer register has been initialised.

* * * * *

UNITED STATES PATENT AND TRADEMARK OFFICE
CERTIFICATE OF CORRECTION

PATENT NO. : 9,645,949 B2  
APPLICATION NO. : 13/003432  
DATED : May 9, 2017  
INVENTOR(S) : Morfey et al.

Page 1 of 1

It is certified that error appears in the above-identified patent and that said Letters Patent is hereby corrected as shown below:

On the Title Page

In item (75), in "Inventors", in Column 1, Line 3-4, delete "Cambridge, MA (US)" and insert --Cambridge (GB)-- therefor On page 2, in Column 2, item (56), under "Other Publications", Line 26, delete "Britian" and insert --Britain-- therefor On page 2, in Column 2, item (56), under "Other Publications", Line 28, delete "Britian" and insert --Britain-- therefor Signed and Sealed this  
Eighteenth Day of June, 2019

Andrei Iancu  
*Director of the United States Patent and Trademark Office*